US009263085B2

(12) United States Patent
Spitzlinger et al.

(10) Patent No.: US 9,263,085 B2
(45) Date of Patent: Feb. 16, 2016

(54) METHOD FOR COPY PROTECTION

(75) Inventors: Markus Spitzlinger, Elsbethen (AT); Andreas Winter, Viehhausen (AT); Walter Hinterhoelzl, Koppl (AT); Peter Eisenmann, Hallein (AT); Klaus Holzapfel, Kuchl (AT); Dominik Engel, Salzburg (AT); Juergen Gruenberger, Maria Enzersdorf (AT)

(73) Assignee: SONY DADC Austria AG, Anif (AT)

( * ) Notice: Subject to any disclaimer, the term of this patent is extended or adjusted under 35 U.S.C. 154(b) by 0 days.

(21) Appl. No.: 13/302,700

(22) Filed: Nov. 22, 2011

(65) Prior Publication Data
US 2012/0134249 A1    May 31, 2012

Related U.S. Application Data

(62) Division of application No. 13/320,428, filed as application No. PCT/EP2010/003073 on May 19, 2010.

(30) Foreign Application Priority Data

| May 20, 2009 | (EP) | .................................... | 09006836 |
| May 20, 2009 | (EP) | .................................... | 09006837 |
| May 20, 2009 | (EP) | .................................... | 09006838 |
| May 20, 2009 | (EP) | .................................... | 09006839 |
| May 20, 2009 | (EP) | .................................... | 09006840 |
| May 20, 2009 | (EP) | .................................... | 09006841 |

(51) Int. Cl.
*G11B 20/00* (2006.01)
*G11B 20/10* (2006.01)
*G11B 20/12* (2006.01)

(52) U.S. Cl.
CPC ...... *G11B 20/00427* (2013.01); *G11B 20/0021* (2013.01); *G11B 20/00086* (2013.01);

(Continued)

(58) Field of Classification Search
CPC ............. G11B 20/00094; G11B 20/00427; G11B 20/00623; G11B 20/00659; G11B 20/10527; G11B 20/00884; G11B 2220/2541; G11B 2020/10537; G11B 2020/1224; G11B 20/0021; G11B 20/00492; G11B 20/00086; G11B 20/00188
USPC ............... 369/30.08, 30.09, 47.12, 53.21, 84
See application file for complete search history.

(56) References Cited

U.S. PATENT DOCUMENTS

| 6,289,455 | B1 | 9/2001 | Kocher et al. | |
| 6,363,041 | B1 * | 3/2002 | Timmermans | ........... G11B 5/00 |
| | | | | 369/275.4 |

(Continued)

FOREIGN PATENT DOCUMENTS

| CN | 1898742 A | 1/2007 |
| CN | 1971744 A | 5/2007 |

(Continued)

OTHER PUBLICATIONS

U.S. Appl. No. 13/320,428, filed Nov. 14, 2011, Spitzlinger, et al.

(Continued)

*Primary Examiner* — Thomas Alunkal
(74) *Attorney, Agent, or Firm* — Oblon, McClelland, Maier & Neustadt, L.L.P.

(57) ABSTRACT

A method for copy protection in which an audiovisual or audio data is divided into a plurality of portions. The plurality of portions is at least partly scrambled and prepared so as to be stored on a record carrier in the scrambled order. This is done so that a physical position on the record carrier, e.g., a sector of the record carrier, where a respective portions of the divided data is stored depends on the scrambled order.

17 Claims, 44 Drawing Sheets

(52) U.S. Cl.
CPC .... *G11B20/00094* (2013.01); *G11B 20/00492* (2013.01); *G11B 20/00623* (2013.01); *G11B 20/00659* (2013.01); *G11B 20/00884* (2013.01); *G11B 20/10527* (2013.01); *G11B 2020/10537* (2013.01); *G11B 2020/1224* (2013.01); *G11B 2220/2541* (2013.01)

(56) References Cited

U.S. PATENT DOCUMENTS

| | | | |
|---|---|---|---|
| 6,662,060 | B1 | 12/2003 | Maliszewski et al. |
| 7,058,977 | B1* | 6/2006 | Furukawa ........ G11B 20/00086 369/53.21 |
| 7,072,260 | B1* | 7/2006 | Sako .................. G06F 21/10 348/E7.071 |
| 7,102,989 | B2 | 9/2006 | Suh et al. |
| 7,965,599 | B2* | 6/2011 | Kuroda ................ G06F 21/10 369/53.21 |
| 2001/0005446 | A1 | 6/2001 | Uchikoga |
| 2002/0003881 | A1 | 1/2002 | Reitmeier et al. |
| 2002/0141741 | A1 | 10/2002 | Zou et al. |
| 2002/0188566 | A1* | 12/2002 | Inchalik ............. G06F 21/6218 705/44 |
| 2004/0213053 | A1 | 10/2004 | Kato et al. |
| 2005/0019017 | A1* | 1/2005 | Green .............. G11B 20/00086 386/234 |
| 2005/0076061 | A1 | 4/2005 | Cox |
| 2005/0099897 | A1* | 5/2005 | Sako ................ G11B 20/00086 369/30.04 |
| 2005/0102528 | A1 | 5/2005 | Tan et al. |
| 2005/0114295 | A1 | 5/2005 | Takashima |
| 2005/0163479 | A1 | 7/2005 | Green |
| 2005/0174909 | A1* | 8/2005 | Horigome ............ G11B 7/0053 369/53.21 |
| 2006/0017747 | A1 | 1/2006 | Dawson |
| 2007/0033419 | A1 | 2/2007 | Kocher et al. |
| 2007/0136282 | A1* | 6/2007 | Takashima ....... G11B 20/00086 |
| 2007/0183299 | A1 | 8/2007 | Spitzlinger et al. |
| 2007/0274180 | A1 | 11/2007 | Kato et al. |
| 2008/0022125 | A1 | 1/2008 | Basile |
| 2008/0037781 | A1 | 2/2008 | Kocher et al. |
| 2008/0049935 | A1 | 2/2008 | Kocher et al. |
| 2008/0059826 | A1 | 3/2008 | Kocher et al. |
| 2008/0101604 | A1 | 5/2008 | Kocher et al. |
| 2008/0130886 | A1 | 6/2008 | Kocher et al. |
| 2008/0133938 | A1 | 6/2008 | Kocher et al. |
| 2008/0137848 | A1 | 6/2008 | Kocher et al. |
| 2008/0222737 | A1 | 9/2008 | Basile et al. |
| 2008/0304811 | A1 | 12/2008 | Ikeda et al. |
| 2009/0041235 | A1 | 2/2009 | Reitmeier et al. |
| 2010/0061208 | A1 | 3/2010 | Kuroda |

FOREIGN PATENT DOCUMENTS

| | | |
|---|---|---|
| EP | 0 668 695 | 8/1995 |
| EP | 1 122 729 | 8/2001 |
| EP | 1 136 902 | 9/2001 |
| EP | 1 688 950 | 8/2006 |
| EP | 1 715 686 | 10/2006 |
| EP | 1 791 121 | 5/2007 |
| EP | 1 818 924 | 8/2007 |
| GB | 2 402 543 | 12/2004 |
| GB | 2 418 748 | 4/2006 |
| JP | 2003-151209 | 5/2003 |
| JP | 2006 277389 | 10/2006 |
| JP | 2007-150587 | 6/2007 |
| WO | 00 11870 | 3/2000 |
| WO | 03 013137 | 2/2003 |
| WO | WO 03/054878 A1 | 7/2003 |
| WO | 03 085952 | 10/2003 |
| WO | WO 2004/100048 A2 | 11/2004 |
| WO | WO 2004/100048 A3 | 11/2004 |
| WO | 2005 022530 | 3/2005 |
| WO | WO 2006/038784 A2 | 4/2006 |
| WO | WO 2006/038784 A3 | 4/2006 |
| WO | 2006 073252 | 7/2006 |
| WO | WO 2006/073251 A2 | 7/2006 |
| WO | WO 2006/073251 A3 | 7/2006 |
| WO | WO 2006/078099 A2 | 7/2006 |
| WO | WO 2007/013778 A1 | 2/2007 |
| WO | WO 2007/024075 A2 | 3/2007 |
| WO | WO 2007/024075 A3 | 3/2007 |
| WO | WO 2007/029147 A2 | 3/2007 |
| WO | WO 2007/029147 A3 | 3/2007 |
| WO | WO 2008/109092 A1 | 9/2008 |

OTHER PUBLICATIONS

U.S. Appl. No. 13/302,771, filed Nov. 22, 2011, Spitzlinger, et al.
U.S. Appl. No. 13/302,747, filed Nov. 22, 2011, Spitzlinger, et al.
U.S. Appl. No. 13/302,713, filed Nov. 22, 2011, Spitzlinger, et al.
U.S. Appl. No. 13/302,735, filed Nov. 22, 2011, Spitzlinger, et al.
Office Action issued Feb. 14, 2012, in European Patent Application No. 09 006 839.6.
Office Action issued Feb. 14, 2012, in European Patent Application No. 09 006 840.4.
U.S. Appl. No. 13/371,952, filed Feb. 13, 2012, Holzapfel, et al.
European Office Action issued Jul. 11, 2012 in patent application No. 09 006 838.8.
European Office Action issued Jul. 11, 2012 in patent application No. 09 006 839.6.
"Introduction and Common Cryptographic Elements", Advanced Access Content System, Revision 0.91, Total 82 Pages, (Feb. 17, 2006).
"Blu-ray Disc Pre-recorded Book", Advanced Access Content System, Revision 0.912, Total 103 Pages, (Jul. 27, 2006).
"Pre-recorded Video Book", Advanced Access Content System, Revision 0.92, Total 61 Pages, (Nov. 29, 2007).
"2.B Audio Visual Application Format Specifications for BD-ROM", Blu-Ray Disc, White Paper Blu-Ray Disc Format, pp. 1-35, (Mar. 2005).
"Universal Disk Format® Specification", osta.org, Revision 2.50, Total 165 Pages, (Apr. 30, 2003).
"Recordable Video Book", Advanced Access Content System, Revision 0.91, Total 23 Pages, (Feb. 17, 2006).
Kocher, P. et al., "Self-Protecting Digital Content, a Technical Reportt From the CRI Content Security Research Initiative", Cryptography Research, Inc., pp. 1-14, (2002-2003).
International Search Report Issued Dec. 7, 2010 in PCT/EP10/003073 filed May 19, 2010.
European Search Report Issued Nov. 2, 2009 in European Patent Application No. 09006836.2 filed May 20, 2009.
European Search Report Issued Nov. 2, 2009 in European Patent Application No. 09006837.0 filed May 20, 2009.
European Search Report Issued Nov. 2, 2009 in European Patent Application No. 09006840.4 filed May 20, 2009.
European Search Report Issued Nov. 2, 2009 in European Patent Application No. 09006841.2 filed May 20, 2009.
European Search Report Issued Nov. 2, 2009 in European Patent Application No. 09006838.8 filed May 20, 2009.
European Search Report Issued Nov. 2, 2009 in European Patent Application No. 09006839.6 filed May 20, 2009.
Office Action issued Sep. 19, 2013, in Japanese Patent Application No. 2012-511192 (with English Summary).
Office Action issued May 20, 2014 in Russian Patent Application No. 2011146036 (submitting English translation only).
Combined Office Action and Search Report issued Mar. 12, 2014 in Chinese Patent Application No. 201080020981.6.
U.S. Appl. No. 14/211,539, filed Mar. 14, 2014, Spitzlinger, et al.
Combined Chinese Office Action and Search Report issued Nov. 24, 2014 in Patent Application No. 2010800209816 (English Translation only).

* cited by examiner

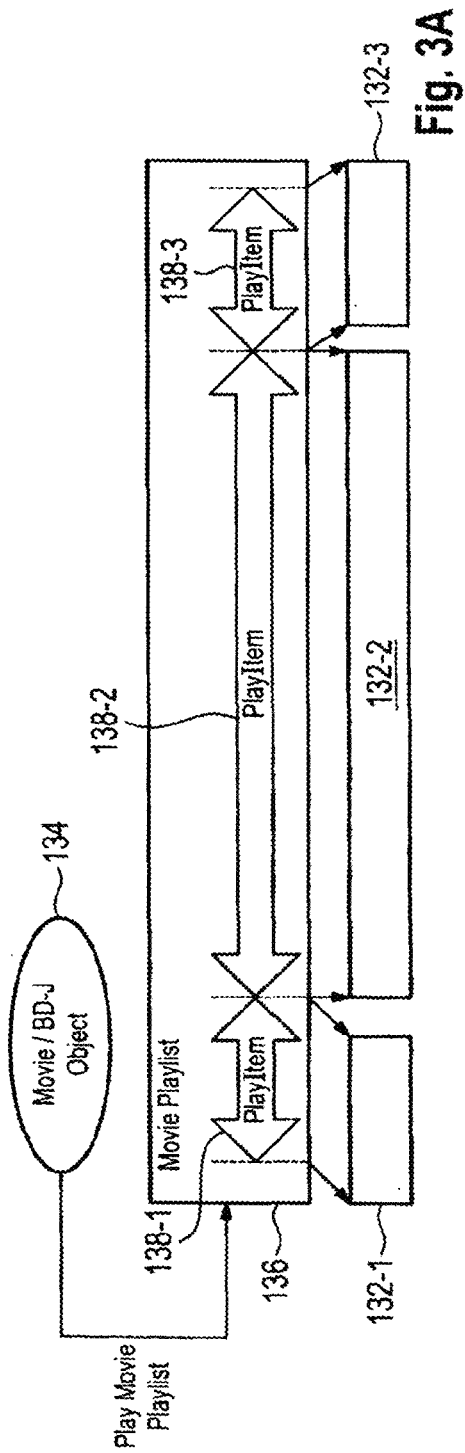
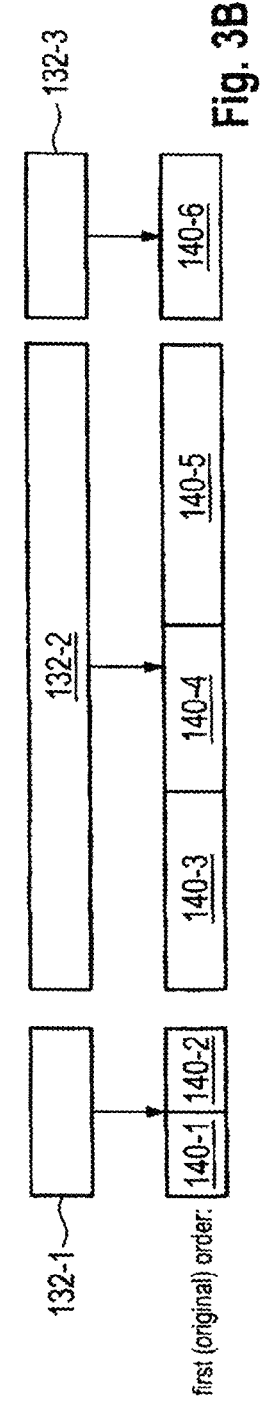
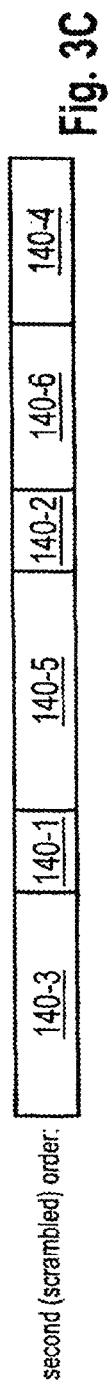
Fig. 3A
Fig. 3B
Fig. 3C

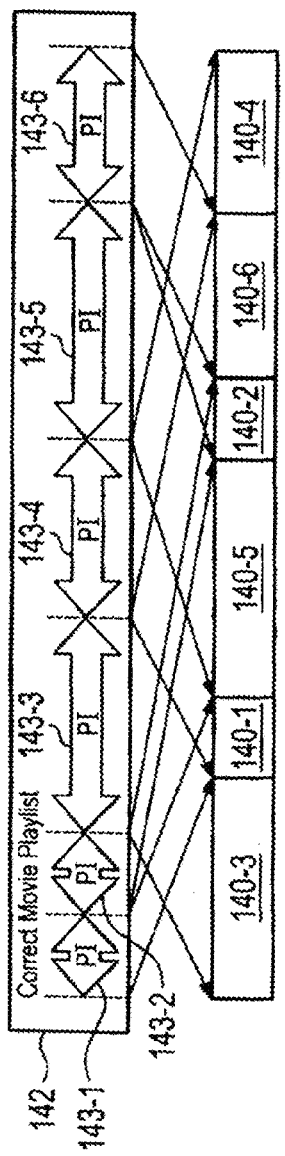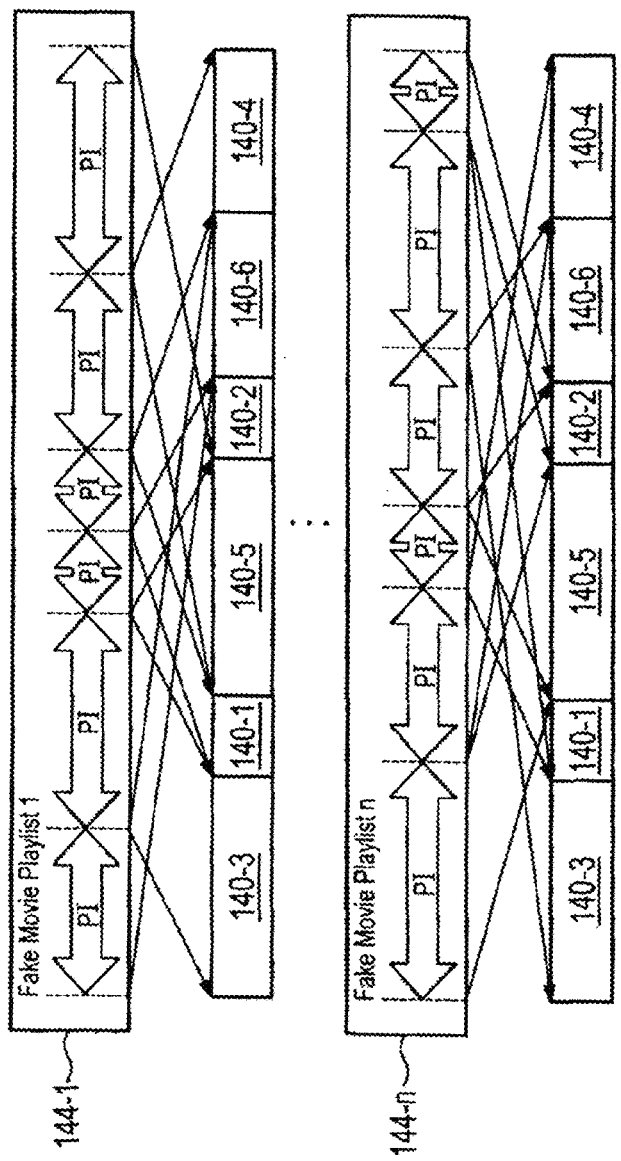

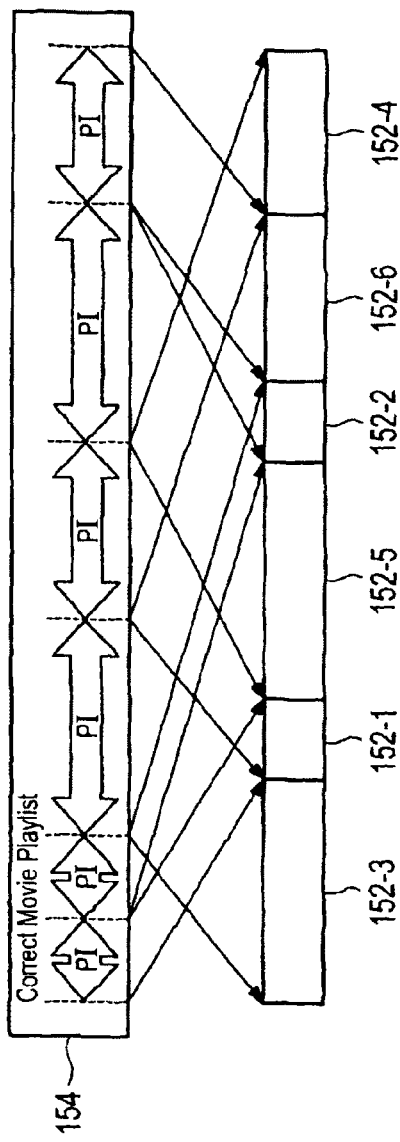
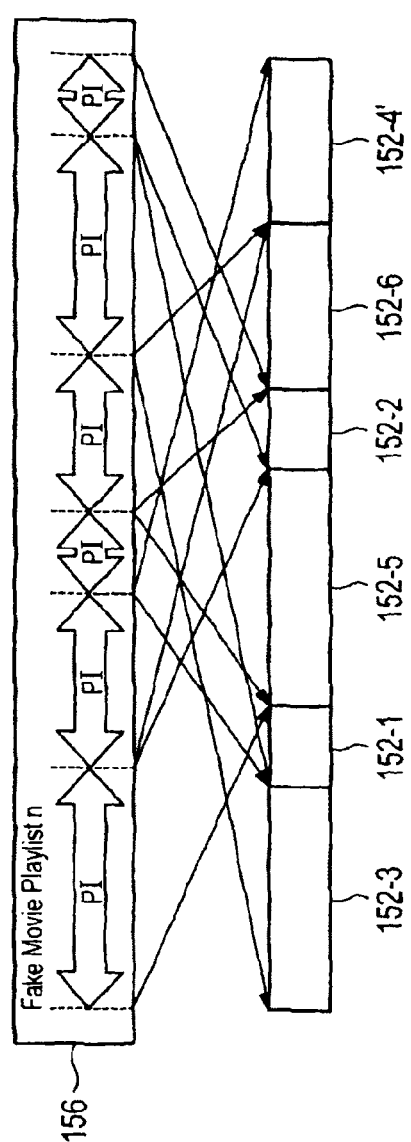
Fig. 7A
Fig. 7B

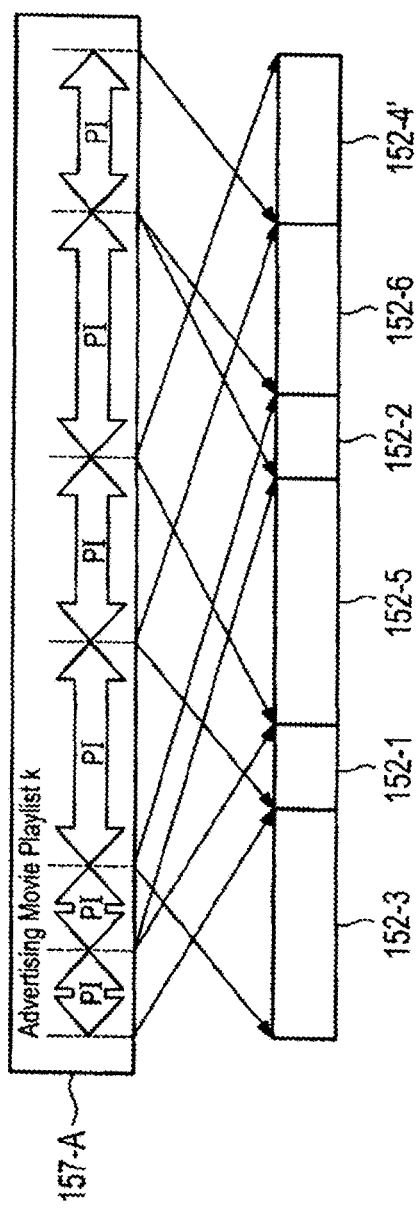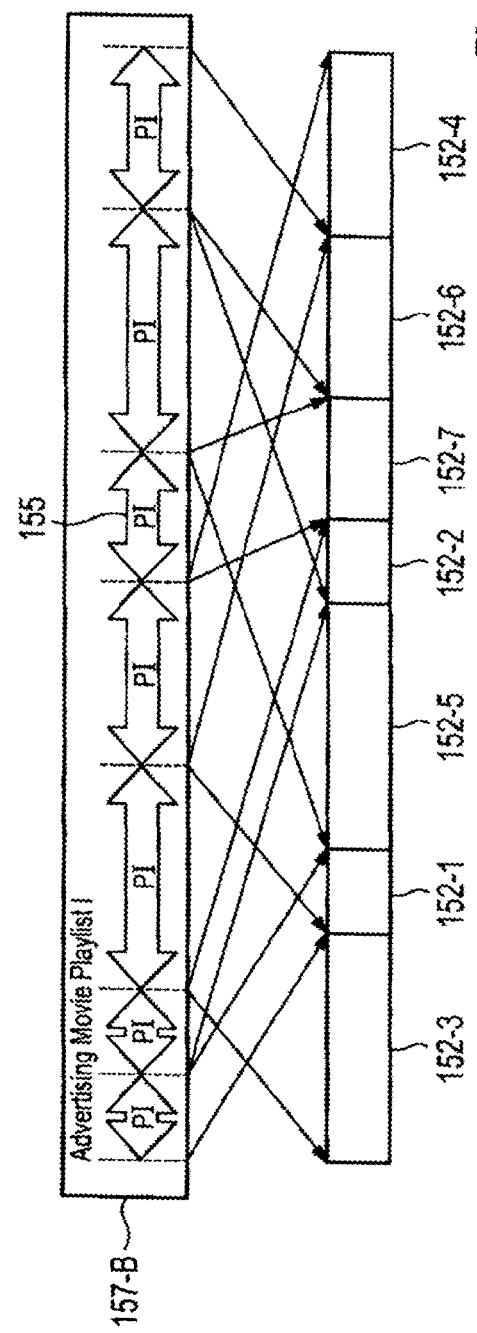

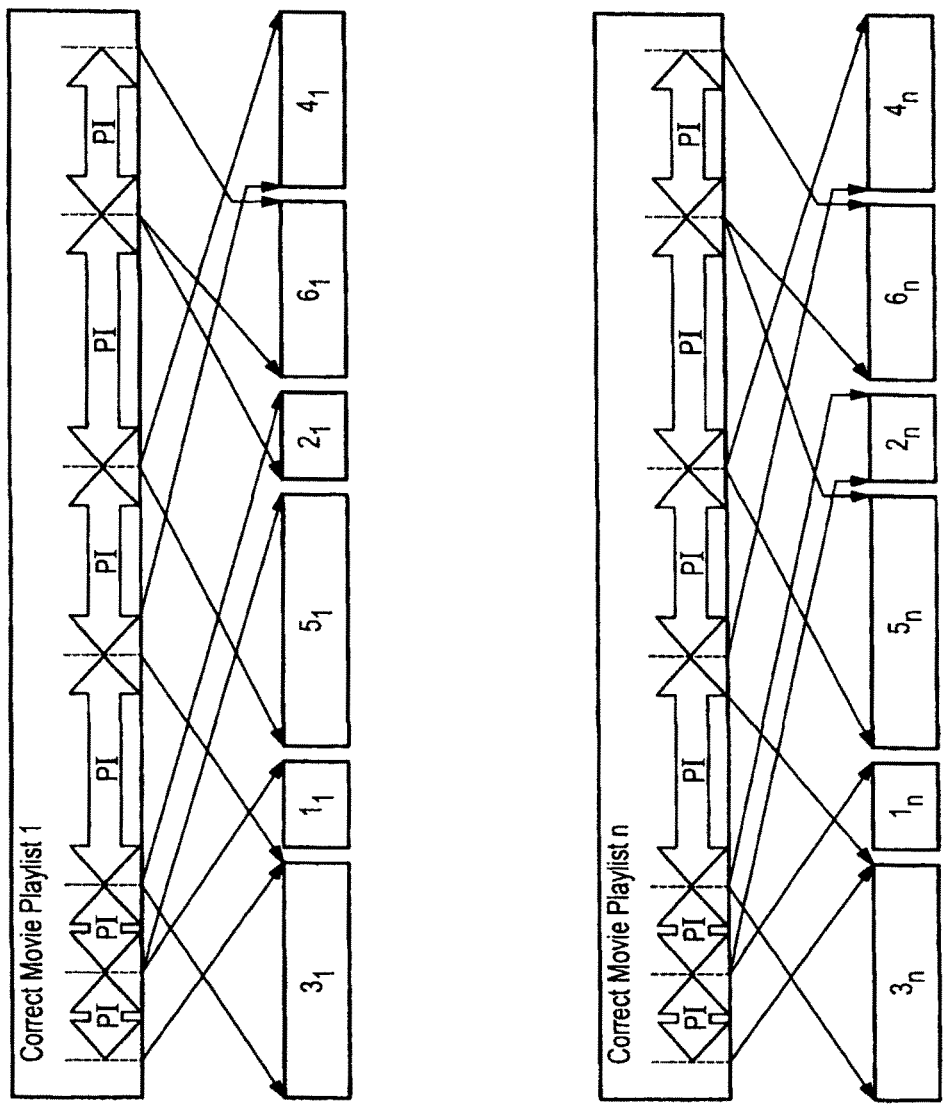

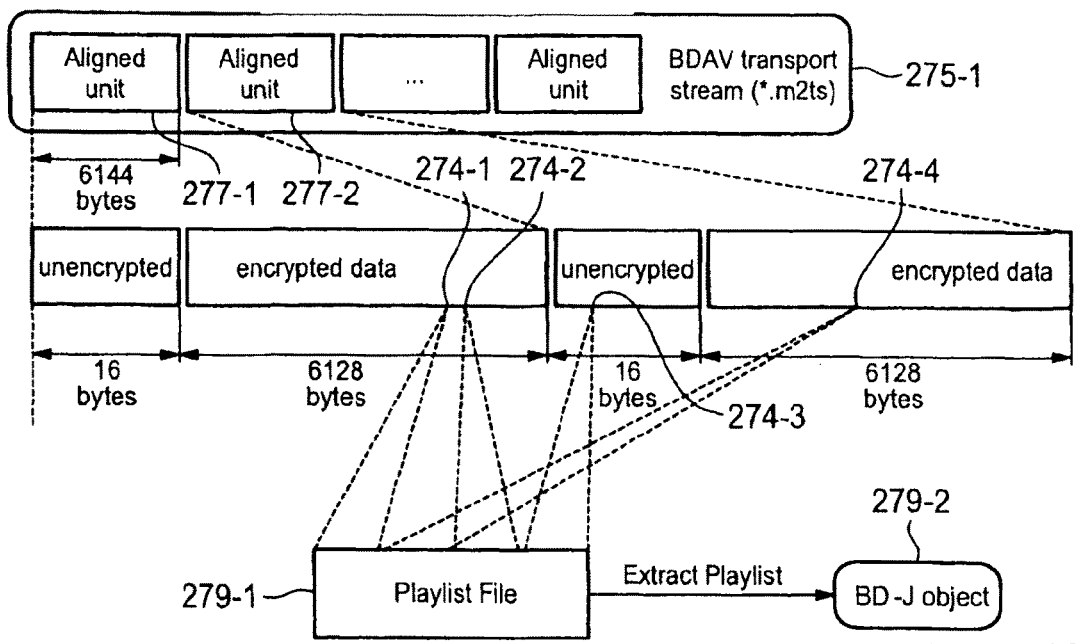
Fig. 19F
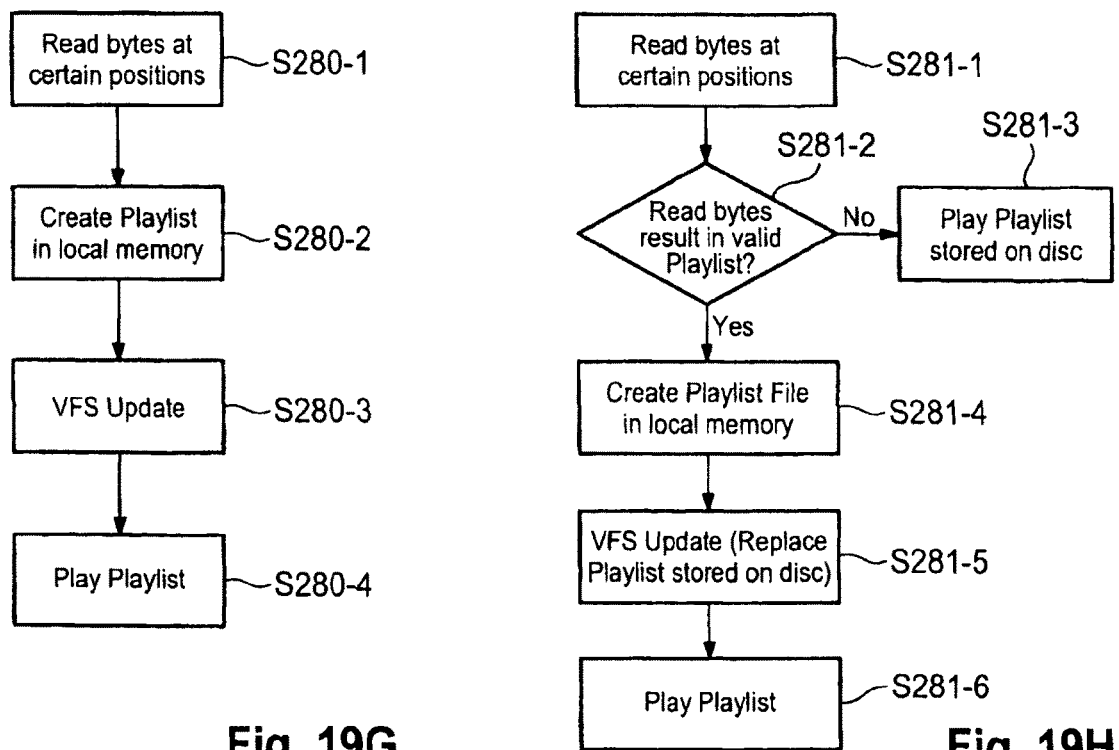
Fig. 19G
Fig. 19H

Insert portions with additional content:
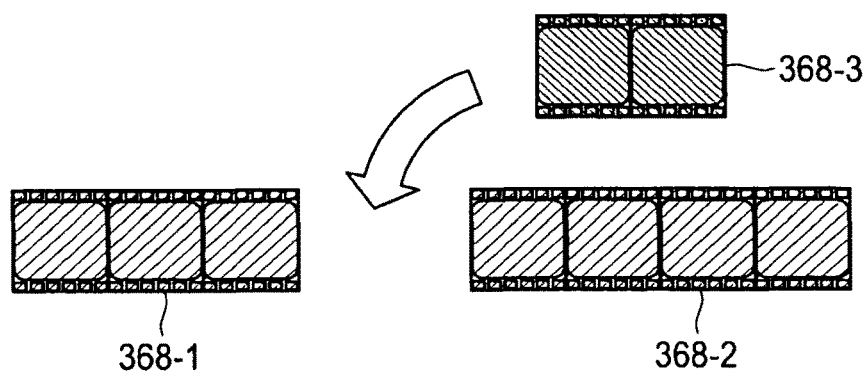
Resulting sequence of portions of audiovisual data:
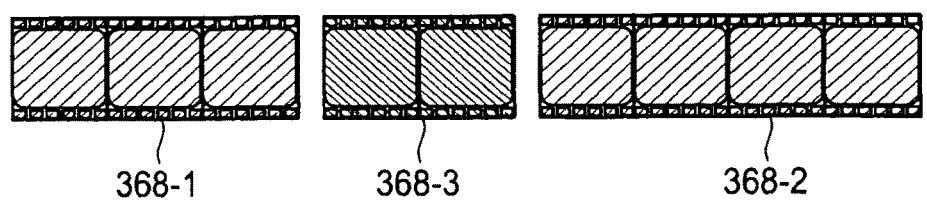
Fig. 31A

Insert copied portions:
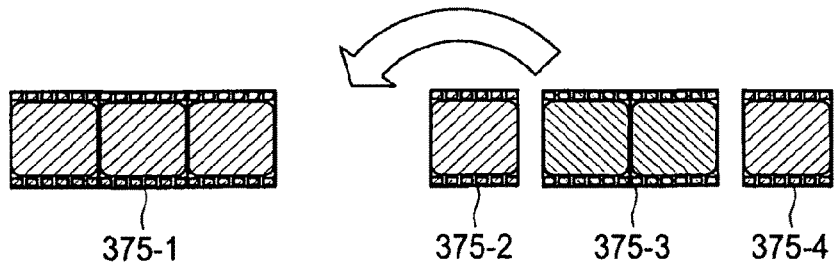
375-1   375-2   375-3   375-4
Resulting sequence of portions of audiovisual data:
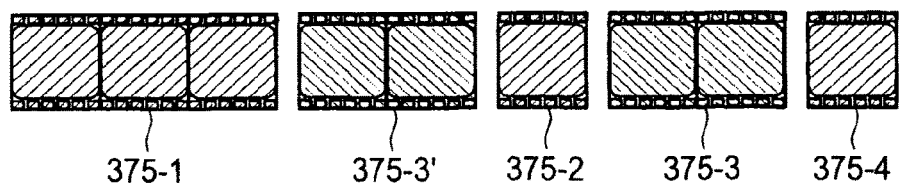
375-1   375-3'   375-2   375-3   375-4
Fig. 32A
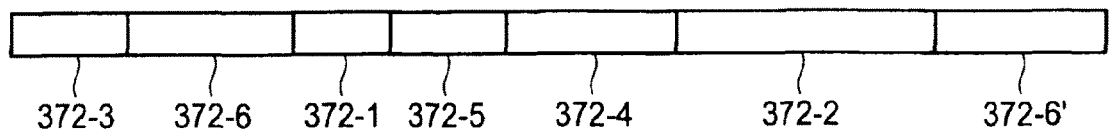
372-3   372-6   372-1   372-5   372-4   372-2   372-6'
PL-Correct= { PI (372-1), PI (372-2), PI (372-3), PI (372-4), PI (372-5), PI (372-6) }
PL-Fake= { PI (372-2), PI (372-6'), PI (372-4), PI (372-5), PI (372-1), PI (372-3) }
Fig. 32B

Insert a clip that is copied from a part of another clip:
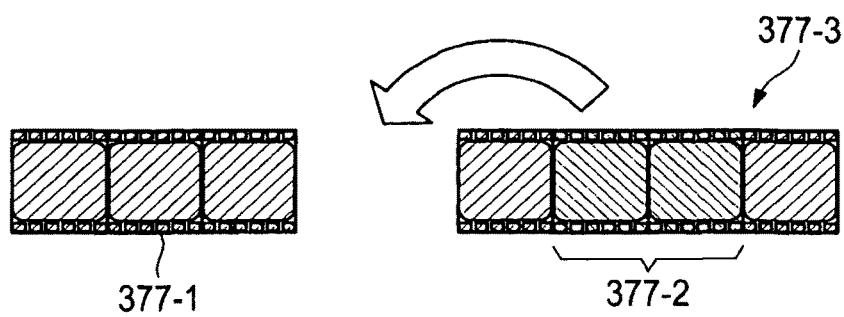
Resulting sequence of portions of audiovisual data:
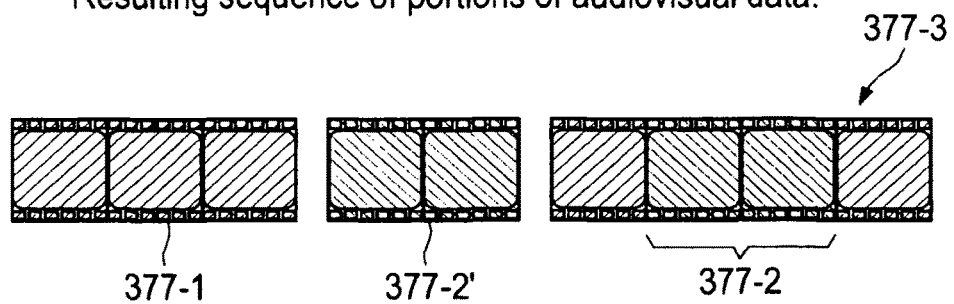
Fig. 33

Insert a combined clip:
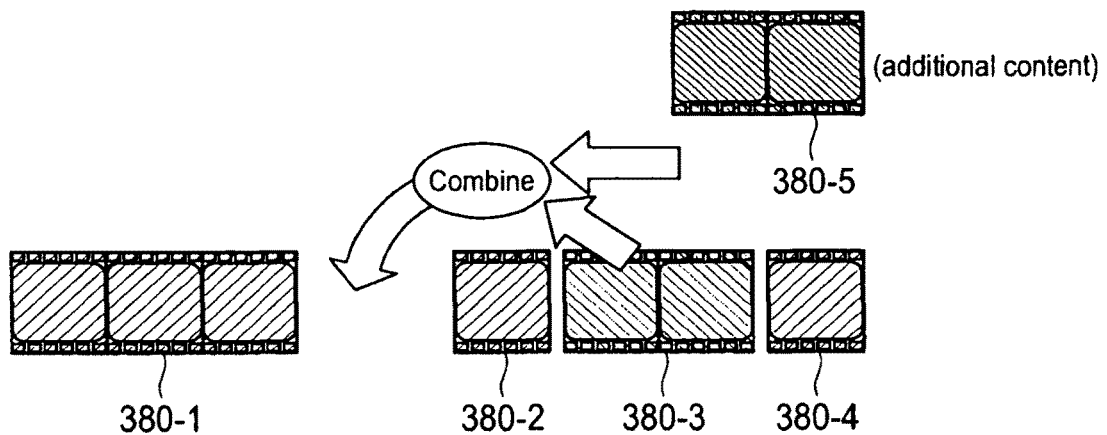
Resulting sequence of portions of audiovisual data:
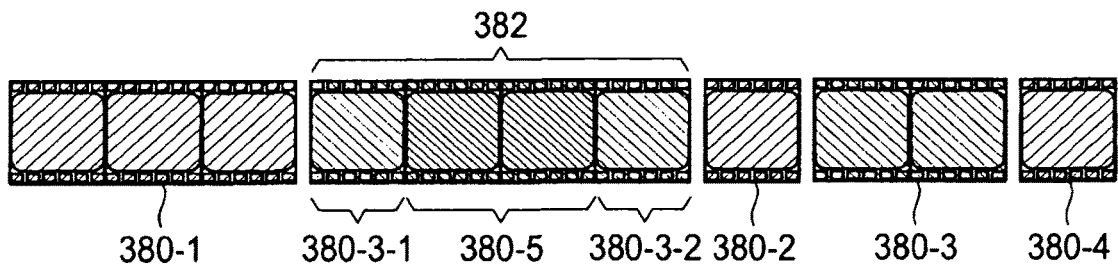
Fig. 34A

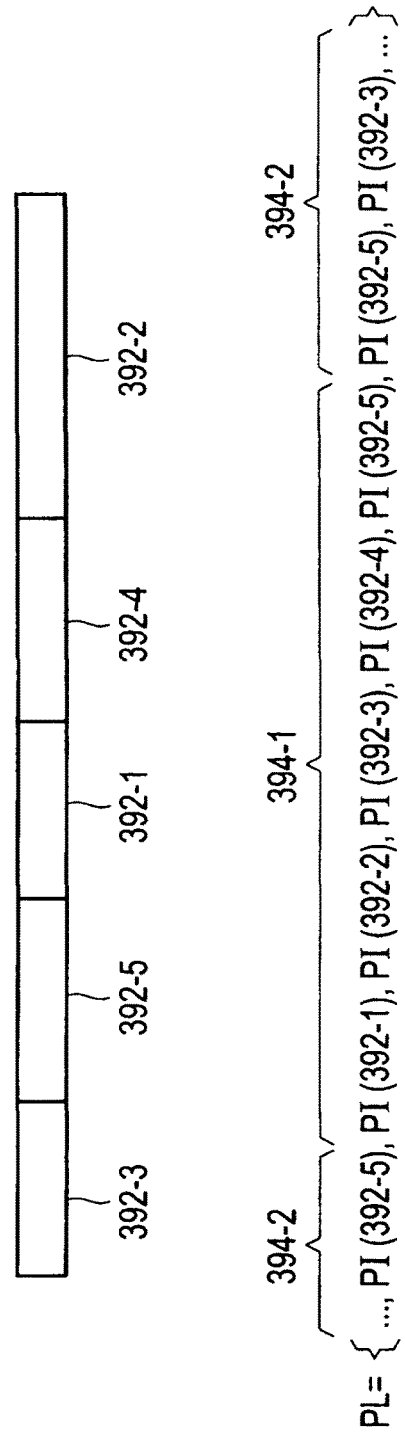

METHOD FOR COPY PROTECTION

CROSS-REFERENCE TO RELATED APPLICATIONS

This application is a divisional of U.S. application Ser. No. 13/320,428, filed Nov. 14, 2011, which is a National Stage Application of PCT/EP2010/003073, filed May 19, 2010, which is based upon and claims the benefit of priority from prior European Patent Application Nos. 09006836.2, 09006837.0, 09006840.4, 09006841.2, 09006838.8 and 09006839.6, each filed on May 20, 2009. U.S. application Ser. No. 13/320,428 is incorporated herein by reference.

Embodiments of the invention relate to methods, devices and systems for copy protection as well as to copy protected record carriers.

BACKGROUND

Various methods and algorithms for copy protecting content stored on a record carrier exist. Content that may be protected by such copy protection methods may e.g. be data such as computer programs, audiovisual content such as e.g. movies, and audio content in audio files.

However, many of the available methods and algorithms for copy protection have been "hacked", i.e. the copy protection may be removed from the record carrier and the content be distributed on recordable optical data carrier or as "ripped" versions stored on hard disks or other storages.

Thus, there is a constant need to improve the quality of copy protection methods and algorithms.

BRIEF SUMMARY

It is an object of embodiments of the invention to provide methods, devices and systems for copy protection. It is a further object of the invention to provide a copy protected record carrier.

These objects are solved by the independent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar portions.

FIG. 3 shows a further embodiment where audiovisual files (clips) are divided and stored on the record carrier in a scrambled order.

FIG. 4 shows a possibility of hiding a correct playlist by creating fake playlists.

FIGS. 7A to 7D show a further embodiment where advertising or chunk clips are inserted in fake playlists.

FIG. 11 shows a further embodiment for illustrating the use of watermarked audiovisual files.

FIG. 19C-1 shows an embodiment where the control flow of the program instructions on a record carrier is modified depending on bytes read at certain positions.

FIG. 19C-2 shows a further embodiment where the control flow of the program instructions on a record carrier is modified depending on bytes read at certain positions, wherein depending on a selected program path different playlists are selected for playback.

FIG. 19F shows a further embodiment where bytes are read at certain positions, the bytes being interpreted as a playlist file.

FIG. 19G shows steps of a method where bytes read at certain positions are interpreted as playlist file and included in a file system of a Blu-ray disc by a VFS update command.

FIG. 19H shows steps of a method where bytes read at certain positions are interpreted as playlist file and included in a file system of a Blu-ray disc by a VFS update command, thereby replacing a playlist file stored on the disc.

FIGS. 31A to 31C show a further embodiment where additional portions are stored on the record carrier.

FIGS. 32A and 32B show further embodiments where an additional portion is stored on the record carrier which is a copy of another portion.

FIG. 33 shows a further embodiment where an additional portion is stored on the record carrier corresponding to a copy of (only) a part of another portion.

FIGS. 34A and 34B show a further embodiment where additional portions are generated and stored on the record carrier, the additional portions including additional content such as e.g. advertisement and the like as well as copies of other portions stored on the record carrier.

FIGS. 35A and 35B show further embodiments where "long" playlist are generated.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
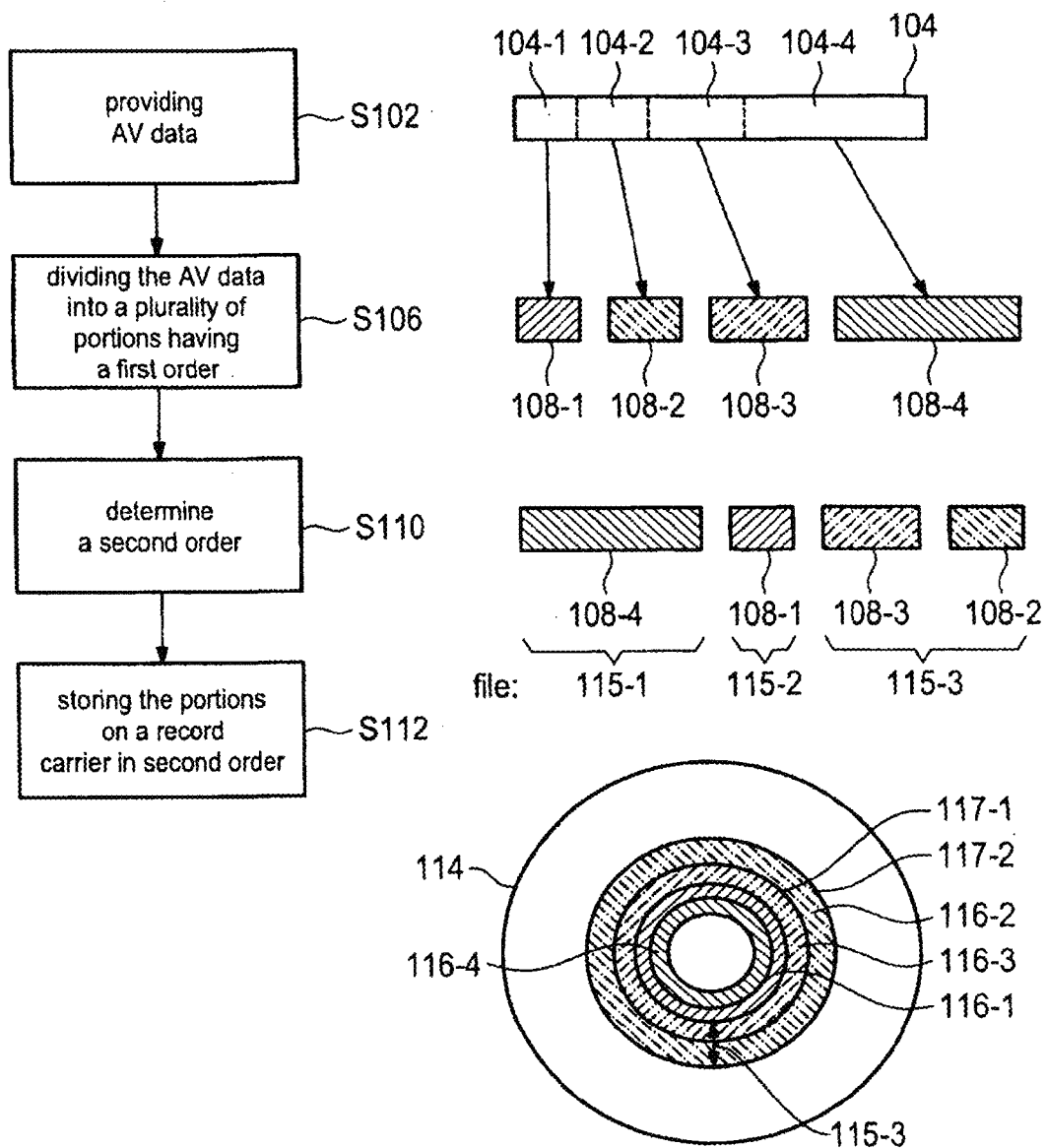
FIG. 1 shows an embodiment where an audiovisual file is divided into a plurality portions and the portions are stored in a plurality of files on a record carrier.

In FIG. 1, at S102 AV data 104 is provided. For example, the AV data may be provided as an audiovisual (AV) file. It is also possible that the AV data be provided as streamed content or in any other form. The AV data 104 may also be referred to as origin or genuine AV data. It corresponds to AV data which would conventionally be written in one portion, e.g. one file or clip, onto a record carrier, e.g. in consecutive blocks or sectors. In a file system of the conventional record carrier, the AV data 104 would usually be referenced by a single file name. For example, the AV data 104 may correspond to a complete movie to be stored on a record carrier.

Thus, the AV data 104 has a genuine playback sequence defined by the content of the AV data. The genuine playback sequence corresponds to the playback sequence as created/recorded e.g. by the director or moviemaker of the content. The genuine playback sequence is, thus, e.g. a playback sequence of the content as intended by a director of a film or any other video content. In the genuine playback sequence, e.g. scenes of a movie will be reproduced in the correct logical order of the movie.

In order to copy protect the content of the AV data 104, according to an embodiment of the invention, at S106, the AV data 104 may be divided into a plurality of portions 104-1, . . . , 104-4. The portions 104-1, . . . , 104-4 have a first order that corresponds to the order derived from the AV data 104. As seen in FIG. 1, in the embodiment, the AV data 104 has four portions 104-1, 104-2, 104-3, and 104-4 where a dividing (slicing) is done. Note that the portions are originally not included in the AV data 104—the portions only serve to illustrate the dividing into the portions 104-1, 104-4.

At S110, a second order is determined for the portions 108-1, . . . , 108-4. The second order is different from the first order and may also be referred to as "scrambled order" or "shuffled order" of the portions 108-1, . . . , 108-4. In the embodiment of FIG. 1, the second order is: 108-4, 108-1, 108-3, and 108-2. Thus, if the AV data 104 was a movie, then the end of the movie corresponding the portion 108-4 of the movie would be played in the beginning if the portions 108 were played back, i.e. reproduced, in the second order. However, when using the first order for playback, the original content would be reproduced. However, the playback of the record carrier would not be a "linear playback", i.e. a reading head may not linearly mover over the area of the record carrier. In fact, the reading head, e.g. optical pick up would move back and forth in order to jump to different physical positions where the respective portions are stored. This would be a "jumbled" playback (or access) with respect to a scanning order of the disc.

At S112, the portions 108-1, . . . , 108-4 are stored on a record carrier 114. Thereby, the portions 108-1, . . . , 108-4 are stored in the second order, i.e. a physical or spatial position on the record carrier 114 where a respective portion of the plurality of portions is stored, depends on the second order. As seen in the embodiment of FIG. 1, record carrier 114 has a plurality of areas (regions), e.g. blocks or sectors, 116-1, . . . , 116-n that may e.g. correspond to logical blocks in accordance with a format of the record carrier 114. In each of these regions, a respective portion may be stored. In the embodiment of FIG. 1, in the first region 116-4 physically arranged in the middle of the record carrier the portion 108-4 may be stored. Likewise, in regions 116-1, 116-3, and 116-2, the portions 108-1, 108-3 and 108-2, respectively, may be store.

As seen, the second order determines the order in which the portions 108-1, . . . , 108-4 are physically stored on the record carrier. Therefore, the second order may also be referred to as "storing order". Likewise, since the first order at S106 may be used for playback of the AV data 104 in the genuine playback sequence, the first order may also be referred to as "playback order".

Regarding the storing of the portions 108-1, . . . , 108-4 on the record carrier, it should be noted that the storing may be such that each portion is stored in one file of the logical file system of the record carrier. In another embodiment, however, it is also possible that some of the portions (a plurality of portions) are stored in one same file and other portions (a further plurality of portions) are stored in other files. Of course, it is also possible that all portions are stored in one file of the logical file system of the record carrier.

In the embodiment of FIG. 1, portions 108-2 and 108-3 stored in areas 116-2 and 116-3, respectively, are stored in one file 115-3 of the file system as also indicated by arrow 115-3. Portions 108-4 and 108-1 stored in areas 116-4 and 116-1 are stored as separate files 115-1 and 115-2, respectively.

If several portions are stored in one same file, the first order may reference (physical) positions on the record carrier where a respective portion starts and/or ends. For example, in order to reference portion 108-2, the first order may reference beginning position (starting point) 117-1 denoting the beginning of portion 108-2, i.e. the beginning of area 116-2, and end position (end point) 117-2 denoting the end of portion 108-2, i.e. the end of area 116-2. If the record carrier is e.g. a Blu-ray disc, the portions 108-1, . . . , 108-4 may be referenced as play items with respective IN-points (beginning of a portion) and OUT-points (end of a portion)—see also FIG. 2. Thus, there may be play items referencing portions in a same file or in different files.

In the embodiment of FIG. 1, there are only four portions 108 shown. In reality, however, the number of portions may be much larger. For example, the portions may have a length of about one minute of audiovisual content. If the AV data 104 is a movie with a length of 120 minutes, there would e.g. be 120 portions 108 that will be stored on the record carrier. Other possible values for the length of the portions are: 10-20 seconds, 10-30 seconds, 30 seconds to 1 minute, 1 minute to 2 or 3 minutes, 3 minutes to 5 minutes, and/or 5 to 10 minutes. Also, shorter or longer files are possible. As indicated by the sizes of the portions 108-1, . . . 108-4 in FIG. 1, the length of different portions can be different. The sizes could also be the same for all or a part of the AV portions.

As mentioned, when the portions are played back according to the second order, i.e. in the order as physically stored on the record carrier, the content of the AV data 104 will not be reproduced in the genuine playback sequence. In fact, the content would at least partly be reproduced in a complete disorder such that a viewer cannot enjoy the content and will be dissatisfied.

Thus, in order to enjoy the content of the AV data 104, the first order must be known. If the first order is not known, the record carrier is useless since the original AV content cannot be reproduced satisfying for the user. It may be that e.g. some scenes from an end of a movie be shown in the beginning and vice versa portions from the beginning of a movie would be shown at the end when playing back the files in the order as physically arranged on the record carrier.

Thus, if a copier, i.e. a person (hacker) or copy program, copies or rips the portions stored on the record carrier, the copy will be useless unless the first order is known or can be determined when playing back the portions. Only if the portions are played back in the first order, the content of the AV data will be reproduced in the genuine (original) playback sequence.

Further, if there is a sufficient number of portions finding the first order by hand will be very cumbersome or impossible. In order to make it even harder for a person to try finding the first order by watching the portions it may be effective to divide the AV data such that at least a part of the portions start with a beginning of a scene or end with an end of scene of a movie. In this case, there is no clue for the first order derivable from a certain ending of a portion and/or from a beginning of a portion. Moreover, the process of finding the first order automated is more difficult since no audio and/or video patterns at the beginnings and/or endings of portions can be analyzed in order to find portions that are subsequent files in the first order.

There also exist some copy programs that automatically try finding longest/largest files on a record carrier assuming that such large files contain the main movie. However, if at least some portions will be respectively stored in a separate files since these resulting files are rather small in size, such program will fail. It is also possible to specifically confuse such copy programs or have such copy programs make useless copies. This is e.g. possible by only applying the dividing and scrambling of portions for certain portions of the AV data. For example, the dividing may only be applied to a portion of the AV data corresponding to the last 10-20 minutes of a movie. Thus, a copier or copy program may see a large AV file corresponding to a large portion of the movie and several smaller AV files that may or may not be stored in the scrambled order on the record carrier (in this case at least some portions will be stored in separate files). In case the copy program then only copies the largest file assuming that this corresponds to the main movie and the smaller files correspond e.g. to bonus material, extra AV material or the like, a respective copy will be dissatisfying since e.g. the end of a movie would be missing.

Also, it is possible to apply the scrambling selectively to only a portion of the portions. Thus, the "disorder" that a viewer will experience when viewing the portions in the order as physically stored on the record carrier depends on the scrambling. If the scrambling is e.g. only done for portions corresponding to the end of a movie, then a copier might not notice immediately that a file-by-file copy of the record carrier is actually useless unless the first order is known since the end of the movie will be played back in a disorder. Of course, the scrambling could also be done for portions corresponding to a beginning or middle portion of a movie.

Thus, from the above, it is clear that the method for copy protection as explained exemplary at S102, S106, S110, and S112 in FIG. 1 is very effective. In order to hack the copy protected content, a high effort would be necessary in order to find the correct playback order for the portions 108 stored on the record carrier 114.

On the other hand, as is also clear, the first order should be protected in some manner. This may e.g. be done by storing the first order encrypted or obfuscated (hidden) on the record carrier. Also, the first order may not be stored on the record carrier at all. In this case, the first order might be provided for download on a server. Downloading might be controlled by an authentication process. The protection of the first order will be detailed below.

As should also be clear from the embodiment of FIG. 1, the basic principle explained, i.e. the dividing of a large amount of AV data, e.g. a large file, into a, e.g. large, number of smaller portions or files and shuffling (scrambling) of the small files/portions, may be applicable to many types of record carriers. It could be used for copy protecting Blu-ray discs (BD), digital versatile discs (DVDs), CD-ROMs or any other possible future video storage format. The basic principle could also be applied to content stored on hard discs, removable memory such as e.g. RAM storage or downloaded e.g. streamed content. For example, it may be possible that a large number of small AV files (portions) are offered for downloading at various servers. The correct (first) order of the AV files that will allow reproducing the content distributed across the AV files might, however, only be available at one source. This could be only one server where a strict authentication process is performed that will allow downloading the first order. Alternatively and/or additionally it would also be possible to distribute the first order via a memory product, e.g. removable memory (media card, USB memory stick), by mail. The first order could also be derived from an unlock key that a user has to enter into a playback device for the record carrier. The unlock key could be printed onto the record carrier or onto its case. Also, the first order could be derived automatically from an identifier of the record carrier. For example, if the record carrier is a Blu-ray disc, the PMSN (pre-recorded media serial number) or a volume ID of the disc could be used to automatically determine (decode or de-obfuscate) the first order.

When the basic principle is applied for downloading/streaming content in a copy protected manner, it is also possible that a different order of the files is provided for download for each individual user. In this case, the first order for one (second) order of portions or files downloaded by one user will be useless for another (second) order of portions or files downloaded by another user. The second order might e.g. be indicated by the file names of the AV portions and/or by header information in the portions or files.

The mentioned copy protection of downloaded/streamed content (by slicing/scrambling) could be used for any kind of content e.g. (only) audio content, audiovisual content or other multimedia content e.g. downloaded video game content. In this case it would be e.g. audio data or other multimedia data that is divided into portions that are then scrambled.

As mentioned, the AV data 104 shown in FIG. 1 may be arbitrarily divided into the portions 108. However, as also already mentioned, in another embodiment it is also possible that the cuts indicated in FIG. 1 for AV data 104 be determined dependent on the content of AV data 104. For example, cuts, i.e. a position where the AV data 104 is divided into two portions, may be chosen to correspond to scene changes of the content. Thus, the beginning of some of the portions 108 may correspond to a beginning of a scene of the content, e.g. a movie, and/or the end of some of the portions 108 may correspond to an end of a scene of the content.

The cuts may also be set such that subtitles of e.g. a movie not be split into separate portions. For example, a subtitle may be displayed for a certain period during playback, e.g. 10 seconds. The dividing in this case may be such that the portion of the AV data for which this same subtitle is displayed not be split into separate portions. An advantage of this is that the resulting portions may not need to be re-encoded. In fact, the AV data may only need to be split up. Also, it is more difficult for hackers to determine portions that should in the genuine playback sequence be played back consecutively. A same subtitle in two different portions would be a clear hint for hackers that such two portions should be played back consecutively.

Thus, an advantage of a division according to the content may be that it is more difficult to determine the first order since it is not easy to guess a portion that is subsequent to another (preceding) portion in the first order based on the beginning and/or end of the subsequent/preceding portion. Moreover, it will be difficult or impossible to use automated copy programs that may try to use picture or audio patterns of the portions in order to try determining the first order.

Also, in case the AV data is encoded according to the MPEG-2 standard, the cuts may be such that a resulting portion starts with a full frame, e.g. an I-frame. In case the AV data is encoded according to the MPEG-4/H.264/AVC standard, the cuts may be set such that a resulting portion starts with a full frame, e.g. a IDR frame. An advantage of this is again that the resulting portions may not need to be re-encoded. In fact, the AV data may only need to be split up and the original coding of the AV data may be used. This will help to have a simple work-flow when using the method for copy protection in practice, e.g. in a process of manufacturing copy protected record carriers. The AV data can be delivered encoded and the original encoding be used throughout the manufacturing process.

As seen at S112 in FIG. 1 and as will be mentioned in further embodiments detailed below, files or clips (e.g. portions) or other data such as e.g. program instructions is stored on a record carrier. This is done by modifying the physical structure of a recording medium. For example, if the record carrier is a hard disk, magnetic properties of the respective recording medium will be altered/modified in order to store the data. If the record carrier is an optical record carrier, e.g. optical disc, such as e.g. a DVD, BD and CD-ROM, pits and/or lands may be imposed onto the respective recording medium.

It should also be noted that throughout the description, the "first order" may also be referred to playlist. In this sense, the term "playlist" is understood as a list indicating a playback order for playback of files or clips of the list. The term "playlist" is not to be understood as being limiting to a certain standard, e.g. Blu-ray standard, where the term playlist may have a certain meaning. A playlist could likewise just mean that files stored on a hard disc will be reproduced in the order defined by the "playlist". Since the "second order" determined the order for the physical storage on the record carrier, the second order may also be referred to as "storing order".

As mentioned, the basic principle of dividing a AV data into a plurality of portions is applicable to many different types of record carriers and/or downloaded/streamed data. However, in the following, for illustrative purposes only, examples for exploring the above concept are explained at the hand of a Blu-ray (BD) disc.

Figure 2:
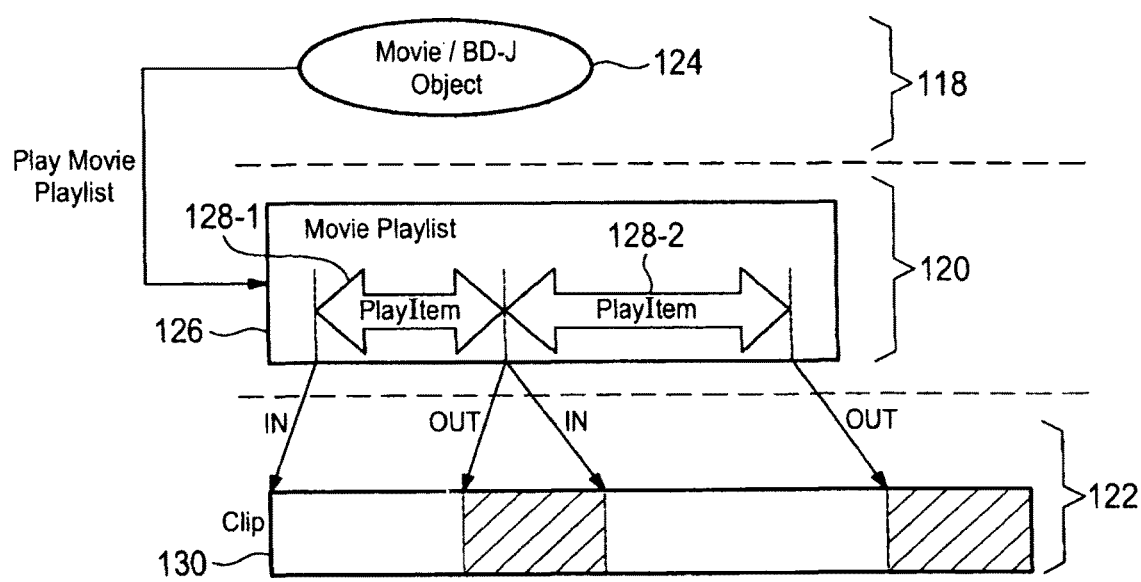
FIG. 2 shows an embodiment where the record carrier is a Blu-ray (BD) disc and playlists are used to playback audiovisual content stored on the disc.

As shown in FIG. 2, the audiovisual data on a BD is organized in different logical layers 118, 120, and 122. Three layers may be important in the context of dividing/slicing AV data and reproducing the first order at playback as explained above:

Layer 118: Movie Object/BD-J-Object 124
Layer 120: Movie playlist 126 that contains PlayItems 128
Layer 122: AV Clip Files (hereinafter referred to simply as "Clip")

The Clip 130 contains the actual audiovisual data, i.e. the data that can be interpreted as sound and images. Apart from the actual audiovisual data the clip 130 may contain some metadata in form of a presentation graphics stream or an interactive graphics stream. The presentations graphics stream may e.g. be used for displaying subtitles. The interactive graphics stream may be used for displaying interactive menus. In fact, the clip 130 may be referred to as a container for audiovisual content, i.e. it may contain primary audio and video, secondary audio and video, presentation graphics (e.g. subtitles), and interactive graphics (e.g. menus with button navigation commands).

The movie playlist 126 is a collection of the PlayItems 128. Each PlayItem 128 represents an interval of a single clip 130 and consists of a start time (IN-point) and an end time (OUT-point), both of which refer to points in the playing time of the associated clip.

The movie Object and/or BD-J Object 124 is/are responsible for triggering the playback of the playlist 126 and to provide navigational structure. A Movie Object 124 is an executable navigation command program and, as such, contains program instructions. A typical example for a navigation command is the command to play a playlist. Apart from the basic navigation commands, the BD standard provides an adaptable application environment that can be programmed by using the Java programming language. BD-J Objects are Java programs comprising program instructions that can be executed in this environment.

The hierarchy of layers 118, 120, 122 is shown in FIG. 2. It should be noted that this is a simplified illustration, which omits structures such as the index table.

From within the movie object or BD-J object 124 a "Play" command is issued for the Movie playlist 126, triggering the consecutive playback of the PlayItems 128-1, 128-2 contained in the playlist 126. Each PlayItem 128 references a (time-based) start and end position in a single clip 130. The content of the associated clip located between the start and the end position is played back for each PlayItem 128. Note that different PlayItems 128 contained in a single playlist need not all reference the same clip. In the example of FIG. 2, the shown playlist plays only the portions of the clip which are not shaded.

If the record carrier 114 in FIG. 1 was a Blu-ray disc and the playlist 126 would include the first order, then PlayItems 128-1, 128-2 and the following PlayItems (not shown in FIG. 2) could reference the portions 108-1, ..., 108-4 by respective IN-points and OUT-points.

In the following description, in most of the examples AV data is provided as a (primary) AV file or clip that would conventionally written to a record carrier in one file or one same area. Moreover, the AV file is then explained as to be split into a plurality of (secondary) files or clips. The secondary files or clips correspond to the portions 108-1, 108-4 of FIG. 1. This should not be seen as limiting in any sense. As explained at hand of FIG. 1, a plurality of portions (the portions 108-1, ..., 108-4) may be stored on the record carrier in one file (or clip in case of a Blu-ray disc) or alternatively/additionally a plurality of portions may be stored in separate files such that each portion is stored in one file or clip.

FIGS. 3A to 3C show an embodiment where clips 132-1, 132-2, 132-3 that would usually (conventionally) be stored on a Blu-ray disc in respective single files are divided (sliced) into smaller clips 140 that are then stored on the Blu-ray disc, e.g. a prerecorded (original) Blu-ray disc.

FIG. 3A shows how a conventional Blu-ray disc might look like. The example of FIG. 3A is simplified in that the simplified model of FIG. 2 is used and it is assumed that a BD title is stored with no extra features. There is only a first clip 132-1 that may e.g. correspond to a trailer, a second clip 132-2 that may e.g. correspond to a main movie and a third clip 132-3 that may correspond to some promotional content that should be played after the main movie. As seen in FIG. 3A, a single movie/BD-J object 134 is responsible for triggering playback of the movie playlist 136. In the example of FIG. 3A, the movie playlist 136 contains three PlayItems 138-1, 138-2 and 138-3, i.e. one PlayItem for each of the three clips 132-1, 132-2, 132-3 contained on the conventional Blu-ray disc. The IN-points and OUT-points of each PlayItem 138-1, 138-2, 138-3 correspond exactly to the beginning and the end of the associated clips 132-1, 132-2, 132-3. This means that once playback of playlist 136 is triggered, the three clips 132-1, 132-2 and 132-3 are each played from the beginning to end in consecutive order.

In order to copy protect the clips 132-1, 132-2, and 132-3 (AV data), the clips are divided or sliced into a number of smaller clips 140-1, ..., 140-6 (portions). The clips 140-1, ..., 140-6 may correspond to a video sequence of approximately one minute of playback time. In other embodiments, the clips may have a length in the ranges of 30 seconds to one minute, one minute to three minutes, three minutes to five minutes and/or five to ten minutes. The clips need not have the same length for each of the files.

According to the present BD standard, the upper limit for the number of clips on one disc is 4000. This may be taken into account when slicing the AV data.

As shown in FIG. 3B, it is not necessary that every original clip 132-1, 132-2, 132-3 be divided into a smaller clip (a portion of the original clip). For example, original clip 132-3 (AV data) is not divided into smaller clips. Thus, it is possible to apply the principle of dividing AV data into a plurality of AV portions selectively. For example, if the third clip 132-3 contained promotional content or advertisements, there may be no need to copy protect the third clip 132-3 by dividing it into smaller clips (and apply the shuffling as detailed below when describing FIG. 3C).

In a further embodiment, it is also possible to divide only a part of a (primary) clip into smaller clips (portions) and leave the rest intact. For example, it may be possable to leave the beginning of a movie intact to make copiers and rippers believe they have succeeded when they only view the beginning of copied content. However, then the end of a (primary, original) clip may be divided such that the end of a movie would be scrambled if the movie would be viewed in the scrambled order (cf. FIG. 3C).

Moreover, if there is one larger AV file stored on a disc, copiers may only copy this long AV file not noticing that the smaller AV files belong to the end of a movie. Thus, the experience of a viewer is very poor because he might miss the end of a movie.

As seen in FIG. 3B, three clips 132-1, 132-2 and 132-3 are divided into six smaller clips 140-1, ..., 140-6. This is a non-limiting example for illustrative purposes. In real application, the number of clips (portions) can be significantly higher. For example, for a movie having a length of 120 minutes, there may be around 120 clips when the small clips have e.g. an average length of one minute. Thus, the number of clips (portions) depends on the length of the different smaller clips as well as on the strategy (e.g. only divide the beginning/middle/end of AV data) applied when dividing the original clips (AV data).

After the clips 132-1, 132-2, 132-3 have been sliced/divided the resulting smaller clips (portions) 140-1, ..., 140-6 have a first order. If the clips (portions) 140-1, ..., 140-6 are reproduced in that first order, the content of the (primary, genuine, original) clips 132-1, 132-2, 132-3 will be reproduced in the genuine playback sequence.

However, as shown in FIG. 3C, the clips 140-1, ..., 140-6 may be shuffled or scrambled. After shuffling/scrambling the clips 140-1, . . . , 140-6 have a scramble (second) order: 140-3, 140-1, 140-5, 140-2, 140-6, 140-4. The clips may then be stored on the BD in the scrambled order (second order). Thus, a physical or spatial position on the disc (record carrier) where a respective clip 140 (portion) is stored depends on the order after the shuffling/scrambling (cf. also record carrier 114 in FIG. 1). As is readily apparent, this will prevent hackers from extracting the clips in the sequence in which they appear in the file system of the disc, or as they physically appear on the disc.

As seen in FIG. 3C, the shuffling also interchanges clips 140 that did not originate from the same original clip. As is also clear, extracting the clips 140 in the order shown in FIG. 3C and in accordance with the file system or physical position on the disc and joining them into movie would result in a complete disorder. Not only would the original feature/content be completely out of logical order, there would also be short spans of trailer and promotional content showing up during playback if, as exemplified above, the clips correspond to a trailer, main movie and bonus material.

There is also the possibility to introduce new clips that can e.g. contain information on how to obtain a legal copy of the Blu-ray disc. These clips could be shuffled into the clips that result from the slicing/dividing. This option is not shown in FIG. 3, however, will be explained below (cf. e.g. FIGS. 6 to 8).

It may also, in a further embodiment, be possible to only store some of the sliced clips 140 on the disc, i.e. to not store all clips on the disc. The clips that are not stored on the disc might e.g. be provided on a server for download (cf. e.g. FIG. 9).

As evident from the examples of FIG. 1 and FIG. 3, the shuffling of the clips, i.e. determining the second order, may be done completely arbitrarily. However, it is also possible to control the shuffling such that a resulting Blu-ray disc comprising audiovisual files in the second order, is in conformity with the BD specification. This will allow a seamless playback, i.e. on a playback device there will be sufficient buffering to prevent pause or freeze frame in playback. According to the BD specification, the maximum distance for two clips to be joined seamlessly is (on a BD-ROM) 640000 logical blocks (intra-layer) and 40000 logic blocks (inter-layer). Therefore, in a further embodiment, the algorithm employed for shuffling, i.e. the algorithm for determining the second order, may ensure that two clips to be consecutively played back according to the first order are never further apart then 640000 logical blocks. In other words, a first AV portion and a second AV portion which follow each other consecutively in the first order corresponding to the order that allows playback of the AV portions to reproduce the genuine content have a physical distance from each other that is not larger than an allowed physical distance specified by a standard of the record carrier, e.g. BD specification. This will allow the AV portions to be reproduced seamlessly on any player that is in conformity with the respective standard. A record carrier where the portions are arranged in this manner may be referred to as being "in-spec", i.e. in conformity with a specification of a certain standard.

It should be noted, however, that empirical tests have shown that also much larger distances may work. Many players may e.g. have a larger memory than required by a certain specification such that it is possible to buffer a large amount of video data in order to allow a seamless playback.

In order to further improve the copy protection, the (first) order of the sliced clips should not be guessable easily. Therefore, the record carrier should not contain clues that would allow the reduction of the aforementioned effort. This may include, but is not limited to:

clues from the position of the clips on the record carrier;
clues from the naming of the files; and
clues from references within the data.

Thus, it is clear, that the reference numerals used e.g. in FIGS. 1 and 3 are certainly not a good option for respective file names. Such file names would make it easy to determine the first order which should of course be avoided. Also, as is clear certain patterns in the physical arrangement of the files on the disc should be avoided.

In order to further enhance the copy protection, the correct order (first order) of the sliced AV files may be stored on the record carrier in an obfuscated manner. A "key" or "key material" for de-obfuscation ("decryption") of the first order may e.g. be derivable from parameters of the disc like e.g. the integrity of the file system or encryption parameters, encryption characteristics, access characteristics of the drive for reading the disc and so on. It is also possible to read byte and/or bit values of encrypted content and use these byte values as key material for de-obfuscation (see e.g. FIGS. 19A-19J).

Further details on how a key may be derived will be given below. However, for a better understanding already now, the following should be noted:

Every record carrier has a certain physical structure and contains certain data stored thereon. Thereby, the physical structure of a pre-recorded record carrier is generally different from a copy of the pre-recorded record carrier e.g. on a recordable record carrier such as e.g. a recordable optical record carrier or hard disc. For example, if the pre-recorded record carrier is an optical record carrier, on the pre-recorded record carrier, certain patterns of pits and lands might exist that are different on the recordable record carrier, since e.g. a copier (e.g. copy program) cannot copy the certain patterns. On a pre-recorded record carrier the physical structure and data is inscribed in a glass mastering process and mass replicated via stamping, while on a recordable record carrier the physical structure is preinscribed and the data is burned with a high-power laser beam (by changing the transparency of a dye) in a recording device.

Also, e.g. if the pre-recorded record carrier has copy protected original data stored thereon and a recordable record carrier is a copy of the pre-recorded record carrier having copied data, the original data and copied data might be different. For example, in the copied data, encryption characteristics or encryption parameters of the original data might not be included. Further, e.g. the file system of the copied data might deviate from that of the original data.

Thus, from a pre-recorded (original) record carrier, certain original characteristic parameters (a "key") may be derived. These original characteristic parameters may depend on the physical structure of the pre-recorded (original) record carrier and/or on the (original) data stored on the pre-recorded (original) record carrier. The original characteristic parameters of the physical structure may be extracted from the pre-recorded carrier by a reading device, e.g. an optical pickup or a reading head of a hard disk, i.e. a reading device might be controlled to access the physical structure in a certain manner.

Also, from a recordable record carrier that is a copy of the pre-recorded (original) record carrier, certain copy characteristic parameters may be derived. These copy characteristic parameters may depend on the physical structure of the recordable record carrier and/or on the copied data stored on the recordable record carrier. The copy characteristic parameters of the physical structure may be extracted from the recordable carrier by a reading device, e.g. an optical pickup or a reading head of a hard disk, i.e. a reading device might be controlled to access the physical structure in a certain manner.

If the manner in which the copy characteristic parameters are extracted from the recordable record carrier is the same as for extracting the original characteristic parameters from the pre-recorded record carrier and if the copy characteristic parameters deviate from the original characteristic parameters, this may be used in various ways. For example, it could be used for detecting that data is read from a copy (original disc check). Moreover, the parameters could be used for various algorithms for copy protection.

Here, the original characteristic data and copy characteristic data may also be referred to as "key", "key material" or "key data" that is explored in various ways for copy protecting data, e.g. AV data, stored on a pre-recorded record carrier. The keys may e.g. be used as input data for algorithms for finding a correct playlist, authentication purposes e.g. at a server, controlling of playback quality (e.g. genuine or reduced quality), and/or preventing playback altogether.

Also, the key data (characteristic data) may also be determined dynamically. For example, if a program, e.g. a movie or BD-J object of a BD, is used for playback of AV content, the program may during playback, i.e. dynamically, at various times determine respective key data (i.e. original characteristic data if data is read from an original record carrier or copy characteristic data if data is read from a copy).

The first order may also be protected as shown in the embodiment of FIGS. 4A (showing the single correct movie playlist) and 4B (showing a large number of fake movie playlists). As shown in FIG. 4A, there may be one correct playlist 142 that comprises PlayItems 143-1, . . . , 143-6 referencing the clips 140-1, . . . 140-6 (same reference numerals as in FIGS. 3B and 3C) in the correct order (first order). Thus, as seen in FIG. 4A, the PlayItems 143-1, . . . , 143-6 reference the clips 140-1, . . . , 140-6 in ascending order. Of course, the physical access for playback of the clips 140 is dispersed over a wide range since the physical positions of the clips 140 are scattered across the disc. However, if playback of the correct playlist 142 is triggered, then the same sequence is played back that was played back in the original set-up as shown in FIG. 3A. Thus, e.g. first the trailer (clip 132-1) will be shown then the main movie (clip 132-2) and then the promotional content (clip 132-3).

If the shuffling was done so that the second order results in physical positions of consecutive clips according to the BD specification ("in-spec", see above), a seamless playback is possible on a BD player that is in conformity with the BD specification.

In order to avoid that the correct movie playlist 142 (first order) be easily derivable from the disc, or from elsewhere, it is possible that a large number of fake playlists (further first orders, i.e. further playback orders) is created and stored on the disc. As shown in the example of FIG. 4B, there may be n playlists 144-1, . . . , 144-n created. In other words, a plurality of further playback orders may be determined and stored on the record carrier, wherein the further playback orders are different from the first order and possibly also different from each other (the latter is not necessary).

If all of the playlists, i.e. the correct playlist 142 as well as the further playlists ("fake playlists", further first orders) 144 are stored on the disc, and if there are a large number of further playlists 144, it will be a difficult task for a copier to find out which of the playlists is the correct one, i.e. the first playlist is obfuscated. This may be especially the case if the original clips are divided at places where scene changes occur in the original video content and a large number of fake playlists appear to result in similar content reproduction at first sight. Additionally, the content reproduction when using any of the further playlists (further first order) could be similar to the content reproduction when using the correct playlist (i.e. the first order). In other words, in a further embodiment, it is possible that the correlation of all playlists stored on the disc (i.e. the correct playlist and the fake playlists) is high, i.e. all playlists result in a content reproduction that is similar at first sight. This makes it difficult for copiers to determine the correct playlist (first order) among the fake playlists (further first orders). A determination by hand is difficult since all content reproduction seem similar at first sight and a determination automatically is also difficult for the same reason and also since the correlation between all playlists stored on the disc is high, so that the correct playlist may not easily be determined by e.g. automatically determining a correlation or other similarity measure. Of course, not all playlists stored on the disc must be similar. It could also just be a part. This could also confuse copiers.

According to the BD-ROM standard/specification, there are 2000 playlists allowed. Thus, in the example of FIG. 4B, n may be equal to 1999, i.e. there may be up to 1999 fake playlists (further first orders) stored on the disc. Of course, different values for n are possible. Reasonable values of n may be 10, 100, 200, 300, . . . , 1999.

In order to playback an original Blu-ray disc that is copy protected by (i) dividing original clips into smaller clips and (ii) storing a large number of fake playlists on the disc, it is necessary to find out the correct playlist when a user wants to playback the content stored on the disc.

Figure 5A:
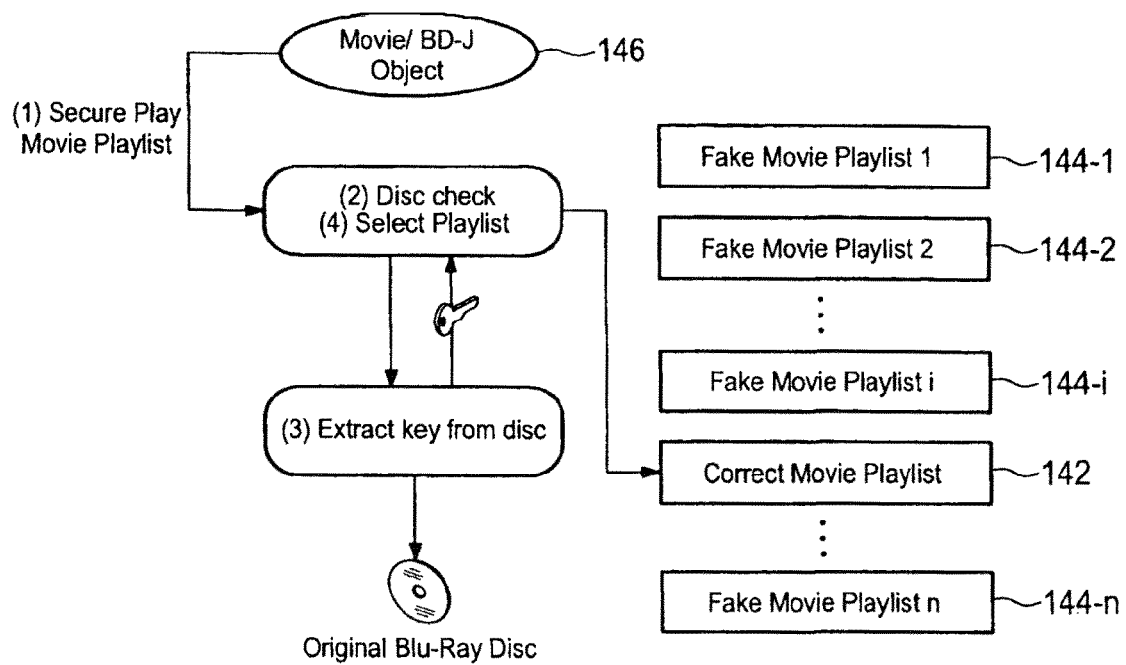
FIG. 5A shows how playback of an original (pre-recorded) record carrier works.

Therefore, as shown in FIG. 5A, a new movie/BD-J object 146 may be created. This BD-J object may contain program instructions (code) to check if the Blu-ray disc from which content is played back is an original or pre-recorded disc or whether the disc is a copy or playback is from a hard disc ("ripped content"). This original disc check may be performed in many different ways. Details are given below (see also e.g. FIGS. 12 to 20).

Figure 5B:
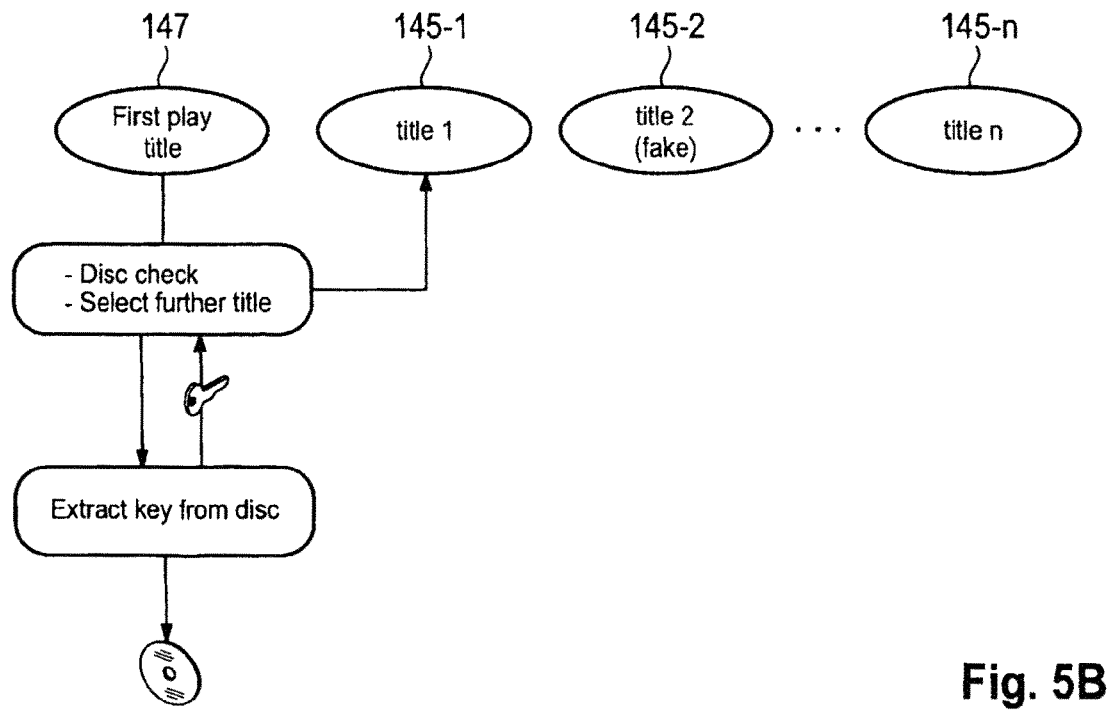
FIG. 5B shows an embodiment with additional (fake) titles.

In a further embodiment shown in FIG. 5B, it is also possible that "fake titles" (additional titles that are created for obfuscation purposes) are stored on the Blu-ray disc. The BD standard allows having up to 999 titles (BD-J objects and/or Movie objects) on one disc. According to the further embodiment with "fake titles", there may be stored on the disc only one or a predetermined number of "correct titles", i.e. titles that will lead to playback of the original AV content in the genuine playback sequence. In the example of FIG. 5B, there is only one correct title 145-1 and the titles 145-2, . . . , 145-n are additional (fake) titles that will not lead to playback of the content in the genuine playback sequence or genuine quality.

The playback may be initiated by selecting the First Play title (FP title) according to the BD standard (referenced by index "−1" in the index table). It would also be possible to initiate playback by the Top Menu title (referenced by index "0" in the index table).

The correct titles may be discriminated from the fake titles in the same manner as the correct playlist (first order) from the fake playlists (further first orders), i.e. by extracting "key parameters" from the disc and using these as input data for program instructions that then select the correct title for playback of the content. Also, it is possible, that one title on the disc only plays back a portion of the AV data (original content) and another title is dynamically determined during playback of the disc, which other title then is responsible for playing back the remaining portion of the AV data. In each of the titles, again several playlists could be included, wherein only one or a predetermined number of playlists lead to playback in the genuine playback sequence.

In FIGS. 5A and 5B, based on the result of the disc check, different options exist. If the disc check succeeds, then the BD-J object 146 may trigger playback of the correct movie playlist 142 and/or correct title 145-1 as opposed to a fake title 145-2. If the disc check fails, then an appropriate message may be displayed to a viewer or a random playlist/title, i.e. a fake playlist 144 and/or fake title 145-2, may be used for playback. The information which playlist/title is the correct one may be available to the BD-J object 146 only in encrypted form. In order to decrypt this information, data (original characteristic data, see definition above) from the original disc may be required. For example, a BD-J object of a title may decrypt, i.e. discriminate a correct playlist 142 from the fake playlists 144-1 to 144-n and a correct title 145-1 from all of the titles 145-1, . . . -145-n, based on encryption characteristics or parameters such as e.g. AACS characteristics (also referred to as "parameters"). Moreover, such parameters as e.g. a PMSN (pre-recorded media serial number) or a volume ID stored in the ROM mark may be used. Also, AACS encrypted content could be used. In this case when copy protecting the disc, the BD-J object, a part thereof (e.g. a Java Class File, see e.g. FIG. 19E), and/or a playlist may be created based on AACS encrypted content (by reading bytes at certain positions, cf. FIGS. 19A to 19J). In other words, only if content is AACS encrypted, the BD-J object will be able to determine the correct playlist 142 among the fake playlists 144-1 to 114-n and/or the correct title among the titles 145-1, . . . , 145-n. Thus, in this case the correct playlist 142 and/or correct title 145-1 may be determined dynamically during playback. In other words, the playlist 142 and/or the title 145-1 might not at all or not completely be known to a player at the beginning of playback.

This is a dilemma for copiers: If they remove the AACS encryption they cannot use the original BD-J object any longer for genuine playback since the BD-J object may only be used for determining the correct playlist if the encrypted content data (original characteristic data) is used as input data. On the other hand, if the AACS encryption is not removed it is very difficult or impossible to make a copy from which the content can be played back. This will also be detailed below.

Moreover, in addition, to selecting a correct playlist from a large number of playlists (including fake playlists) it is also possible to select an angle (see embodiment in FIG. 8) or sub-path (see embodiment in FIGS. 21 to 24) depending on the "key" (characteristic data extracted from the disc, i.e. the original characteristic data in case of an original and the copy characteristic data, see above). In other words, the title (BD-J object and/or Movie object), the playlist, the angle and the sub-path may all in various combinations be selected depending on the "key" extracted from the disc. In each case, there maybe "fake" instances, e.g. fake titles, fake playlists, fake angles and/or fake sub-paths that need to be discriminated from the correct titles, playlists, angels and sub-paths in order to have the original content reproduced in the genuine playback sequence and/or genuine quality. Thus, there is a powerful toolbox for designers of a copy protection scheme for one individual disc. For example, on one disc, the designer may choose to only work with the concept of additional (fake) angles and titles, whereas for another disc, the designer may only use the concept of additional (fake) playlists. This will confuse copiers, since an extremely large possibility for obfuscation of the correct playback of the clips, files, and/or portions of a disc can exist.

FIGS. 5A illustrates playback with the original Blu-ray disc in place, i.e. in a player. For secure playback, the BD-J object 146 checks the disc and extracts a "key" (key material) from the disc. The "key" corresponds to the data mentioned above from the original disc, such as e.g. encryption parameters, PMSN, volume ID, portions of AACS or otherwise encrypted content and/or the like. Also, access characteristics of an optical pick-up when accessing the AV portions or files may be used for key purposes. This may e.g. help detecting if the second order, i.e. the order in which the files are physically stored on the (original) disc, has been modified. With the key as input data the BD-J object can discriminate the correct playlist 142 from the plethora of available playlists 144-1, . . . , 144-n (fake playlists).

It should be noted that the "key", that may also be referred to as characteristic parameters of the disc, may only be read/determined from an original (e.g. pre-recorded) disc or a "managed copy" of an original disc and cannot be transferred to an illegal copy or to a hard disc. As "managed copy" a copy managed according to the AACS specification is meant. For example, it is not possible to transfer a PMSN or volume ID stored in a ROM mark onto an illegal copy. Also, encryption parameters such as e.g. AACS parameters/folders may not have been transferred to an illegal copy. If the key depends on such parameters, then it will not be possible to discriminate the correct playlist, title, angle, and/or sub-path from the fake playlists, fake titles, fake angles and/or fake sub-paths when playback is from an illegal copy.

In order to support "managed copies" according to the AACS standard, it may be useful to adapt the program instructions for determining the correct playlist, correct title, correct angle, and/or correct sub-path such that the PMSN is not used as key material since the PMSN cannot be transferred properly onto a recordable disc. On the other hand, it may be possible to design the program instructions, such that if a "managed" (i.e. legal) copy is detected, the PMSN or volume ID is read in modified form from the managed (legal) copy.

Furthermore, the operation of the BD-J object 146 may be secured from inspection: the employed code obfuscation method may make it impossible to "eavesdrop" on the operation of the disc check and key extraction and movie playlist/title/angle/sub-path selection. For this purpose, in a further embodiment, the program instructions for discriminating the correct and the fake playlists/titles/angles/sub-paths may be intertwined with other program instructions of the BD-J object which are e.g. used for controlling playback, subtitles, languages, user interaction, navigation commands or a menu that will be displayed to a viewer e.g. when the disc is inserted into a player or upon requesting the menu by operating a respective key e.g. on a remote control. It would also be possible to create fake ("dummy") instructions leading to long code.

As is clear from the example, for a user owning the original Blu-ray disc with the scrambled AV files, the copy control mechanism is completely transparent. The viewing experience is exactly the same as if a non-protected disc was played, i.e. a disc without the scrambled small AV files.

Figure 6A:
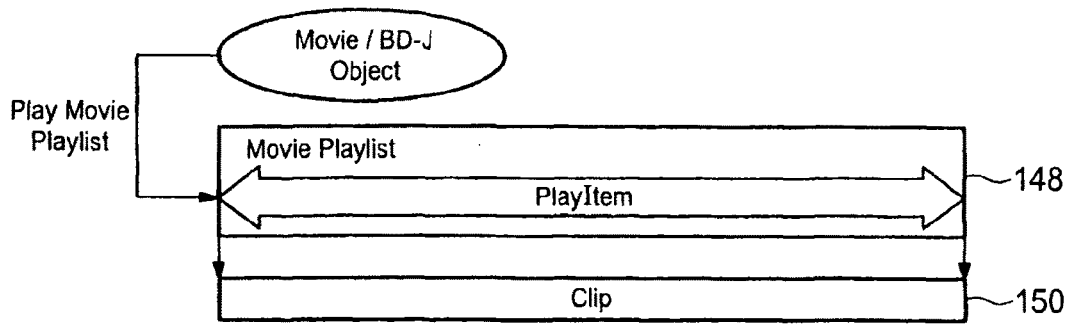
FIGS. 6A to 6C show an embodiment where additional files are included on the record carrier.
Figure 6B:
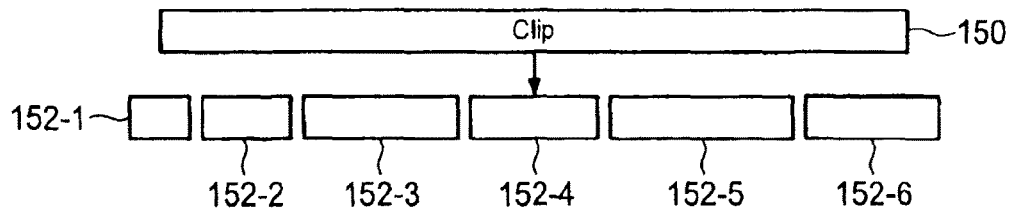
Figure 6C:
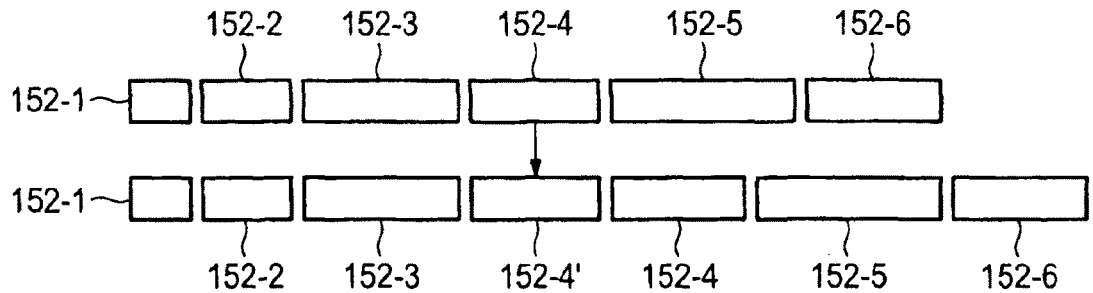

FIGS. 6A to 6C show a further embodiment where besides clips which contain portions of a primary (genuine) AV file 148, e.g. comprising a movie, additional clips (see e.g. clip 152-4') may be added. As seen in FIGS. 7A to 7D, the additional clips may be referenced by fake movie playlists and, thus, serve for copy protection purposes. The additional clips (additional files) may include but are not limited to advertisement content (e.g. genuine clips with superimposed promotion content), clips with copyright information, information on how a legal copy of the record carrier could be obtained, genuine clips with reduced entertainment value (e.g. by distortion or removal of content), copy barriers.

A "copy barrier" may be an unreadable or non-reproducible area or region of a disc or a file that cannot be read by a player e.g. since it contains a certain physical structure that will cause a player to abort or slow down a reading of the disc. Such areas are e.g. described in European patent application EP 1 818 924 A1 the contents of which is hereby incorporated by reference.

FIG. 6A shows a single clip (AV data) 150 that should be written to a Blu-ray disc in a copy protected manner. If clip 150 was written to a conventional disc without copy protection by slicing/shuffling as explained above, a playlist 148 referencing a single PlayItem would be used.

In order to copy protect clip 150, clip 150 is sliced into a number of smaller clips 152-1, . . . , 152-6, as shown in FIG. 6B.

As shown in FIG. 6C, an additional clip 152-4' (additional file) is inserted. This additional clip 152-4' may contain junk data or any of the other types of content mentioned above, e.g. advertisements, copyright information and so on. Also, the additional clip 152-4' might contain a copy barrier as detailed above.

The insertion of additional clips such as clip 152-4' can of course be combined with clip shuffling. In other words, the order of clips 152-1, . . . , 152-6, and 152-4' may be scrambled. This is shown in FIGS. 7A and 7B. FIG. 7A shows the correct movie playlist 154 which puts the shuffled clips 152-1, . . . , 152-6 back into the original order (first order). Note that playlist 154 does not include a PlayItem PI referencing additional clip 152-4'. Thus, this additional clip 152-4' will not be played back/accessed during playback using playlist 154.

Thus, e.g. advertisings may not be reproduced when using playlist 154 for playback. Moreover, if the additional clip 152-4' contained a copy barrier, a reading process of the disc might not be disturbed by an unreadable or non-reproducible portion/sector.

As seen in FIG. 7B, apart from this correct playlist 154 other playlists 156 (further first orders) may exist. While FIG. 7B only shows one such additional playlist, in practical applications there could be a large number of additional playlists (further first orders) as explained above, e.g. up to 1999 playlists. In fact, as explained above, a large number of fake playlists 156 may be advantageous since it will not be easy to find out which among the large number of playlists stored on the disc is the correct one. The difference to the examples in FIGS. 3A to 3C and FIGS. 4A and 4B is that the fake playlists 156 can now also reference the additional clip 152-4' as shown for the playlist 156. Note that this is not necessarily the case for all fake playlists (all further first orders). In other words, there may be fake playlists that reference the additional clip 152-4' whereas other fake playlists on the same disc do not reference the additional clip 152-4'. As mentioned, the additional clip 152-4' may contain junk or advertisement content.

If the additional clip 152-4' includes a copy barrier (see above), then a reading process of the disc may be disturbed or aborted. Thus, this adds a further measure for enhancing copy protection since it is possible that all or the majority fake playlists reference an additional clip with a copy barrier. This way, reading unless with the correct playlist may be completely prevented.

Depending on the desired reduction in the viewing experience, the creation of "advertisement playlists" is an option. An example of an advertisement playlist 157-A is depicted in FIG. 7C. The advertisement playlist 157-A may allow reproduction of the genuine playback sequence: as indicated by the arrows, the PlayItems PI subsequently reference clips 152-1, 152-2, 152-3, 152-4', 152-5, and 152-6. However, some of the movie clips, in the example clip 152-4, may be replaced by advertisement clips, in the example by clip 152-4, where e.g. advertisement is displayed as overlay.

Adding additional clips is of course also possible as shown in FIG. 7D. As seen, playlist 157-B references, by a PlayItem 155, a clip 152-7. As indicated by the arrows, playlist 157-B will lead to subsequent playback of the clips as follows: 152-1, 152-2, 152-3, 152-4, 152-7, 152-5, and 152-6.

Clip 152-7 may include advertisements (e.g. a commercial). Thus, e.g. a movie will be reproduced with commercial breaks.

The embodiment of FIG. 7D could be used as follows: All of the fake playlists (further first orders) on a disc may in fact allow reproduction of the genuine AV content (AV data) in the genuine playback sequence. However, all or the majority of the fake playlists may include references to clips with advertisements as e.g. clip 152-7 in FIG. 7D. This way, if a copy is made, the movie may always be played back in the correct order but with commercial breaks unless the correct playlist (first order) is known or can be derived as explained.

Figure 8:
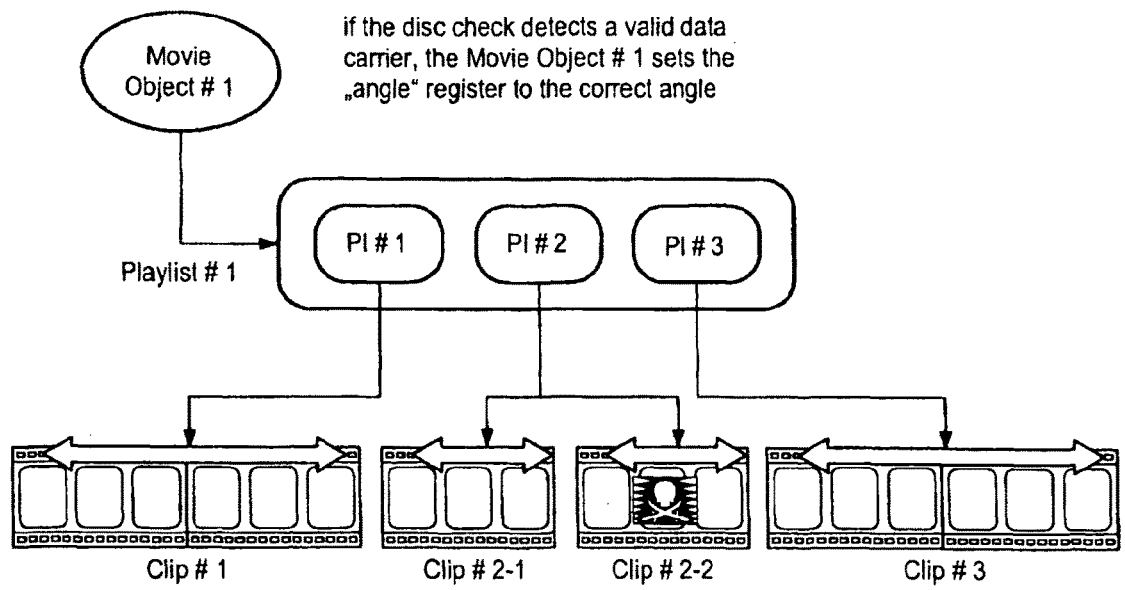
FIG. 8 shows an embodiment where the feature of multiple viewing angles of the Blu-ray standard is applied.

FIG. 8 shows a further embodiment where a feature of the Blu-ray standard/specification referred to as "multi-angle" is applied.

The Blu-ray standard allows for some portions of a title (movie) to be played back in multiple angles which may be chosen by the user or may be set by a BD-J object or Movie object.

According to the embodiment of FIG. 8, a technique may be employed that is similar to the copy protection with multiple playlists. A BD-J object or Movie object may be inserted that checks for the original disc during playback. If the disc check succeeds, i.e. a disc is deemed to be an original disc, then a register is set which will lead to playback of the correct angle, i.e. the correct angle of a part of the original AV data is selected. If, however, the check fails, the register may be set differently, e.g. such that another angle (fake angle) will be played back. This other angle may reference a clip with arbitrary AV content.

Thus, the "fake angle" may contain arbitrary audiovisual content. The correct angle may contain the correct sequence (portion) from the main movie (AV data), whereas fake angles may contain corrupted versions, an empty video, advertising clips, or a copy barrier for example. This is illustrated in FIG. 8. As shown, there is additional clip#2-2 stored on the disc. This additional clip#2-2 corresponds to "arbitrary" audiovisual content, i.e. non-desired content that distracts the user and/or reduces the entertainment value when played instead of the original clip#2-1 that corresponds to a part of the original AV data. Also, reading of the disc may be disturbed/aborted if the clip#2-2 included a copy barrier.

Figure 9:
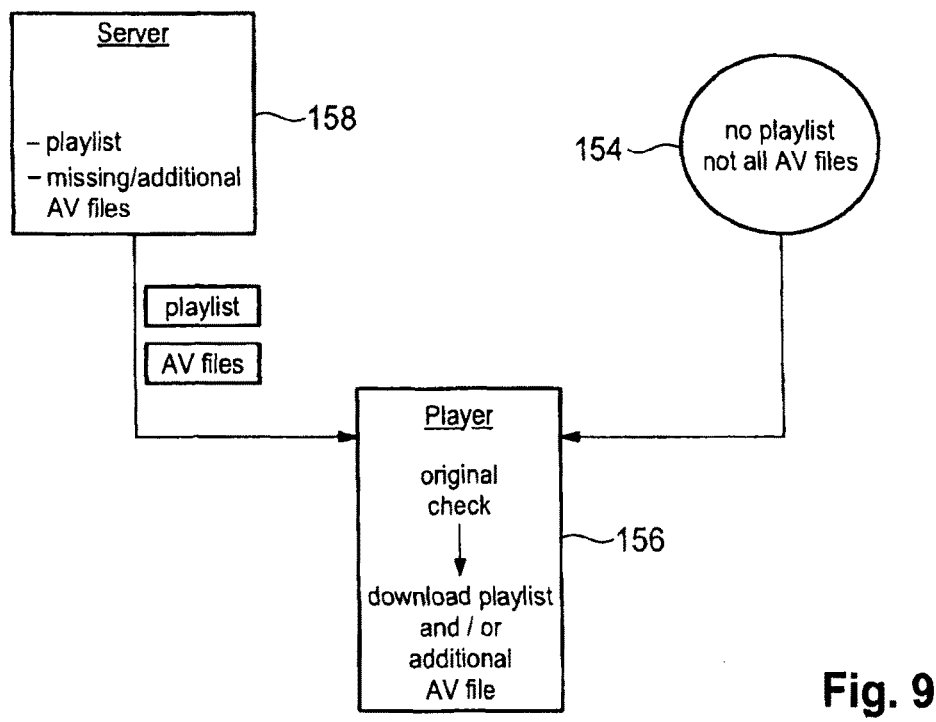
FIG. 9 shows an embodiment where a playlist is provided from a server.

In a further embodiment shown In FIG. 9, a record carrier 154, e.g. a Blu-ray disc, does not have a playlist stored thereon. Additionally and/or alternatively the record carrier 154 may not include all sliced portions of the original AV data.

Since no playlist is provided on the record carrier 154, the record carrier 154 will not playback in a player 156 if the player requires a playlist for playback of the AV files stored on the record carrier 154. Thus, if a copier makes a copy of record carrier 154, the copy might be completely useless since it does not contain a playlist, i.e. the playlist is missing. If there is no way for the player to determine the playlist e.g. by downloading it from a server 158 or accessing it from a removable storage media, the copy is useless. Moreover, if the record carrier 154 comprises sliced AV files of e.g. one minute length, and these sliced AV files are stored on the record carrier 154 in a scrambled (second) order as explained, it will be even more difficult for a copier to reproduce the genuine AV file in the (correct) genuine playback sequence as created by the director or moviemaker of the video content.

As already indicated, there is also an embodiment possible where the record carrier 154 does not comprise all AV portions in order to completely reproduce the AV data. In other words, after slicing the AV data into a plurality of portions as explained above, at least one of the portions might not be included/stored on record carrier 154. Of course it is possible to select this missing portion such that the missing portion might e.g. contain a key scene of a movie (a part of the AV data that is important for a viewer to logically understand the content of the AV data). Thus, a copy of such a record carrier 154 without some of the portions of the AV data, e.g. a key scene of a movie, will have a severely reduced entertainment value for a viewer since he might be missing important portions of content of the AV data, e.g. the movie.

In order to playback a record carrier 154 without a playlist and/or without all AV portions necessary to completely reproduce the genuine AV file, a player 156 may download the playlist and/or additional/missing AV files from a server 158. Alternatively, the player may also read the playlist and/or additional/missing AV files from a removable or fixed storage media that can be inserted/removed into/from player 156.

In either case, the distribution of the (missing) playlist and/or additional/missing AV files may be done independently from distributing the record carrier 154.

Of course, a download may require that an original disc check performed on player 156 be successful. In other words, only if player 156 determines that an inserted record carrier is an original record carrier (e.g. pre-recorded record carrier), the player 156 will be able to download the correct playlist and/or additional AV files. If the original disc check fails, the server may still provide a playlist or additional files. However, the provided playlist may be a fake playlist as detailed above. Also, the provided additional files may comprise advertisement.

As mentioned, the AV files downloaded from the server might be small slices, i.e. portions, of the genuine AV file. These slices may have a length of e.g. one minute, two minutes, three minutes, five minutes and/or ten minutes. Thus, the sliced AV files are rather small in size and consequently only require little bandwidth when transmitted from server 158 to player 156. Thus, an effective copy protection with only little bandwidth requirement may be realized.

Also, transmitting a playlist from the server 158 to player 156 requires only little bandwidth. Thus, also in an embodiment where all AV portions are on the disc but no playlist is stored on the disc, an effective copy protection with only little bandwidth requirement may be realized.

Thus, as shown in FIG. 9, there is an embodiment where at least one of a plurality of AV portions (sliced portions) is stored on server 158 and not stored on the record carrier 154.

When downloading the playlist, it may also be possible that this is only admitted if a hardware identifier of a playback device, e.g. a PC identifier of a PC, used for downloading is transmitted to the server first. For example, if a software player on a PC is used as playback device as e.g. shown in FIG. 18, an installed native module could transmit the PC identifier to the server.

It is also possible that the record carrier 154 comprises a playlist, however, this playlist may not be the correct one, i.e. it does not allow playback in the genuine playback sequence and/or genuine quality. Playback with the playlist stored on the disc might lead to dissatisfying reproduction of the genuine AV file. It is also possible that record carrier 154 comprises AV files with advertisements. In this case, a playlist stored on the record carrier 154 may reference such AV files comprising advertisements. Moreover, there may be provided a playlist on record carrier 154 allowing reproduction of content, e.g. a movie, in the genuine playback sequence, however, interrupted by advertisements (commercial breaks). In order to enjoy the content (movie) without advertisements, another playlist might be necessary. This playlist may be provided by server 158 once player 156 determined an inserted record carrier to be an original record carrier and not a copy.

Such an embodiment may in fact impose less restrictions on allowing copies of the record carriers including the advertisements since a manufacturer of a record carrier might have an income (revenue) from the advertisements stored on the record carrier. However, in order to avoid that a copier simply removes the advertisements, it may be useful to divide/slice and shuffle as described above.

In the context of a Blu-ray disc, the feature that might be used to realize an embodiment as shown in FIG. 9 is what is referred to as "progressive playlist". This BD-ROM feature makes it possible to play a playlist with streaming-like playback, i.e. downloading stream data from a website. Thus, not all clip AV streams from a progressive playlist have to be available before playback begins. Thus, the playback of a playlist may start and the correct additional data is downloaded or extracted from the disc only if the original disc check at the player succeeds. If the disc check fails, the additional data that is either provided from the disc or from the server may be junk data, completely missing and/or advertising content. Also, non-reproducible content that will cause a player to stop playback may be provided from the server. Downloading content from a website may require a BD-ROM player with BD profile 2.0 or BD profile 2.x. In order to combine the downloaded content in the local storage (or from the disc extracted content) with content from the record carrier, the VFS (virtual file system) needs to be used (VFS update).

The virtual file system and progressive playlists may be used to start the playback of the correct downloaded additional data only if the original disc succeeds. Additionally, the pre-recorded media serial number (PMSN) may be used for downloading individual, unique content for every disc (e.g. automatically generated). The PMSN is a unique serial number which can be added to each BD-ROM, e.g. for online authentication for managed copy.

Thus, it is possible to download a unique playlist for each individual disc.

This feature may be advantageously used in an embodiment where at least a part of the AV portions of the AV data are watermarked. Thus, a downloaded unique playlist may be used for watermarking purposes as e.g. shown in FIG. 10A.

Figure 10A:
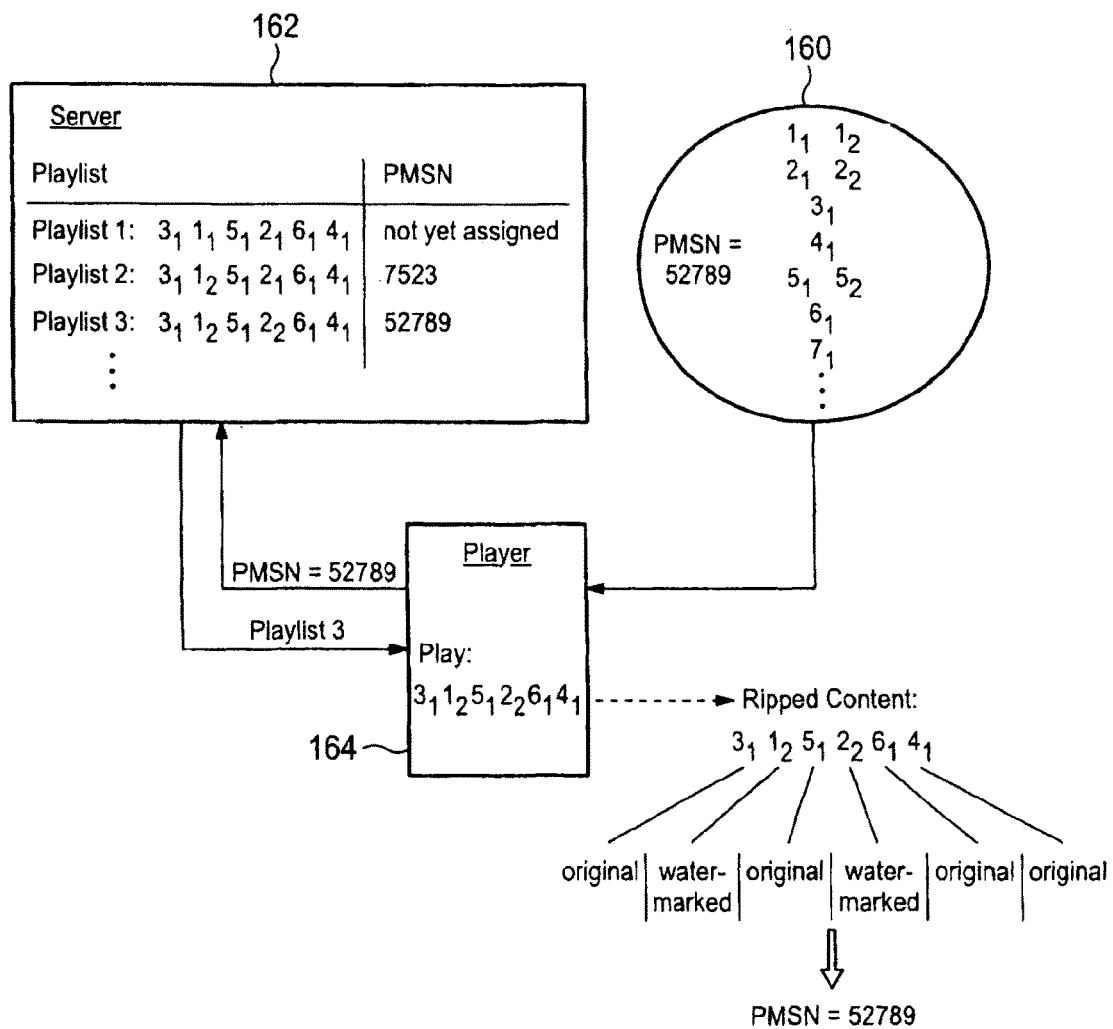
FIG. 10A shows an embodiment where watermarked audiovisual files are included in playlists.

As shown in the embodiment of FIG. 10A, a record carrier 160 may comprise a plurality of AV portions $1_1, 1_2, 2_1, 2_2, 3_1, 4_1, 5_1, 5_2, 6_1, 7_1, \ldots$.

In this notation, the index "1" denotes an AV portion without a watermark and the index "2" denotes an AV portion with watermark. For example, AV portion $1_1$ is an AV portion without a watermark and AV portion $1_2$ comprises the same AV content as AV portion $1_1$ but with a watermark. Thus, AV portion $1_1$ may be referred to as an "original" AV portion and AV portion $1_2$ may be referred to as a copy of the original AV portion $1_1$ with a watermark. It may be possible that all of the AV portions stored on record carrier 160 exist in two instances, in one instance with a watermark and in one instance without a watermark. However, as seen in FIG. 10A, this is not necessary. On record carrier 160 only AV portions 1, 2, and 5 are stored twice, i.e. ones without a watermark and ones with a watermark.

Note that on record carrier 160, the AV portions $1_1$, $1_2$, $2_1$, $2_2$, $3_1$, $4_1$, $5_1$, $5_2$, $6_1$, $7_1$, . . . may be (physically) stored in a scrambled order as explained above. This, however, is not necessary. However, it may be advantageous in that it prevents easily copying the content.

By providing originals and copies with watermarks of AV portions on record carrier 160 it is possible to create playlists where a copy with a watermark is played/reproduced instead of the original AV portion. Moreover, it is possible to define a plurality of "correct" playlists that all allow reproducing the AV portions such that the content is reproduced in the genuine playback sequence. In other words, there may exist a plurality of first orders that all allow reproducing the content in the genuine playback sequence.

This is illustrated in the table depicted inside server 162 in FIG. 10A. Note that the usage of a plurality of "correct" playlists in a server/player environment is not necessary. It may also be possible to provide the plurality of "correct" playlists on record carrier 160 and select one of the playlists depending on characteristic parameters (i.e. a key) extracted from the disc.

As seen in the table depicted inside server 162, there are for example the following three playlists possible that are all correct, i.e. allow reproduction of the genuine playback sequence:

$3_1 1_1 5_1 2_1 6_1 4_1$
$3_1 1_2 5_1 2_1 6_1 4_1$
$3_1 1_2 5_1 2_2 6_1 4_1$

All of these three playlists 1-3 are "correct" playlists that will playback the content of the AV data in the genuine playback sequence. However, since some of the AV portions comprise a watermark, it is possible to identify the playlist that has been used when reproducing the genuine content. For example, if the AV portions $3_1 1_1 5_1 2_1 6_1 4_1$ are reproduced, then the first playlist was used.

By using this concept of using original AV portions and watermarked copies for playback and due to the fact that the AV portions are rather small in size, it is easily possible to create a very large number of "correct playlists". The number of possible correct playlists grows exponentially with the number of pairs of copies/originals of AV portions. Under the assumption that no further copies of AV portions are stored on record carrier 160, it would be possible to create $2^3=8$ different correct playlists since there are three pairs of original/copy of AV portions.

The idea of using pairs of copy/original of AV portions may be explored in various ways. As already indicated, it may be possible to store a larger number of correct playlists on the record carrier. Then, the playlist that will be selected during playback may depend on a characteristic value extracted from record carrier 160. For example, the pre-recorded media serial number (PMSN) may be used as a characteristic value. However, any kind of key as explained above and below might be used for determining a playlist that will be used for playback. Thus, in this embodiment it will be possible to determine by analyzing the reproduced content which unique record carrier was used for playback.

It is also possible that no correct playlist is stored on the record carrier 160 and the different "correct" playlists be stored on server 162. When the record carrier 160 is inserted in a player 164, the player may perform an original disc check as explained above. Once the player has determined that it is an original disc, the player may transmit a unique identifier of record carrier 160 to server 162. A unique identifier might e.g. be the PMSN of a Blu-ray disc. In the embodiment of FIG. 10A the PMSN of record carrier 160 is e.g. PMSN=52789. At server 162, this PMSN may be assigned to a yet not assigned/used playlist. In the example of FIG. 10A, playlist 3: $3_1 1_2 5_1 2_2 6_1 4_1$ is assigned to PMSN=52789 of record carrier 160. Then, the server 162 may transmit this playlist 3 to the player 164. Consequently, the player 164 reads/plays back the audio video portions $3_1 1_2 5_1 2_2 6_1 4_1$.

In case player 164 is used for making a copy of record carrier 160, for example by ripping the content, the ripped content may still comprise the watermarked portions. When the ripped content is analyzed the analysis might reveal the following:

| | |
|---|---|
| $3_1$ | original AV portion |
| $1_2$ | watermarked copy of AV portion |
| $5_1$ | original AV portion |
| $2_2$ | watermarked copy of AV portion |
| $6_1$ | original AV portion |
| $4_1$ | original AV portion |

Thus, the analysis revealed a certain order of AV portions that are either a copy or an original AV portion. Based on this analysis it is possible to determine the playlist that has been used when reproducing the original disc. Since the playlist is uniquely associated with a PMSN, it will be possible to derive the PMSN from the ripped content.

Thus, this embodiment may help to track down a disc from which a copy has been made. This may be advantageous to find copiers. For example, if it was known where a certain disc has been sold or rented, a store/renting location might be spotted. Moreover, if the store or renting location has a customer database it might be even possible to locate who has rented/bought a record carrier 160. Of course, legal regulations regarding such storing of customer data will have to be observed. Nevertheless, it may e.g. be possible to determine stores/renting locations where frequently discs are rented from which copies show up e.g. on the internet or on the blackmarket.

Figure 10B:
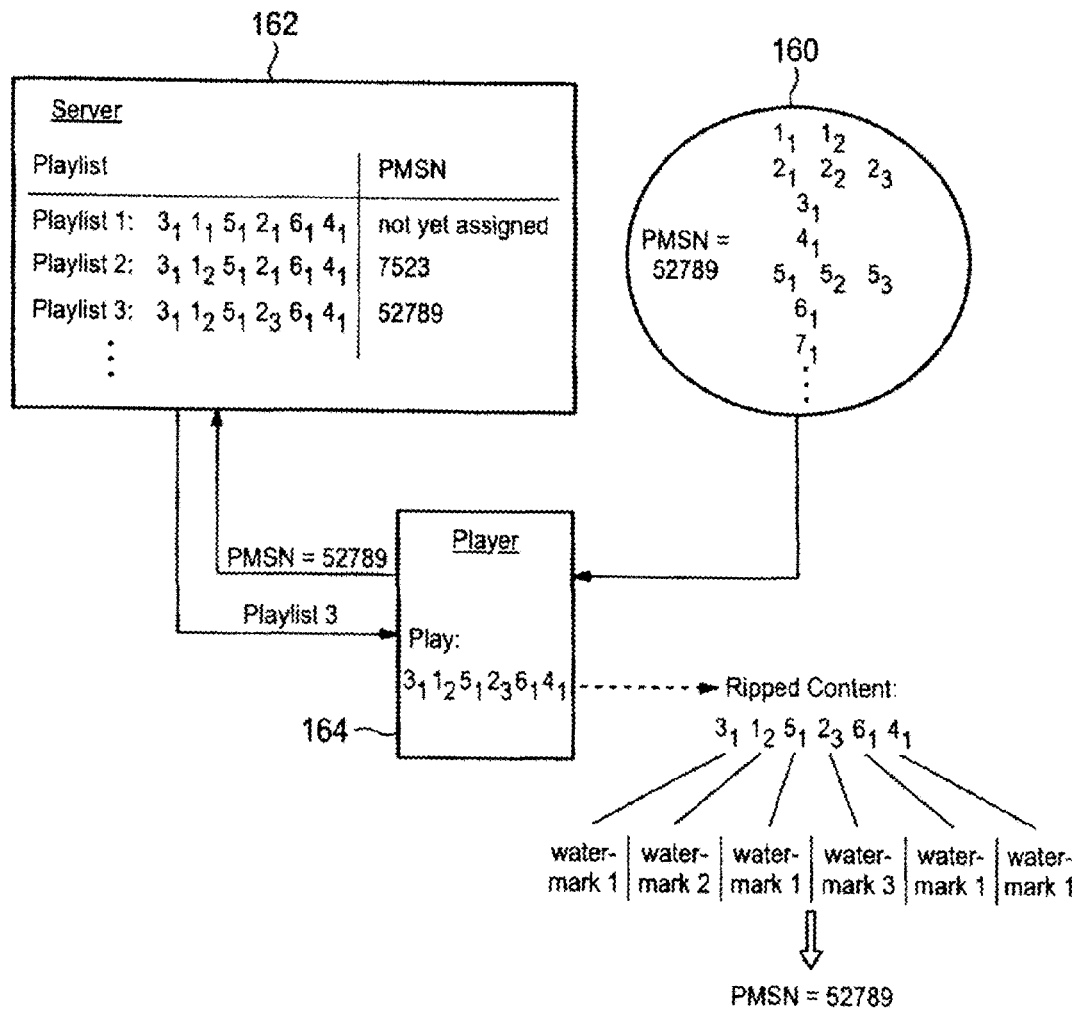
FIG. 10B shows a further embodiment where watermarked audiovisual files are included in playlists.

FIG. 10B shows an embodiment that is similar to that of FIG. 10A. However, in this embodiment more than one copy of an AV portion exists for some of the portions. For example, there are two copies of portion 2 and 5. Thus, there are three instances for portions 2 and 5, two instances of portion 1 and only one instance of portions 3, 4, 6, and 7. Thus, as seen in FIG. 10B there may be a predetermined number of instances of sliced portions. Each of the instances may be watermarked with a different watermark. In this case, it should be noted that this is of course likewise possible in the embodiment of FIG. 10A. In fact a portion explained to be an "original with no watermark" in FIG. 10A, may also be seen as an instance of the respective portion with a "watermark" that is equal to "zero" (thus the possibility of "no watermark" is seen as a special case of a watermark).

In the example of FIG. 10B, each instance is assumed to have a watermark. Note again that the case of "no watermark" is treated in the same manner. I.e. an instance having no watermark may also be seen as having a watermark "zero". For example, if there is only one instance of a portion, it may be computationally more efficient to not provide a real watermark for the respective portion.

It is evident from FIG. 10B how the extended concept with respect to the embodiment of FIG. 10A may be used: In the example, Playlist 3 contains the sequence of instances of portions:

$3_1 2_1 5_1 2_3 6_1 4_1$

If this sequence of portions/instances is used for playback, this can, in the same manner as explained above in FIG. 10A, be used to determine the playlist that has been used when reproducing the original disc. In the example of FIG. 10B, as in FIG. 10A, playlist 3 had been used.

FIG. 11 further illustrates the example of FIG. 10A. As seen, watermarking using unique playlists n different clips are used for the PlayItems $1_1$-$6_1$. Every permutation of the PlayItems $X_1$ can be used, only the position X in the playlist may be fixed (this is not necessary).

Figure 12:
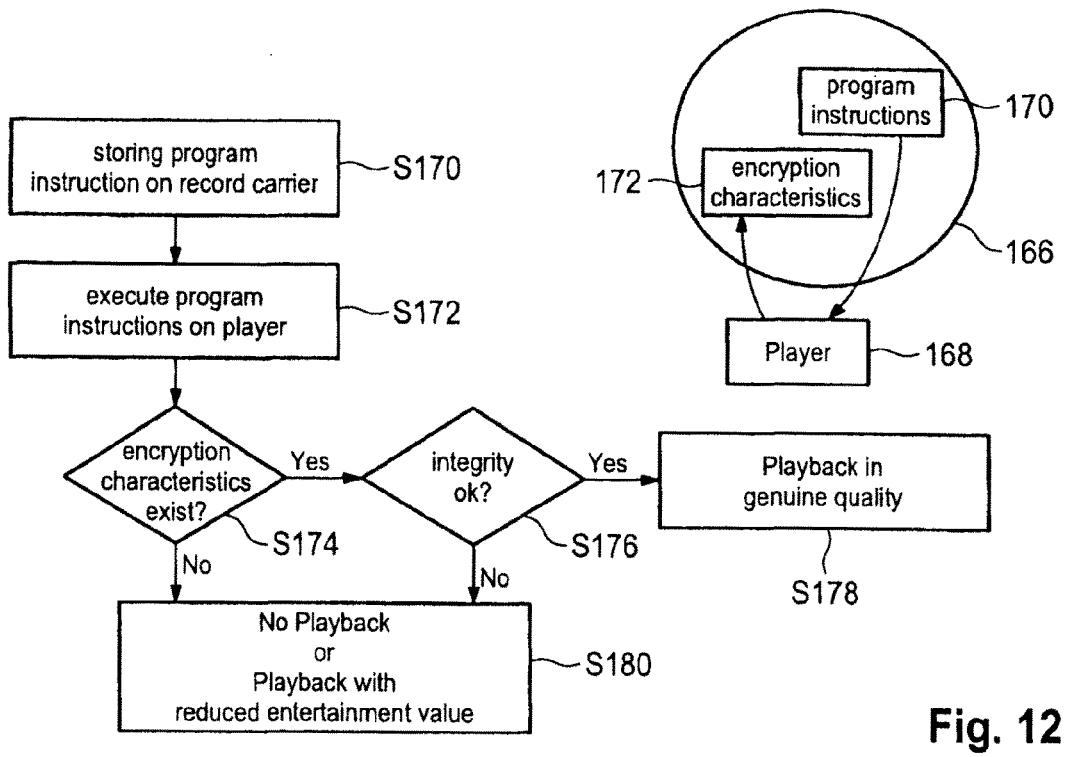
FIG. 12 shows an embodiment where playback is prevented or playback is done with reduced entertainment value in case a copy is detected.

FIG. 12 shows a further embodiment where on a record carrier 166 program instructions 170 and encryption parameters 172 are stored.

Thus, a method for copy protection is provided where at S170 shown in FIG. 12, program instructions are stored on the record carrier. When the record carrier 166 is played back on a playback device 168, then, as indicated at S172, the program instructions 170 are loaded from record carrier 166 and executed on playback device 168. When the program instructions 170 are executed, the playback device 168 checks, in a first step S174, if the encryption parameters 172 are at all stored on the record carrier 166. If this is the case, then, in a second step S176, the integrity of the encryption parameters is checked. Only if this check succeeds, then at S178 playback is possible in genuine quality. Otherwise, at S180, there will be no playback or there will be playback with a reduced entertainment value due to a deteriorated quality, i.e. playback that is not in genuine quality.

The encryption parameters 172 may depend on genuine audiovisual content stored on the optical record carrier and may have been determined in accordance with an encryption standard for copy protection of the genuine audiovisual content stored on record carrier 166 at the time of manufacturing the optical record carrier.

For example, the encryption parameters 172 in case of an original record carrier 166 may be AACS (advanced access content system) parameters. When copiers make a copy of an original record carrier, often the AACS folder is completely removed. Thus, at S174 this would result in that no playback is possible at S180 or playback is with reduced entertainment value. On the other hand, if a copier makes a copy and aims at copying the AACS parameters, then an integrity check as defined in the AACS specification which is hereby incorporated by reference may not be successful. In other words, the integrity check at S176 might not be successful so that playback is prevented or playback is with reduced quality at S180. More precisely, the entire contents of the document Advanced Access Content System (AACS) "Introduction and Common Encryption Elements", Revision 0.91, Feb. 17, 2006, available from the AACS LA web site, www.aacsla.com, is herewith incorporated by reference in its entirety. Also, the entire contents of the document Advanced Access Content System (AACS) "Pre-recorded Video Book", Revision 0.92, Nov. 29, 2007, available from the AACS LA web site, www.aacsla.com, is herewith incorporated by reference in its entirety. Moreover, the entire contents of the document Advanced Access Content System (AACS) "Blu-ray Disc Pre-recorded Book", Revision 0.921, Jun. 6, 2008, available from the AACS LA web site, www.aacsla.com, is herewith incorporated by reference in its entirety. Still further, the entire contents of JavaDoc included in "JavaDoc and Stubs for BD Prerecorded Book", Rev. 0.921, available from the AACS LA web site, www.aacsla.com, see http://www.aacsla.com/specifications/Supplement_BD_Prerecorded_Book_v0.921.zip, is herewith incorporated by reference in its entirety.

The program instructions 170 may correspond to program instructions that are also stored on player 168 for checking the encryption parameters 172. Thus, the program instructions 170 stored on the record carrier 166 may allow to do checks that are usually only done in the hardware environment by the playback device to be emulated in software and loaded from the record carrier. For example, if the record carrier is played back by a licensed hardware player, the same checks regarding the integrity of the encryption parameters may be done twice: once by the hardware of the player and once in software by the player, e.g. in a Java virtual machine (JVM) running on the player executing the program instructions 170 loaded from the record carrier 166.

For example if the record carrier 166 is an original Blu-ray disc and the player 168 is a licensed BD player, the player will check the AACS parameters as defined in the aforementioned specification of AACS. This is mandatory for a licensed hardware player. The program instructions 170 essentially perform the same checks in software (or at least a part of the checks). Thus, the integrity of the AACS parameters might be checked twice: once by the hardware of player and once in software by the player 168 after having loaded and executed the program instructions 170.

Thus, by providing the program instructions 170 on record carrier 166, an original disc check in software run on a player 168 might be realized.

If the record carrier 166 is a Blu-ray disc, the program instructions 170 may be embedded in a BD-J object. This BD-J object may have further functions such as e.g. controlling of the playback of the audiovisual content and/or an interactive user menu for controlling playback of the audiovisual content. Thus, some portions of the program instructions 170 may be related to checking the encryption parameters 172 and other portions may be related to other functions according to the Blu-ray standard such as e.g. controlling of playback and menus and/or other functions according to the Blu-ray standard, e.g. user interaction commands, navigation commands and the like.

In a further embodiment, the program instructions 170 might also comprise instructions for discriminating a correct playlist from a plurality of fake playlists as explained above. If further the record carrier 166 contained sliced and shuffled AV portions as explained above, the program instructions, e.g. BD-J object, might not be removed from a copier of record carrier 160. The reason is that if the copier was to remove the program instructions, then it may not be possible to determine the correct playlist. Also, the program instructions might prevent playback. Thus, there is a dilemma for a copier since if he removes the program instructions 170, it will not be possible to determine the correct playlist. On the other hand, if he leaves the program instructions 170 on the copy, the program instructions may prohibit playback of content on the optical record carrier 166.

As mentioned, if the record carrier 166 is a Blu-ray disc, then a disc check may be performed in a BD-J object. This may fail for a copy. Then, the BD-J object may trigger an appropriate action, if it cannot detect the original disc. This action can be freely defined ranging from the display of an error message to the playback of anti-piracy or advertising content to the playback of one of the fake, advertisement playlists, playback forced fake subtitles of playback forced fake audio streams. Thus, there is playback with a reduced entertainment value and not in genuine quality. Further, actions during playback, e.g. button navigation commands in the interactive graphics IG stream may be applied, too.

Figure 13:
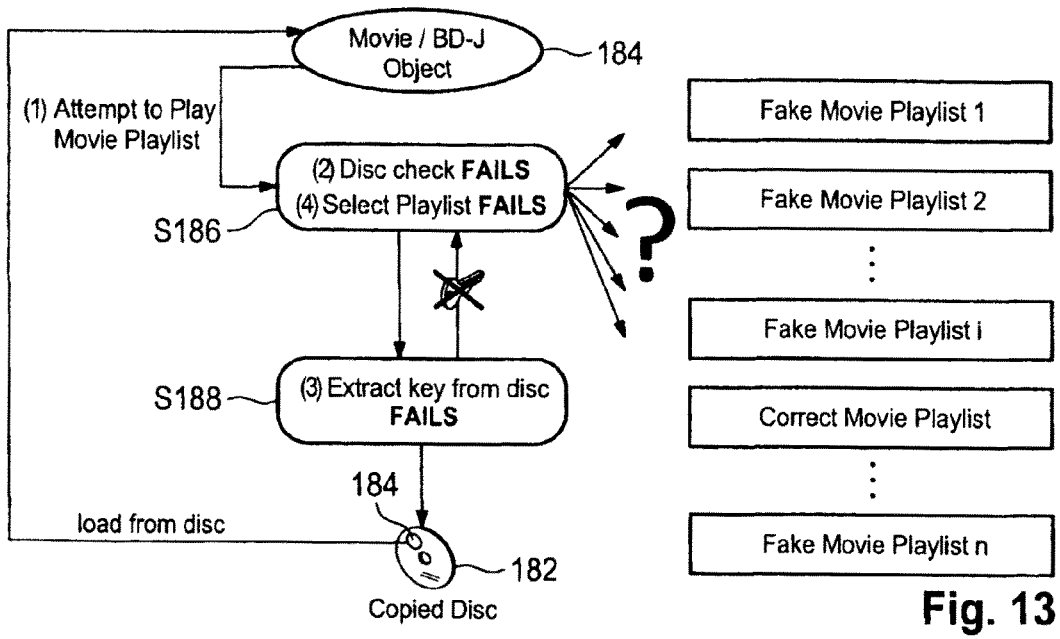
FIG. 13 shows what may happen when playback is started from a copy.

In case of fake playlists, fake titles, fake angles, and/or fake sub-paths as throughout this specification, the key to decrypt (determine) the information which playlist/title/angle register/sub-path is the correct one might also be based on unique properties of the original Blu-ray disc which cannot be transferred to an illegal copy of an original disc having data stamped onto it. This measure provides another layer of security: a BD-J object on the illegal copy will not be able to extract the key to find the correct playlist from the disc. This is illustrated in FIG. 13. The BD-J object 184 stored on the copied disc 182 which is an illegal copy will check the disc at S186 after having extracted a key at S188. Since the extracted key (e.g. encryption characteristics/parameters, checked encryption parameters and/or the like) is not correct, the correct playlist cannot be determined. Thus, the player will not know which is the correct movie playlist and which ones are fake movie playlists. Note that the example in FIG. 13 shows only a plurality of playlists (including the fake and correct playlists). Of course, it is likewise possible to extend this to fake titles, angles, and/or sub-paths as explained herein.

In the embodiment of FIG. 13, the BD-J object is loaded from the disc. In another embodiment, the BD-J object may also be loaded from the local memory (VFS). The BD-J object may be transferred to the local memory by downloading it from the Internet or by extracting it from the encoded content (see embodiment of FIG. 20).

Figure 14:
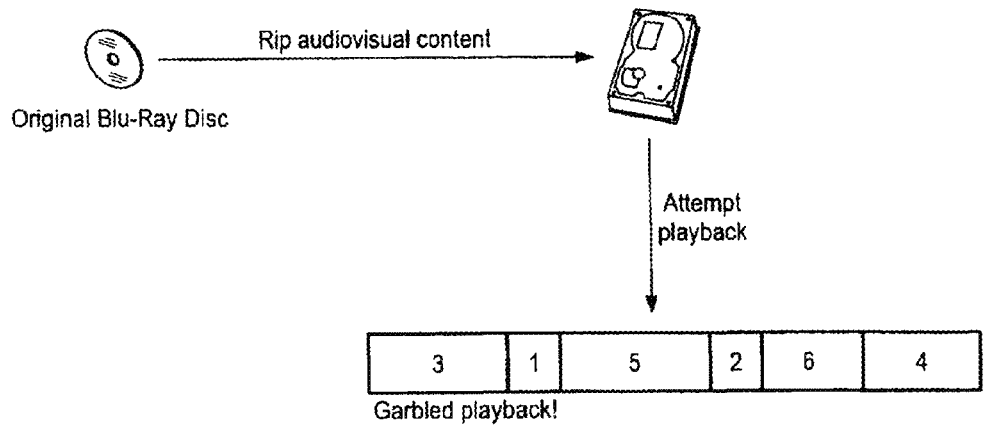
FIG. 14 shows what may happen when playback is done from a hard disk, i.e. an attempt is made to playback ripped content.

Generally, as seen in FIG. 14, another approach to create an illegal copy is transferring the audiovisual data of a record carrier to a hard disc drive (a procedure commonly refer to as "ripping"). This data may then be played back, re-encoded into a different format, e.g. also smaller in size, for distribution on the internet or burned to a recordable disc. The clip slicing explained above ensures that the copies created by ripping are not usable. Such a copy will be completely unsuited for viewing. This is illustrated in FIG. 14: Due to the slicing and shuffling of clips the audiovisual data that can be extracted from the disc is not enjoyable (unusable). An attempt at playback will lead to a succession of interleaved, unconnected movie fragments.

If chunk or advertisement clips have been inserted, the situation is similar. After ripping such clips from an integral part of the ripped content not only is the playback garbled, it also features advertisement content.

As already explained at hand of FIG. 12, it is possible that program instructions are stored on a record carrier that when executed check whether encryption parameters exist on a record carrier and also check the integrity of such encryption parameters. This is explained in more detail at hand of FIG. 15. According to this embodiment playback may only be allowed in genuine quality if AACS specific files (encryption parameters) and properties (integrity check of AACS parameters) exist (first step S174 in FIG. 12) and if the AACS parameters are not modified (second step S176 in FIG. 12). Therefore, licensed players (CE or SW) may not play illegal decrypted contents. Rip tools may e.g. remove the AACS folder completely and decrypt the AV stream files with the title key they can calculate from a broken AACS version (MKB-media key block) and sniffing the volume ID (or with BD drives with patched/modified firmware). As explained at hand of FIG. 12, a method for copy protection may check if AACS has been removed in step S174 and prevents playback if AACS specific attributes cannot be found in the second step S176.

Figure 15:
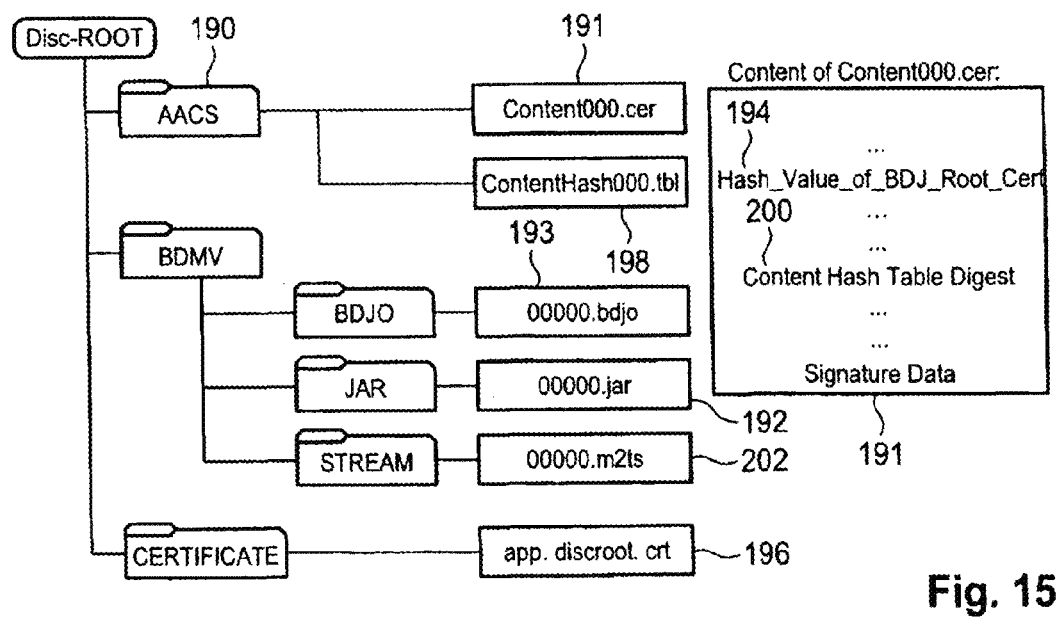
FIG. 15 shows a diagram for explaining an embodiment of an original disk check.

FIG. 15 shows the file structure of a Blu-ray disc. The AACS folder 190 holds a content certificate 191 per layer (content000.cer for layer 0, content001.cer for layer 1, . . . ). These content certificate files contain data that a licensed player has to validate during the startup of the disc (e.g. content hashes, hash value of the BD-J root certificate, AACS LA RSA signature, i.e. if the AACS folder 190 exists, the files, e.g. the content certificate file 191 has to be correct/unmodified to do playback of encrypted content. Before replication of BD-ROM discs can start, these files have to be transferred to AACS LA for adding their signature.

As mentioned above, for copy control purposes, the player may perform integrity checking in hardware. However, it is also possible to do the integrity check in software additionally or alternatively. Thus, integrity checking that is usually done in hardware by a licensed player may also be done in software in a BD-J object. In order to circumvent this integrity check the whole BD-J object (or playback title) would have to be removed or hacked. However, as apparent from the above explanation, there are means to prevent such circumvention/hacking. For example, the slicing (splitting) of the main movie file into a plurality of sliced AV portions, i.e. multiple small chunks, and obfuscating the playback instructions (sequence of connecting video fragments) as described above.

In other words, the BD-J object for finding the correct playlist may not be simply removed. If in the same BD-J object the integrity check is done, then a copy without encryption parameters, e.g. AACS parameters, or modified encryption parameters, may lead to a playback with a fake playlist. The AACS parameters may, thus, be used as "key material", i.e. input data for the BD-J object to discriminate the correct and fake (false) playlists.

The integrity checks that may be done in case of AACS encrypted content on a Blu-ray disc may be explained at hand of FIG. 15. A BD-J object 193 that is stored on the record carrier (program instructions as e.g. denoted by reference sign 170 in FIG. 12) references a *jar file (Xlet) 192 which is launched when the BD-J object is selected during playback. The Xlet 192 opens the content certificate file 191 (e.g. content000.cer which exists on any BD-ROM independently of the number of layers, exemplary explored/depicted on the right hand side of FIG. 15) and reads a Hash_Value_of BD-J_Root_Certificate item 194. This value 194 is compared with the calculated SHA-1 (SHA=secure hash algorithm) value of the app.discroot.crt file 196 and need to be identical. The app.discroot.crt file 196 may also, in a more general term, referred to as "application root certificate" and/or as "root certificate of a BD-J application authentication". Similar tasks can be done with the encrypted AV content itself. Hashing, therefore, is done in a 2-step way whereby hashes of AV chunks (not to be confused with the above-defined slices) are stored in the content hash table 198 (e.g. ContentHash000.tbl, which exists on any BD-ROM independently of the number of layers). The hash value of chunks of the content hash table is stored in the content certificate file 191 and referenced with reference sign 200 in FIG. 15. This value can be compared and needs to be identical to the calculated hash value of the corresponding chunk of the AV stream file 202.

Additionally and/or alternatively to checking, when executing the program instructions on a player, the content of the AACS folder as described at hand of FIG. 15, it is also possible to check the content of a BDMV/stream folder as will be explained at hand of FIG. 16.

For example, checking the CPI flags (copy permission indicator) in the AV stream files (clip files, highest order 2 bit of TP_extra_header) hinder the ripping tools to do decryption of the content files. Additionally, checking if content is encrypted can be done by checking the value of the sync_byte of the transport stream (every TS packet starts with the value 0x47), if encrypted this value changes.

Figure 16:
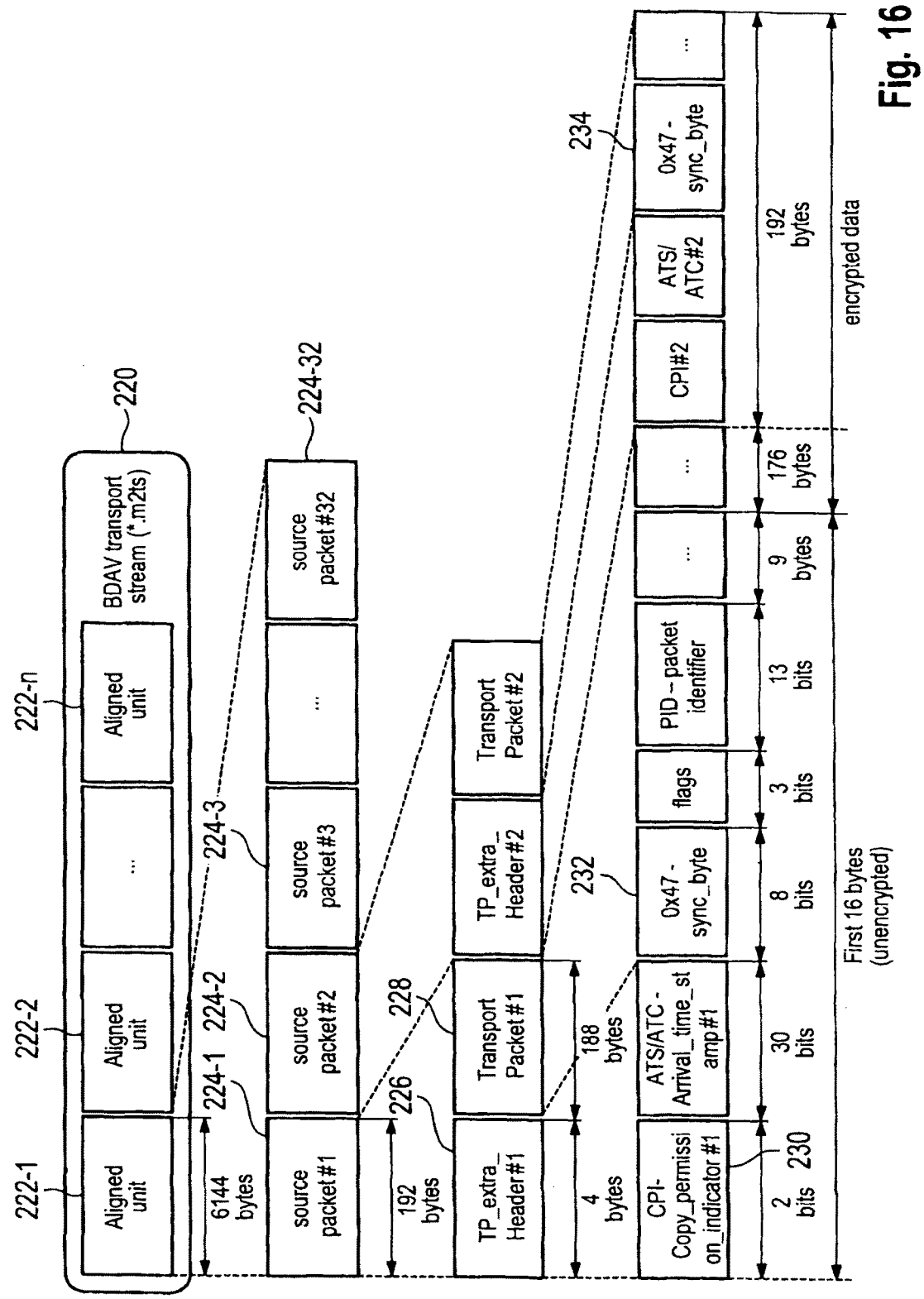
FIG. 16 shows a diagram for explaining a further embodiment of an original disk check.

As seen in FIG. 16, the BDAV transport streams 220 (*.m2ts AV clip files) are composed of aligned units 222-1, . . . , 222-n each 6144 bytes in size (3 logical sectors of 2048 bytes). An aligned unit 222 again is split in 32 source packets 224-1, 224-2, . . . , 224-32 each 192 bytes in size. A source packet 224 itself consists of a 4 byte TP_extra_header 226 (4 bytes in size) and the transport packet 228 (188 bytes in size). The layout of the transport packet 228 corresponds to the standard MPEG-2 system portion 1 specification (ISO/IEC 13818-1). The most significant 2 bits of the TP_extra_header 226, the copy_permission_indicator 230 signals an encrypted BDAV transport stream if they are set to the binary value of 11b. Checking this value guarantees that the AV clip files have not been decrypted. In other words, the copy_permission_indicator 230 may be referred to as an encryption parameter and if this value indicates the binary value of 11b, then this encryption parameter may be judged to be in integrity.

Each transport packet 228 starts with the 8 bit sync_byte 232 with a value of 0x47 hexadecimal. The first 16 bytes of an aligned unit are not encrypted (unencrypted) and the rest of 6128 bytes is encrypted using the block key and AES-128CBCE encryption as specified for AACS—details can be found in the AACS BD pre-recorded book available at the above indicated webpage. Starting with the second sync_byte 234 of an aligned unit this value is encrypted (typically not 0x47) and can be checked to guarantee that the AV clip file is still encrypted.

Thus, the second sync byte 234 of an aligned unit may be referred to as an encryption parameter and it can be checked whether this encryption parameter is in integrity, i.e. if it is not 0x47 it may be in integrity. In order to achieve a better reliability of the integrity check, a predetermined number of e.g. 5 consecutive sync_bytes might be checked. If the majority of these checked sync_bytes are different from the value of 0x47, then integrity of this encryption parameter might be assumed.

Figure 17:
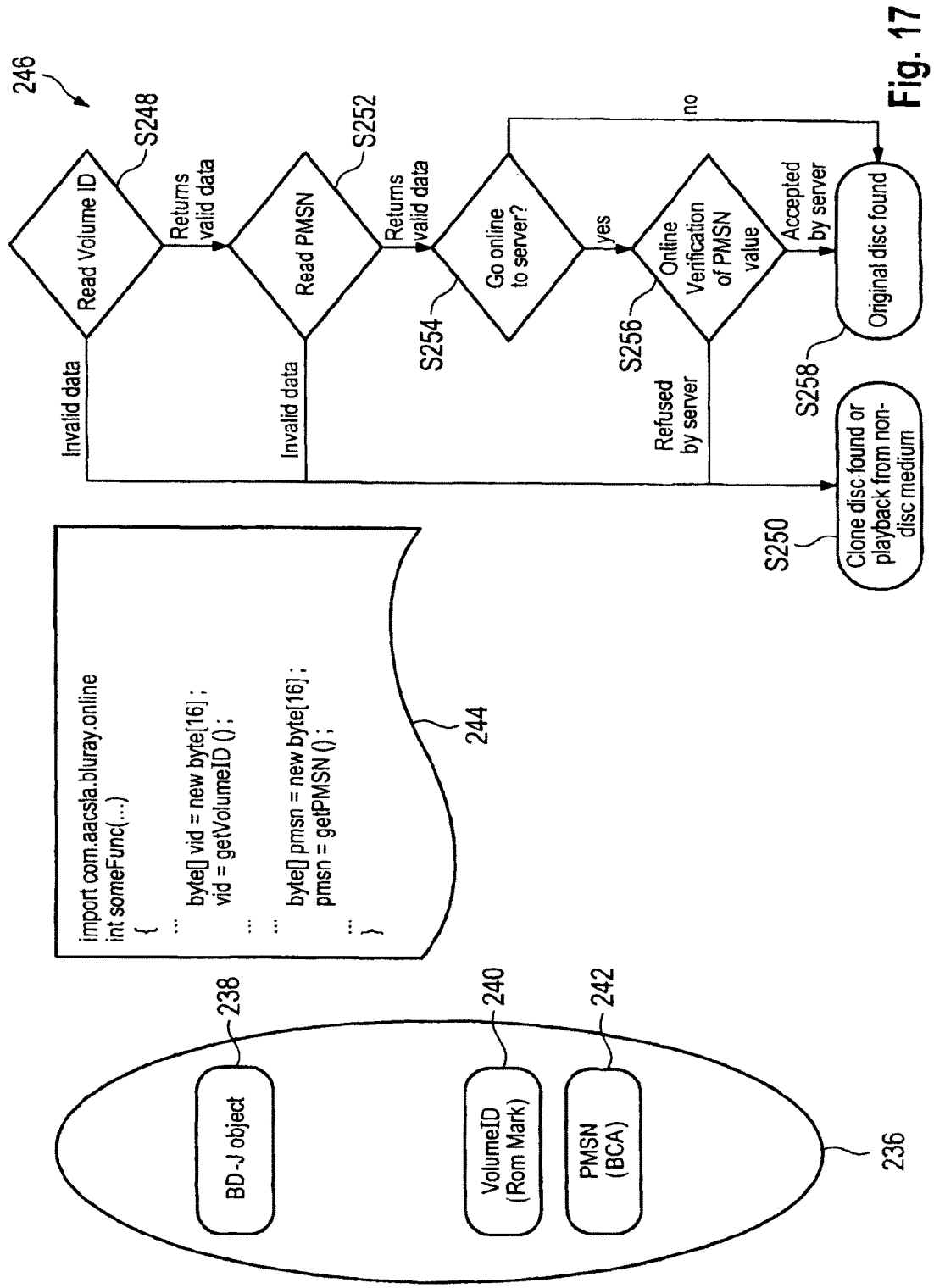
FIG. 17 shows an embodiment where within program instructions stored on a Blu-ray disk, a volume ID and/or PMSN is verified.

In still another embodiment, which is depicted in FIG. 17, the existence of a volume ID and/or a PMSN on a Blu-ray disc might be checked. The volume ID and PMSN might also be referred to as encryption parameters and it may be checked if these encryption parameters are present on a Blu-ray disc. If they are not present, then, as e.g. depicted at S180 in FIG. 12, playback may be prevented or playback may be with reduced quality.

Regarding the embodiment of FIG. 17, it should be noted that the AACS AES decryption needs 2 parts of key material which is on the one hand the processing key which is a result of processing the MKB (media key block) file on the disc (MKB_RO.inf file in the AACS folder) with the unique device keys of the player and on the other hand the volume ID which is stored in the ROM mark of the BD-ROM.

The PMSN (pre-recorded media serial number) is a unique serial which can be added to each BD-ROM, e.g. for online authentication for managed copy. AACS LA provides an interface to get access to the volume ID and PMSN from a BD-J object. Illegal copying or ripping a BD-ROM leads to a loss of volume ID and PMSN which can be checked to guarantee to have an original disc. In other words, if the volume ID and/or PMSN (encryption parameters) do not exist a disc is an illegal copy.

In FIG. 17, reference sign 236 symbolizes a BD-ROM with a BD-J object 238 including program instructions that check the existence of the volume ID 240 (within the ROM mark of the disc) and the PMSN 242 (within the BCA "burst cutting area", area of the disc). Reference sign 244 denotes a Java™ program fragment that is associated with the BD-J object 238. The program fragment 244 (program instructions) may check the Volume ID 240 and/or PMSN 242 via the com.aacsla.bluray.online package. At 246 a flowchart is shown running through different checks to decide if the disc is an original or not. Therefore, at S248, the volume ID is read. If it is invalid, the disc, at S250 is determined to be a copy. Further, at S252, the PMSN is read. If the PMSN is not valid, then the process goes to S250 and determines that the disc is a copy. If the volume ID at S248 and PMSN at S252 have been determined to be valid, at S254, a player may go online to a server. This is possible if a Blu-ray player has an interconnectivity which is mandatory for Blu-ray players with profile 2.0. At S256, the server may verify the value of the PMSN. If it is accepted, at S258 it is determined that the disc is an original. On the other hand, if the PMSN is not accepted by the server, at S258 it is determined that the disc is a copy.

Figure 18:
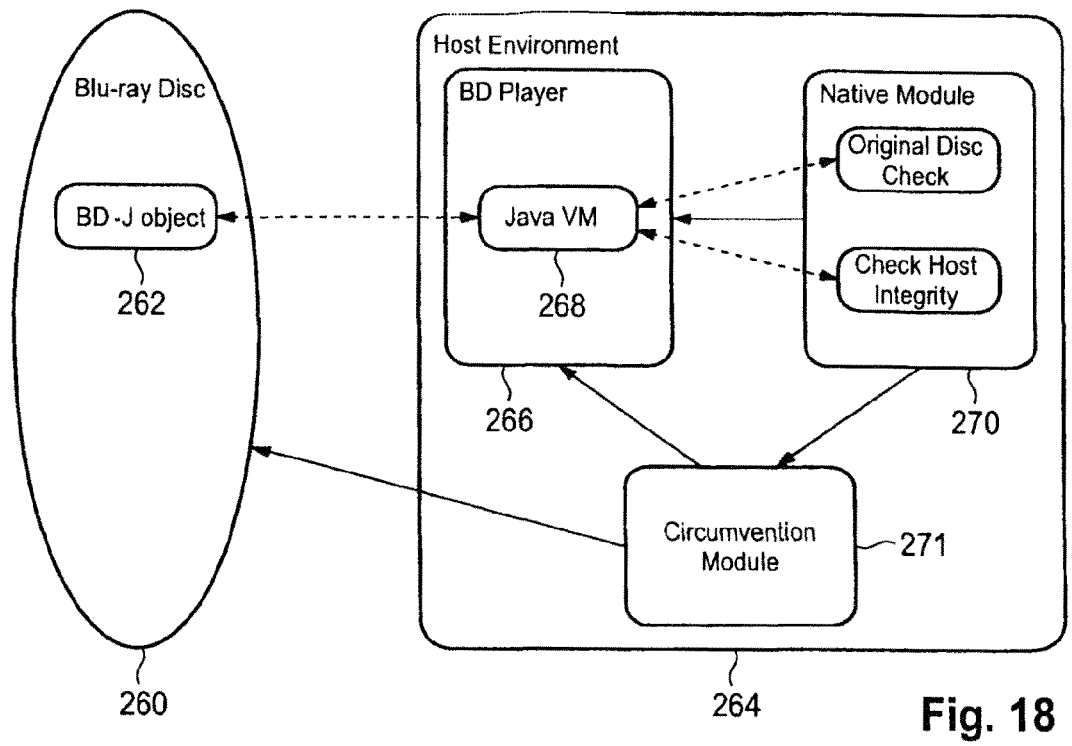
FIG. 18 shows an embodiment where a native module is installed on a host environment.

FIG. 18 shows a further embodiment of a Blu-ray disc 260 comprising a BD-J object 262 (program instructions). In the example shown in FIG. 18, the Blu-ray disc 260 is played back on a host environment 264, e.g. a computer environment such as a personal computer. In the host environment 264, there may be provided a software such as a Blu-ray disc software player 266. For playing back Blu-ray disc 260, the BD player 266 may run a Java virtual machine (JVM) 268. The Java virtual machine 268 may execute the BD object 262 when playing back the disc 260.

Further, the BD object 262 may comprise program instructions that comprise a check of the playback environment, e.g. the BD player 268. If this check reveals that the playback device is a computer, i.e. the host environment 264 indicates that it is a computer, the BD-J object 262 may prevent playback unless further software such as a native module 270 is installed in the host environment 264. Alternatively, playback may be started, however, not with the correct playlist, correct title, correct angle settings, and/or correct sub-paths. Thus, in the embodiment shown in FIG. 18, the host integrity (and the disc integrity: original vs. illegal copy) may influence the selection of the correct playlist, correct title, correct angle settings, and/or correct sub-paths among the possible plurality of respective fake playlists, fake titles, fake angle settings, and/or fake sub-paths.

The native module 270 may be provided by a manufacturer of the Blu-ray disc 260 and/or by a provider of the software BD player 266.

Within the native module 270, the host integrity of the host environment 264 may be checked. For example, it may be checked whether the BD player 266 is not running in a debug mode. If the BD player 266 is running in a debug mode, then the native module 270 may be able to detect this and report this to the Java virtual machine 268. In turn, the Java VM 268 may not allow playback of the Blu-ray disc 260. Also, within the native module 270, the original disc check may be performed or determined in cooperation with the BD-J object.

The installation of a native module 270 may have several advantages: first, the programming within the native module 270 may be more sophisticated than the programming that is possible in a BD-J object. The native module 270 may also comprise program instructions to perform the original disc check as explained above, however, in a more sophisticated way. This is possible since the host system may have less restrictions regarding e.g. code size, used/free memory size, performance, and so on. Better obfuscation may be possible in the native module 270 than if only using Java code. This is possible, since in the native module, e.g. the x86 Instruction set may be used for which more powerful obfuscation can be applied than for Java byte code. "Obfuscation" may e.g. refer to hiding how a correct playlist may be determined. Further, the BD-J object 262 and the native module 270 may do the original disc check and host integrity check in combination.

The BD-J object 262 may communicate with the native module 270 via a connection, e.g. a TCP/IP connection via the local host. The connection could thereby be encrypted so that hackers may not easily eavesdrop the data exchanged between the BD-J object 262 and the native module 270.

In order for the BD-J object 262 to verify that a native module is at all installed on the host, the BD-J object 262 may e.g. send a request to a predetermined port of the local host (IP address: 127.0.0.1). The native module could be configured to use this port and, thus, if the native module is installed on the host, then the request may be appropriately answered, i.e. answered in an expected (predetermined) manner. If the request is answered as expected, the BD-J object 262 may judge that the native module is appropriately installed and may start communication. In this case, playback of the genuine content may be possible (provided that the disc is an original or a legal, e.g. managed, copy). If the request is not answered or not answered as expected, the BD-J object may initiated display of a message to the user to install the native module e.g. by already indicating a certain web address for download. In this case, playback in the correct (first) order of the sliced and shuffled portions may be prevented unless the native module is installed (and playback is restarted after installation of the native module). Also, a playlist with advertisings (see above) may be selected unless the native module is installed.

In case of BD profile 2.0, the BD-J object could also download the native module.

Also, the native module 270 allows checking the integrity of the host environment 264. This would not be possible by using the BD-J object 262 alone, i.e. without interaction with the native module 270. The reason is that if the BD-J object was used without the interaction with the native module 270, it would be run in a Blu-ray Java VM without being able to access the host environment.

The native module 270 may also control the host environment so that it is not statically or dynamically modified/corrupted/influenced to allow playback from a pirated (illegal) copy. The native module 270 may e.g. check the integrity of the playback software via checksums or check that it is not running in a debugging mode where data could be inspected/modified from outside. It can also check that the Blu-ray disc is not an emulated virtual drive like it is able with virtual drive software. The native module 270 may also make sure that no capturing of video content is done during playback of the Blu-ray disc.

One further advantage of the native module 270 may be explained at hand of the following example: It may be expected that copiers will try to determine the correct playlist (correct first order) for playback of sliced AV portions that may be stored on the Blu-ray disc 260 by running a BD software player 266 in a debug mode. In such a debug mode (indicating a "suspicious" host integrity=nonverified host integrity) it might be possible to determine the correct playlist of the plurality of AV portions stored in the second order by tracking a physical access order of files on a disc. In that the BD-J object 262 requires the native module 270 to be installed, it can be prevented that the BD software player 266 be run in a debug mode.

If the disc is played back on a hardware BD player, this might be verified by the BD-J object 262. In that case, of course, the BD-J object 262 will not require that a native object be installed in order for playback. On the other hand, the BD-J object 262 may of course, still verify that the disc is an original or a legal copy based on the extracted "key material" as explained throughout this specification.

FIG. 18 also shows a circumvention module 271 as an example of a way for a hacker to hack the copy protection. In FIG. 18, dashed lines indicate a communication between the two entities connected with such a dashed line. A solid line indicates a "monitoring" or "surveillance". For example, the native module 270 is depicted as "monitoring" the host environment for a circumvention module (detection if such a circumvention modules is installed or running). Likewise, the circumvention module would, if installed and running, monitor the disc and/or the BD player. For example, the circumvention module could be or realize: a debug tool (single stepping, API hooking, memory sniffing), a TCP/IP monitor, a file monitor (e.g. detecting which file(s) on the disc are accessed in which order), a bus monitor (e.g. detecting which sectors on the disc are being accessed in which order), installed filter drivers, a wide range of emulators (e.g. emulating that AACS and/or a Volume ID/PMSN exist on the disc), a virtual drive, an emulator for an operating system (virtual machine).

The native module 270 may either be installed with a BD player software, i.e. the software for BD player 266 (full or update installation), or be requested by the BD-J object 262. For example, the BD-J object 262 may detect that the playback is started on a software BD player and not on a licensed hardware player. If the BD-J object detects that the BD player 266 is a software player, the BD-J object may show an internet address in a video frame where the user could download the native module 270 and install it on the host system 265. The host system 264 may e.g. be an operating system such as Microsoft™ Windows™. Generally, it is desirable to have full cooperation with all manufacturers of software-based BD players. In case of such a cooperation, the software-based BD player could already include or install the native module. However, it would also work without such a cooperation with the consequence of less consumer comfort. The user may then have to download and install the native module separately.

As soon as the native module 270 is running, if it is not started automatically by the BD player 266, it will be requested by the BD object 262. The BD-J object 262 may communicate with the native module as mentioned above, e.g. via an encrypted TCP/IP connection.

FIGS. 19A to 19J show further embodiments where a copy protected record carrier comprises encrypted content, e.g. encrypted audio visual or audio content. The record carrier also comprises program instructions (control logic) that is e.g. used for accessing the encrypted content when the content is reproduced by a playback device. In the embodiments of FIGS. 19A to 19J, the program instructions cause a playback device to read byte values at certain positions on the record carrier. The read byte values are then interpreted as additional program instructions and/or as input data to be further processed by the playback device.

Figure 19A:
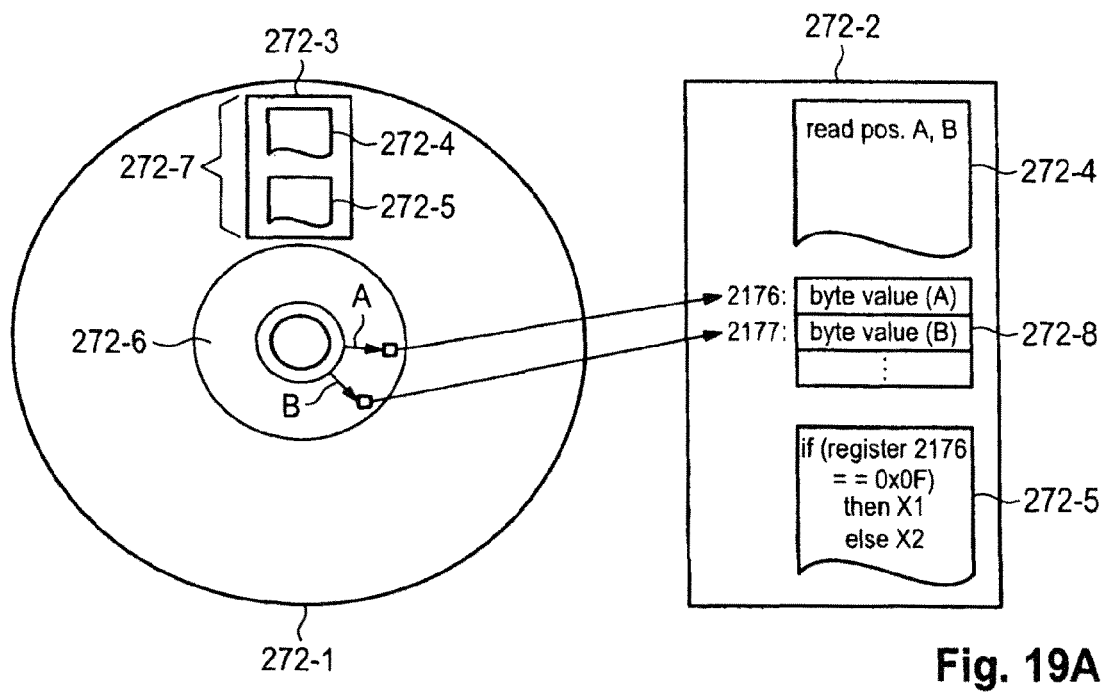
FIG. 19A shows a further embodiment where bytes are read at certain positions.

FIG. 19A shows an exemplary embodiment. On the left hand side of FIG. 19A, an optical record carrier 272-1 is depicted. Further, on the right hand side, a playback device 272-2 is schematically illustrated that executes program instructions 272-3 stored on optical record carrier 272-1. The program instructions 272-3 include a first portion 272-4 and a second portion 272-5.

Moreover, as illustratively depicted, in a first physical area 272-6, encrypted content is stored on optical record carrier 272-1. The program instructions 272-3 are stored on optical record carrier 272-1 in a second physical area 272-7. Note that although the second physical area 272-7 is depicted as a box, in reality, this second physical area will in general also be circular in shape, the data being stored in a portion of the storage path of the optical record carrier 272-1.

In order to reproduce the content stored on the optical record carrier 272-1, the playback device 272-2 will load and execute the program instruction 272-3. When executing the first portion 272-4 of the program instructions, the playback device will read byte values and/or bit values at certain positions within the first physical area 272-6. The certain positions could be predetermined positions or the certain positions could be determined dynamically, e.g. depending on certain register values or other program logic.

Throughout the description, all examples/embodiments relate to byte values. It should be understood, however, that also bit values could be used instead of byte values or in combination with byte values.

In the example of FIG. 19A, the playback device 272-2 has a memory 272-8. In case the optical record carrier 272-1 is a Blu-ray disc and the playback device 272-2 a Blu-ray player, memory 272-8 could e.g. correspond to the general purpose registers according to the Blu-ray specification.

As illustrated, the first portion 272-4 comprises instructions to read byte and/or bit values from positions A and B in the first physical area 272-6. In other words, byte values from the encrypted content are read. The read byte values will then be stored in the memory 272-8. In the example of FIG. 19A, the byte value at position A will be stored in a memory cell (register) 2176 and the byte value read from position B will be stored in a memory cell (register) 2177.

The byte values which are read in this way may be seen as a data entity in memory 272-8. In the second portion 272-5, the data entity will be further processed. For example, in the second portion 272-5, the data entity might be interpreted as additional program instructions, e.g. Java byte code, and/or as input data to be further processed within the second portion, i.e. when the second portion is executed.

The data entity can be used in various ways as will be detailed below in connection with FIGS. 19B to 19J.

In the example of FIG. 19A, an example for an interpretation of the data entity as input data is shown. As seen, the second portion 272-5 comprises an example of control flow statement If (register 2176==0x0F) then X1 else X2

Thus, in this example the byte value stored in memory cell 2176 of memory 272-8 is used as input data for an if-statement. With such an if-statement or any other suitable statement for controlling the control flow of software, the control flow within the second portion 272-5 of the program instructions may be influenced.

For example, if the if-statement is fulfilled, then a function X1 may be executed, whereas if the if-statement is not fulfilled, then a function X2 may be called and executed (as exemplified in FIG. 19A).

The function X1 may e.g. correspond to a correct playlist (first order) in the sense as explained above. If the if-statement is not fulfilled, i.e. the function X2 will be executed, for example a fake playlist as explained above could be used for further playback (further first order). Also, function X2 might lead to a different behavior of a menu for accessing the content stored on optical record carrier 272-1. Various other possibilities for function X2 exist. For example, a playlist leading to playback of advertisements could be selected, a malfunctioning menu could be displayed, and/or playback could be prevented altogether. For further possibilities regarding behavior of the playback device 272-2 that will be annoying for the user, see above and below.

As should be clear from FIG. 19A, an advantage of using byte values of the encrypted content as input data/additional program instructions in the second portion, is that these byte values will be different in case the data stored in the first physical area 272-6 does not correspond to encrypted content. Thus, if a copier decrypts the content and stores the decrypted content in the first physical area 272-6, the byte values at positions A and B will be different then if encrypted content is stored in the first physical area 272-6. Thus, if a copier removes a copy protection (encryption, e.g. AACS encryption in case of a Blu-ray disc), the byte values read into memory 272-8 during playback will be different than if the byte values are read at positions A and B from a prerecorded optical record carrier or a legal copy thereof. Thus, the control flow can be modified depending on whether the optical record carrier comprises encrypted content or decrypted content. The latter would indicate that the optical record carrier is an illegal copy. Thus, when an illegal copy is played back, the program instructions stored on the disc will result in a different behavior during playback and/or execution of the program instructions (e.g. malfunctioning menu, etc.).

The positions A and B may also be referred to as "offsets". For example, position A may be seen as offset of a certain number of bytes from the beginning of a file or sector starting at the boundary (inner circle) of first physical area 272-6.

Also, it should be noted that it is possible for the playback device 272-2 to read not single positions, i.e. to not read the byte values position-by-position (byte by byte) but instead to read into the memory a certain number of consecutive bytes, for example 1 megabyte consecutively stored in the first physical area 272-6. In the playback device 272-2, within the read larger portion, as mentioned e.g. 1 megabyte, based on the offset values the bytes at the certain positions will be read. For example assuming that the first physical area 272-6 corresponds to 1 megabyte, this 1 megabyte might be read into the memory of playback device 272-2 by one single reading access to the record carrier. In other words, all data of the physical area 272-6 might be read into the memory of the playback device consecutively. Then, within this data, the byte values will be determined based on the offset information. This way, byte values at positions A and B may be read faster than when accessing positions A and B separately.

Figure 19B:
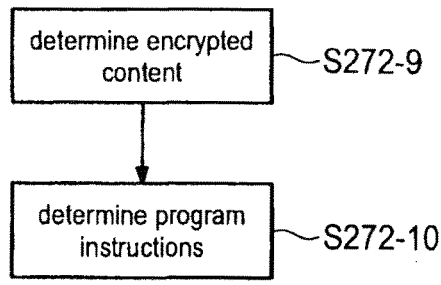
FIG. 19B shows steps of a method for copy protection according to a further embodiment.

FIG. 19B shows steps of a method for copy protection. At S272-9, encrypted content to be stored in the first physical area is determined. Further, at S272-10, the program instructions are determined which are to be stored in the second physical area. In case of manufacturing a copy protected record carrier, the content and program instructions would be stored on the record carrier.

Figures 1, 19C:
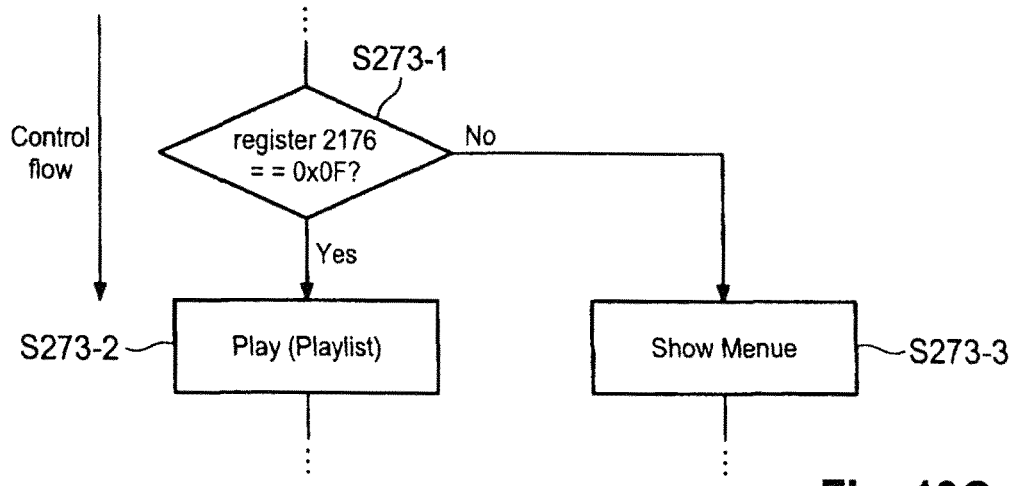
Figures 2, 19C:
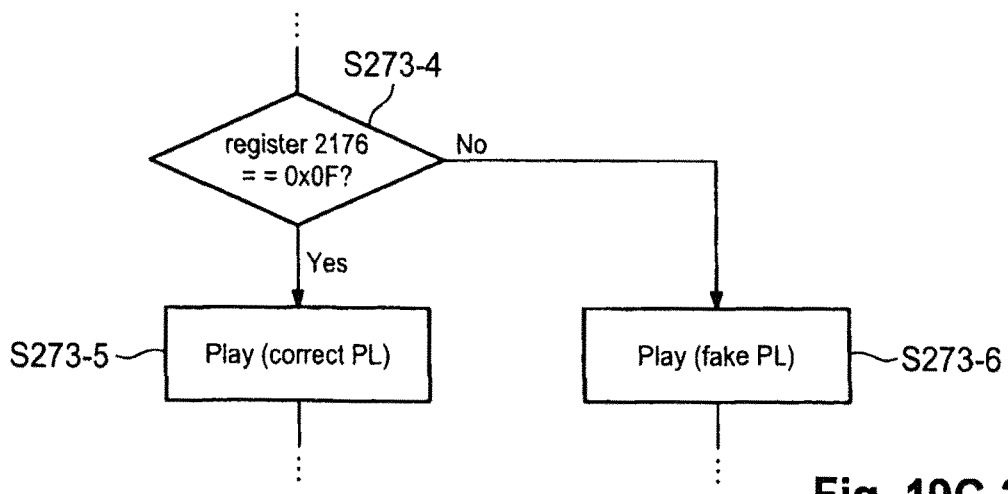

FIGS. 19C-1 and 19C-2 show examples of how the control flow in the second portion could be modified. The embodiments shown in FIG. 19C-1 and 19C-2 relate to the Blu-ray standard, i.e. it is assumed that the optical record carrier is a Blu-ray disc. However, of course a person skilled in the art would have no difficulties to generalize the teachings to other standards.

As seen in FIG. 19C-1, at S273-1, it is checked whether the byte value stored in register 2176 is equal to 0x0F. If this is the case processing proceeds to S273-2 where a procedure/command play (playlist) is executed. The playlist could e.g. correspond to a correct playlist (first order) that will start playback of the content stored on the Blu-ray disc, e.g. if the disc contains scrambled portions as explained above. However, the change of control flow can also be applied independent from the scrambling.

If the byte value stored in register 2176 is not equal to 0x0F, then the processing proceeds to S273-3. In the example of FIG. 19C-1, a menu will be displayed in this case. Thus, FIG. 19C-1 shows how the control flow when executing the program instructions by a Blu-ray player is modified or influenced based on byte values read at certain positions within the encrypted content (the read byte values are interpreted as input data).

FIG. 19C-2 shows a further example where at S273-4 the byte value of register 2176 is evaluated. If the byte value corresponds to the byte value 0x0F, then a correct playlist PL will be used for playback at S273-5, i.e. a respective play command will be executed. The play commands might be included in the second portion of the program instructions shown in FIG. 19A.

If the byte value in register 2176 is not equal to 0x0F, then, at S273-6, a fake playlist "fake PL" will be used for playback by executing a command play (fake PL). The fake playlist could e.g. comprise advertisings and/or result in a wrong order for playback.

Thus, in the embodiment of FIG. 19C-2, on the optical record carrier, the audio visual or audio content could be stored in a plurality of portions (cf. e.g. FIG. 1). As explained at hand of FIG. 1 above, the portions may have a first order, wherein when the portions are reproduced in the first order the audio visual or audio content stored on the optical record carrier might be reproduced in a genuine playback sequence. On the record carrier, however, the portions are stored in a second, e.g. scrambled, order that is different from the first order. The physical position on the record carrier where a respective portion is stored may then depend on the second order. Moreover, the first order may not be stored on the optical record carrier. The first order, however, might be determined based on the bytes read from the certain positions (see also FIG. 19F for further details in this respect).

As mentioned above, the byte values read at the certain positions might be used in various ways.

Figure 19D:
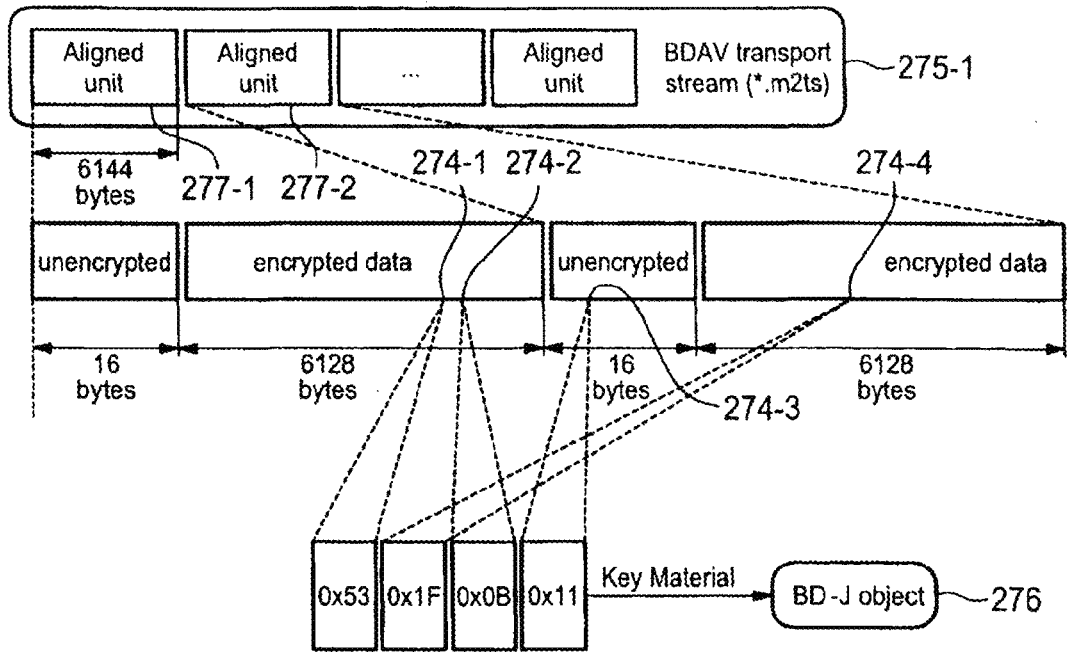
FIG. 19D shows a further embodiment where bytes are read at certain positions, the bytes being interpreted as key material.

FIG. 19D shows an example where byte values are read at positions 274-1, . . . , 274-4. As seen, it is also possible that some byte values are read from unencrypted data. In the example of FIG. 19D, a byte value is read at position 274-3 from unencrypted data.

In the example of FIG. 19D, all byte values are read from a single BDAV transport stream (*.m2ts) 275-1. This, however, is not necessary and it is possible that the bytes are read at positions in different transport streams (*.m2ts).

In the example of FIG. 19D, the byte values read at positions 274-1, . . . , 274-4, correspond to the byte values 0x53, 0x1F, 0x0B, and 0x11, respectively. These byte values might then be used as key material, i.e. as input data, in a BD-J object 276. As thoroughly explained above and below the key material might influence the selection of a playlist, setting of an angle for playback, controlling a menu of the title stored on the Blu-ray disc and so on. As already mentioned in connection with FIG. 19A, the accessing speed for accessing the bytes at the various positions might be increased by reading larger data blocks into the memory of the playback device. For example, BD-J object 276 might comprise an instruction to read 1 megabyte of data which might include the two aligned units 277-1 and 277-2.

As has been shown, in the embodiment of FIG. 19D, encryption parameters/characteristics are extracted from the encrypted AV files. These encryption parameters (key material) may then be used for the original disc check. The key material might be used in algorithms to discriminate the correct playlist from fake playlists. When manufacturing an original disc, this means that in the embodiment of FIG. 19D, the BD-J object needs to be finalized or created after the disc has been AACS encrypted (cf. FIG. 20).

An advantage of the embodiment of FIG. 19D is the following: The BD-J object e.g. pseudo randomly reads data from the transport streams. This data will be different depending on whether the transport streams contain encrypted or decrypted data. If a copy program has decrypted some of the data, thus the data read will be different than from an original. Thus, the read data can e.g. be used to discriminate correct and fake playlists: if the data is the same as that read from an original disc, the correct playlist can be discriminated: else this is not possible and the read data will lead to a wrong discrimination.

Figure 19E:
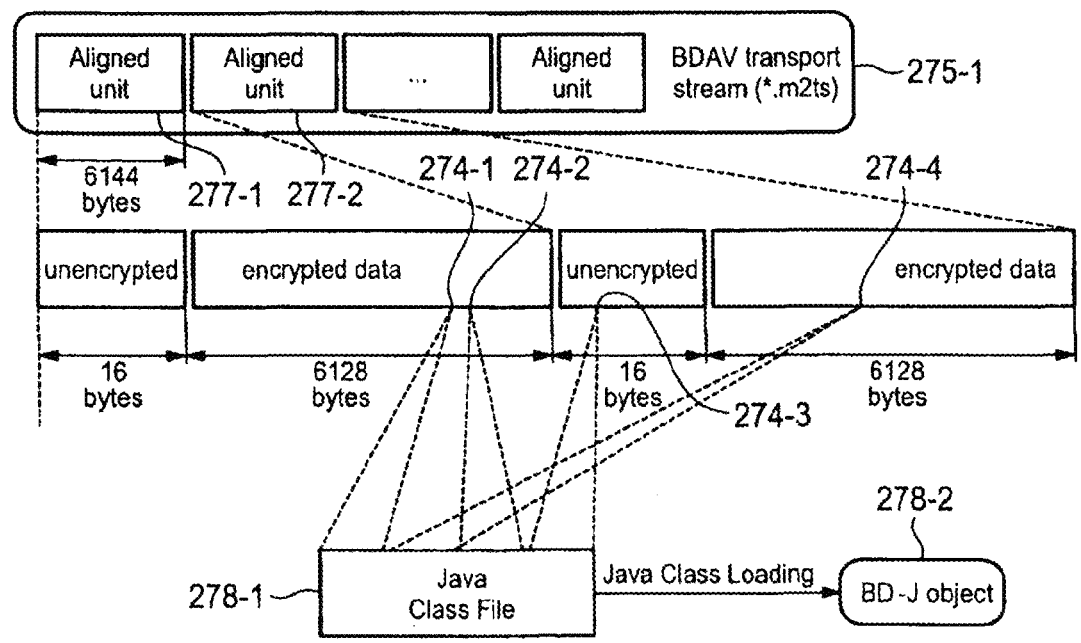
FIG. 19E shows a further embodiment where bytes are read at certain positions, the bytes being interpreted as a Java Class File.

FIG. 19E shows yet another possibility for using the byte values read at the certain positions. As an example, it is assumed that the same byte values 274-1, . . . , 274-4 are read from the same transport stream 275-1 shown in FIG. 19D. Of course, this is just an example and the byte values could be read from other positions and from another transport streams.

What is different in FIG. 19E with respect to the embodiment of FIG. 19D is, however, the interpretation of the read byte values. In the embodiment shown in FIG. 19E, the read byte values corresponding to a data entity are interpreted as a Java class file.

With regard to the interpretation of the files as Java class files 278-1, two possible embodiments exist:

First, it is possible that the read bytes, i.e. the data entity, is interpreted as Java class file which is loaded into the program memory (also referred to as Heap or Stack) of a playback device which then directly execute the Java Class File. In other words, the byte values may be read into a predetermined number of registers in the predetermined area of the program memory and these predetermined registers are then interpreted as a Java class file which is loaded by the BD-J object 278-2 during execution of the BD-J object 278-2. In this case no further processing of the read bytes is necessary.

A second possibility is that the read byte values, i.e. the data entity, is interpreted as a (new) Java class file which will be included in the logical file system of the Blu-ray disc. This might be done by an update command of the Blu-ray specification. For example, an update VFS (virtual file system) command might be executed. By such an update command, it is possible that a file already existing in the logical file system will be replaced or updated. It is, however, also possible to include an additional file in the logical file system. Thus, the (new) file, i.e. the data in entity which is interpreted as a new file might either replace/update an existing file of the logical file system or it might be added as a new file to the logical file system of the Blu-ray disc.

Again, various possibilities for influencing the behavior of the BD-J object 278-1 are feasible. For example, on the Blu-ray disc, a Java class file might already be stored and included in the logical file system which, however, might contain instructions that will lead to an undesired behavior during playback. For example, the Java class file stored on the optical record carrier might lead to a malfunction of the menu, selection of a false playlist and so on. During execution of the program instructions stored on the disc, a new Java class file might be determined dynamically. This new Java class file could then be included into the logical file system by replacing the Java class file stored on the disc. This new Java class file might then lead to a correct functioning of a menu, selection of correct playlist and so on.

FIG. 19F shows yet another embodiment for another interpretation of the read byte values.

In this embodiment, the byte values (data entity) are interpreted as a playlist file 279-1. For this, in the embodiment of FIG. 19F, the playlist file 279-1 will be determined dynamically during execution of the BD-J object 279-2 which is stored on the Blu-ray list. In order to include the playlist file 279-1 into the logical file system of the Blu-ray disc, the same steps as outlined in connection with FIG. 19E might be performed. The byte values might be read into the local memory and an update VFS command might be executed. This could result in a replacement of a playlist file included in the logical file system before the updated command or in an addition of the playlist file to the logical file system. The playlist file included in the file system before the update commend could be stored on the disc and could e.g. comprise a false (fake) playlist. The playlist file that is dynamically generated could comprise a correct playlist (first order).

Further possibilities exist: for example, a Blu-ray disc might not at all include a playlist file. Thus, playback might not be possible at all. Then, when the Blu-ray disc is inserted into a Blu-ray player, the Blu-ray player might determine the playlist file by reading bytes at the certain positions and generating a playlist file via an update VFS command in the logical file system. Alternatively, as already mentioned, a playlist file could already be stored on the Blu-ray disc. However, this playlist file might lead to playback of advertisement or other disturbing content that is stored on the Blu-ray disc. Then, a new playlist file will be generated dynamically as explained, and a new playlist file might be replacing the already existing file.

FIG. 19G shows steps that might be executed on a playback device according to the embodiment shown in FIG. 19F. At S280-1, byte values are read at certain positions. As already briefly mentioned in connection with FIG. 19A, it is possible that the certain positions correspond to predetermined positions, i.e. positions that are not modified during execution of the BD-J object 279-2. However, it is also possible that the certain positions be determined dynamically. For example the positions might also depend on byte values stored at other positions.

At S280-2, a playlist will be created in the local memory. Then, at S280-3, a VFS update command might be executed. This will lead to including the playlist file which has previously been stored in the local memory (S280-2) in the logical file system of the Blu-ray disc. As mentioned, either a file already existing in the logical file system could be replaced or modified or a new file could be added. Then, at S280-4, a playlist command might be executed. This will lead to using the playlist determined at S280-2 and S280-3 for playback.

FIG. 19H shows yet another embodiment where at S281-1 bytes are read at certain positions. At S281-2, the read bytes are interpreted. More specifically, at S281-2, it is verified if the read byte values (data entity) is a valid playlist. In case the optical record carrier is not a Blu-ray disc, but an optical record carrier of another format, it might be checked whether the read bytes correspond to a valid playback order.

If the optical record carrier is a Blu-ray disc, and the read bytes are interpreted as a playlist according to the Blu-ray standard, at S281-2, it might be verified whether the read bytes correspond to a playlist according to the Blu-ray standard. This is determined based on certain characteristics of the playlist according to the Blu-ray standard. If it is not a valid playlist, processing proceeds to S281-3. Thus, in this case, a playlist, e.g. a fake or advertising playlist, i.e. a non-genuine playback order, might be used for playback which is stored on the disc. Thus, this playlist stored on the disc might comprise play items that will lead to playback of advertisement or other distracting content which is stored on the disc. Of course, any other of the above described disturbing features might be realized, e.g. additionally and/or alternatively, the menu might be modified and so on.

However, if at S281-2 it is determined that the read bytes correspond to a valid playlist, processing proceeds to S281-4. Thus, a playlist file might be created in the local memory. At S281-5, a VFS update command is executed. This may lead to a replacement of the playlist file corresponding to the playlist stored on the disc. In other words, the playlist file which is stored on the disc and which might have been initially loaded can be replaced by the playlist file stored in the local memory by executing the VFS update command. At S281-6, the playlist which has been included as a playlist file at S281-5 into the logical file system by executing a VFS update command will be used for playback.

Figure 19I:
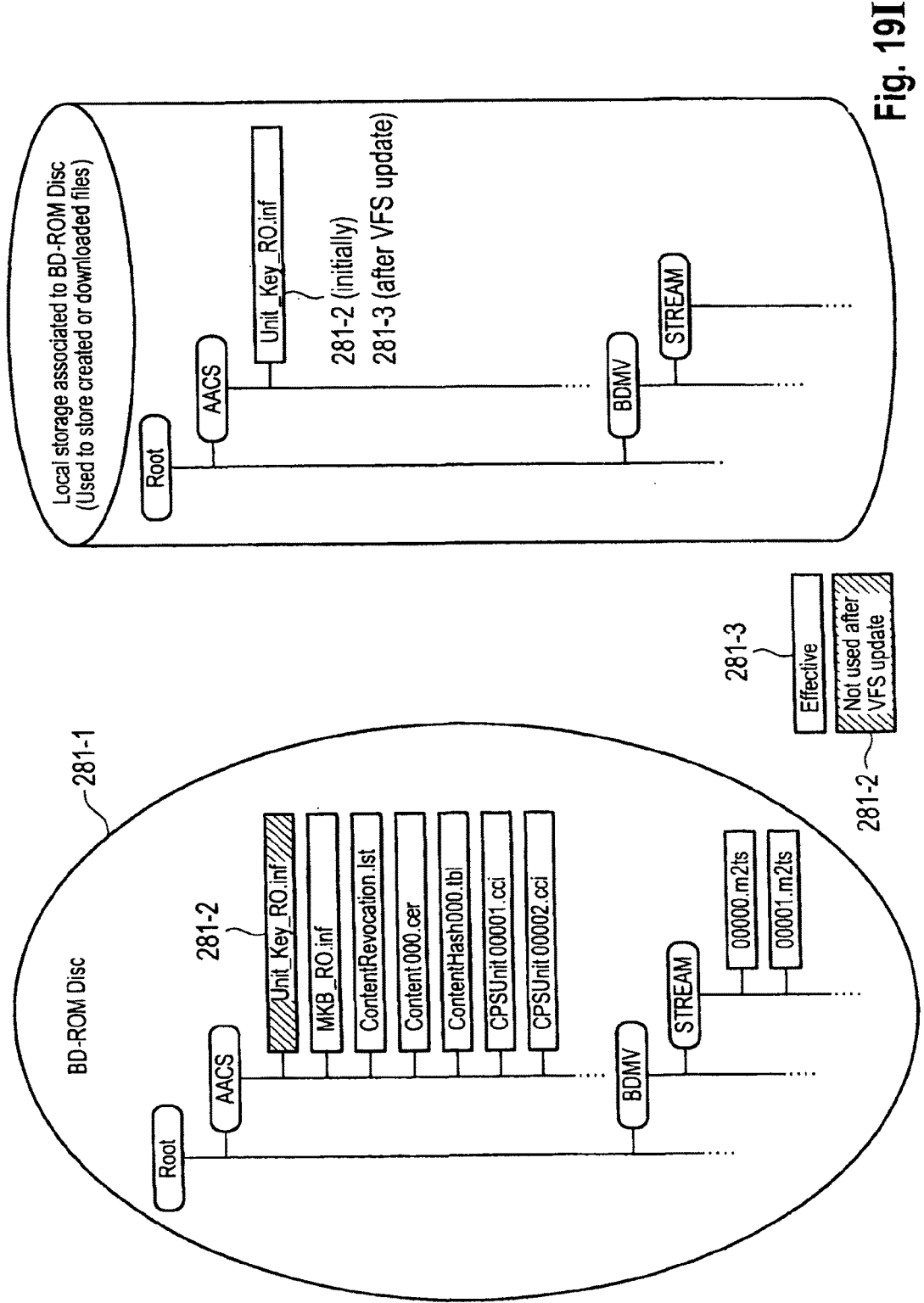
FIG. 19I shows a further embodiment where bytes are read at certain positions, the bytes being interpreted as Unit_Key_RO.inf file.

In a further embodiment shown in FIG. 19I, another possibility of interpreting the bytes read at the certain positions is shown. In this embodiment, the read byte values correspond to at least a part of the Unit_Key_RO.inf file of the AACS encryption standard.

FIG. 19I shows on the left hand side a Blu-ray disc 281-1 schematically showing the logical file system. A part of the file system corresponds to AACS specific files in the AACS directory. One of the files of the AACS is the Unit_Key_RO.inf file. As known by a person skilled in the art and as e.g. defined in the AACS standard, the Unit_Key_RO.inf file may comprise one or more title keys for CPS units, the title keys being encrypted. During playback of the AACS encrypted content stored on the Blu-ray disc 281-1, the title keys stored in the Unit_Key_RO.inf file will be decrypted using the Media Key and the Volume ID (see AACS standard for details in this respect).

However, as is evident, in order to decrypt the title key for playback of AACS encrypted content, a Unit_Key_RO.inf file is necessary that comprises the encrypted keys and not other data or corrupted key data. At least some encrypted title keys must be stored in the Unit_Key_RO.inf file. Otherwise playback of encrypted content will not be possible.

In the embodiment of FIG. 19I, at least some of the title keys stored in the Unit_Key_RO.inf file might include corrupted data, i.e. a part of the file does not contain an encrypted title key but some other data, e.g. corrupted data or the like. From the corrupted data the (correct) decrypted title key cannot be determined. Thus, playback will not be possible at least for a title for which no encrypted title key is available.

According to the embodiment shown in FIG. 19I, the Unit_Key_RO.inf file will be modified, replaced or added to the AACS directory dynamically, e.g. during playback/accessing of the Blu-ray disc 281-1 in a Blu-ray player. The Unit_Key_RO.inf file will be replaced, modified or added to the logical file system by a VFS update command. In other words, the bytes read at the certain positions are in the embodiment of FIG. 19I interpreted as the Unit_Key_RO.inf file and the Unit_Key_RO.inf file created in the local memory will be included in the logical file system of the Blu-ray disc at runtime (dynamically) in the Blu-ray player.

In a further embodiment the Unit_Key_RO.inf file 281-2 may comprise one validly first encrypted title key and other corrupted data e.g. having the appearance of a second encrypted title key. The first title key might allow playback of at least a part of the content stored on the Blu-ray disc 281-1. For example, the first encrypted title key stored in the Unit_Key_RO.inf file on the Blu-ray disc 281-1 may allow playback of an intro of a movie and/or a copyright protection trailer. Then, while this content is reproduced (or at another suitable moment and time), the program instructions on the Blu-ray disc might cause the Blu-ray player to read bytes at certain positions which are then included in the local memory and interpreted as (new) Unit_Key_RO.inf file. This new Unit_Key_RO.inf file might then be included in the logical file system on the side of the player by a VFS update command. After the VFS update command, the new Unit_Key_RO.inf file will be used for further decrypting the further content stored on the disc, e.g. a main movie. This way, even from an illegal copy, playback of at least a part of the content may be possible while other portions may not be decryptable. In other words, it is possible to design a disc such that some portions of the content may be reproducible even without reading correct, i.e. expected, bytes at certain positions since a valid encrypted key for this content is already stored in the Unit_Key_RO.inf file on the disc. However, other portions of the content may not be decryptable without reading the correct, i.e. expected, byte values at the certain positions and including the (correct) dynamically generated Unit_Key_RO.inf file which will then be used for content decryption.

This is illustrated in FIG. 19I by using reference signs 281-2, and 281-3. The Unit_Key_RO.inf file 281-2 stored on the disc might comprise one valid encrypted title key which allows decryption of a first portion of the content, e.g. a trailer. This Unit_Key_RO.inf file could e.g. be used in the beginning of playback of the content stored on the disc. Afterwards (it is also possible that it is before or at other suitable moments) a new unit key Unit_Key_RO.inf file will be created in the local memory and included in the logical file system by a VFS update command. In the example shown in FIG. 19I, this is the Unit_Key_RO.inf file 281-3. This Unit_Key_RO.inf file will be used for playing back the remaining encrypted content stored on the disc.

Figure 19J:
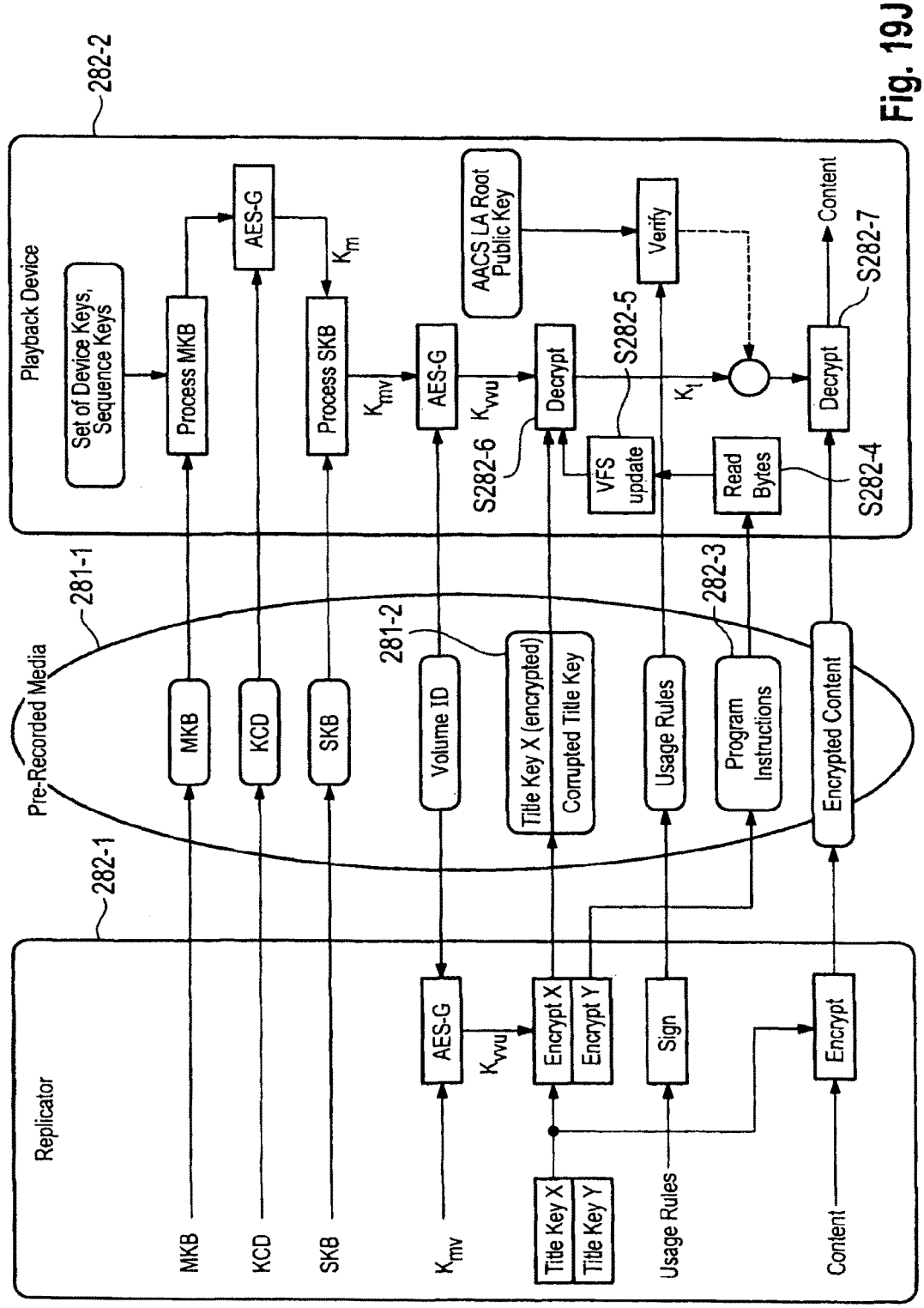
FIG. 19J shows a further embodiment with a Blu-ray disc, wherein the Unit_Key_RO.inf file comprises at least some corrupted data.

The embodiment of FIG. 19I is further illustrated in FIG. 19J. FIG. 19J shows a replicator 282-1, the Blu-ray disc 281-1 already shown in FIG. 19I and a playback device 282-2. On the replicator side 282-1 (e.g. at a manufacturing site of the Blu-ray disc 281-1) two title keys X, Y might be encrypted. However, only the encrypted title key X is stored in the Unit_Key_RO.inf file 281-2 on record carrier 281-1. The encrypted title key Y is used for generating program instructions 282-3, corresponding e.g. to the first portion of program instructions shown in FIG. 19A. The program instructions could e.g. be determined based on a result of a parser that may scan the encrypted content for appropriate positions of the bytes representing the encrypted title key Y. In other words, the program instructions 282-3 will be designed such that bytes at certain positions will be accessed which bytes correspond, when assembled, to the encrypted title key Y. As seen, the Unit_Key_RO.inf file 281-2 stored on Blu-ray disc 281-1, however, only comprises title key X (in encrypted form). The Unit_Key_RO.inf file 281-2 does, however, not include the encrypted title key Y but instead some corrupted data which is referred to as "corrupted title key".

On the playback device, if the Unit_Key_RO.inf file 281-2 is used for playback, only the title which can be decrypted with title key X can be played back unless title key Y in encrypted manner can be reconstructed by executing the program instructions 282-3. As said, this will actually be done by dynamically creating a new Unit_Key_RO.inf and including it into the logical file system of the disc.

If the Blu-ray disc 281-1 is a pre-recorded disc or a legal copy, then the content will be stored on the disc in an encrypted manner (AACS encrypted). Therefore, when playing back Blu-ray disc 281-1, at S282-4, byte values will be read at the certain positions (determined e.g. by the parser at the time of manufacturing the disc) and the read byte values will have the expected values that allow creating the valid Unit_Key_RO.inf file containing the encrypted title keys X and Y. This way both titles (content portions) assigned to title keys X and Y may be decrypted. If, however, a disc is an illegal copy, then the content might no longer be AACS encrypted. This way different bytes will be read at the certain positions than in case of reading the bytes from a pre-recorded disc or legal copy. Thus, a corrupted Unit_Key_RO.inf file may be generated with does not allow decryption of at least a part of the content stored on the disc.

The bytes read at S282-4 are thus interpreted as Unit_Key_RO.inf file and this newly created Unit_Key_RO.inf file will be included in the logical file system of the Blu-ray disc via a VFS update command at S282-5. Therefore, at S282-6, the newly created Unit_Key_RO.inf file might be used for decrypting title key X and title key Y which can then be used at S282-7 to decrypt the encrypted content stored on the disc 282-1 (of course, this does not work for an illegal copy for the reasons set out above).

When the disc is inserted in a player, the program instructions 282-3 (e.g. BD-J object), e.g. the second portion as shown in connection with FIG. 19A, might initiate playback of first content, e.g. a trailer or copyright notification, stored on the disc and being associated with title key X (this content is e.g. part of a first CPS unit). Since encrypted title key X can be found on the disc directly (since it is not corrupted data), at least this portion of the content stored on the disc might be reproducible by the playback device even without reading the bytes at the certain position or when reading "false" byte values from an illegal copy. In other words, even from an illegal copy this portion of the content associated with title key X may be reproduced correctly. However, since the encrypted title key Y is not stored on the disc directly (but will be generated dynamically at S282-4 and S282-5), it will not be possible to playback second content associated with title key Y (this content is e.g. part of a second CPS unit) unless the correct byte values are read from the certain positions.

As has been seen above, FIGS. 19I and 19J show a method of using data extracted from an AACS encrypted content (reading bytes at certain positions in areas where the encrypted content is expected), where e.g. a collection of bytes (data entity) of the transport stream files (e.g. the files 00000.m2ts and/or 00001.m2ts shown in FIG. 19I) of the encrypted master disc define the Unit_Key_RO.inf file. During playback of the BDROM title, a BD-J object (program instructions, e.g. program instructions 282-3 shown in FIG. 19J or program instructions 272-4 of FIG. 19A) extracts this data from the AACS encrypted content and stores the bytes as the Unit_Key_RO.inf file in the BUDA (Binding Unit Data Area) of the local storage of the playback device (which requires at least a BD profile 1.1). After the execution of a VFS (Virtual File System) update, this file replaces the original file on the pre-recorded disc.

The BD-ROM standard specifies CPS units where for each of these units, a unique title key for encryption of the AV content might be stored in encrypted manner in the Unit_Key_RO.inf file. As explained above, this allows hiding the CPS unit key (by removing the encrypted title key from Unit_Key_RO.inf file on a pre-recorded disc or by storing a corrupted version) for the main movie (this could be e.g. 00001.m2ts shown in FIG. 19I) within the AACS encrypted AV data and create it dynamically during playback in the BUDA of the local storage. The transport stream 00000.m2ts in FIG. 19I could e.g. contain a HDMV intro (including copyright warnings/notifications or the like) and a HDMV menu and could be decrypted because the encrypted title key for this CPS unit is available on the disc (this could correspond to encrypted title key X shown in FIG. 19J). On selection to start the main movie, the BD-J object (program instructions 282-3) will do its job and extract the bytes for the title key (e.g. title key Y) for the main movie CPS unit by accessing bytes at certain positions in the encrypted content.

Thus, also if the AACS is broken (compromised) a copier may not decrypt the AACS encrypted files depending on the hidden CPS unit key because the copier (copy tool) is missing the encrypted title key. Illegal copy tools currently do not need to launch/analyze the BD title to circumvent the standard protection—this is a convenience feature of such copy tools providing a stand-alone solution (one click) for copying a disc. When implementing the method as described, it would be more difficult for a copy tool to make a copy since the BD title would have to be thoroughly analyzed. Moreover, in order to hack the copy protection it would be necessary to have the complete AV data at hand (in order to analyze the positions where bytes are read). This means that a hacker will need to have a large amount of data (e.g. 20 gigabyte) which might not easily be transmitted e.g. over the internet.

As described, in the embodiments of FIGS. 19A to 19J, byte values are read at certain positions. In a further embodiment (not shown), data representing the certain positions may be provided on a server for download. In order to provide a copy protection, the server only supplies the "correct" positions in case the optical data carrier has been identified to be an original (this identification is done as described throughout this specification). "Correct" positions means that positions are provided which allow the assembly of a data entity such that a content reproduction is possible in genuine quality. In this regard, all of the possibilities described in connection with FIGS. 19A to 19J are possible. For example, the data entity may represent key material as shown in FIG. 19D, a Java Class File as shown in FIG. 19E and so on. For example, in case the "correct" positions are supplied, this may lead to selection of the correct playlist among a large number of fake playlists and so on.

However, in this embodiment, in case the disc check fails and it is determined that the record carrier is not an original, either no certain positions are supplied from the server or certain positions which allow reproduction only in non-genuine quality. For example, key material as in FIG. 19D may be determined which will lead to selection of a fake, e.g. advertisement, playlist and so on. All of the possibilities described throughout this specification for reproduction in non-genuine quality are applicable.

Figure 20:
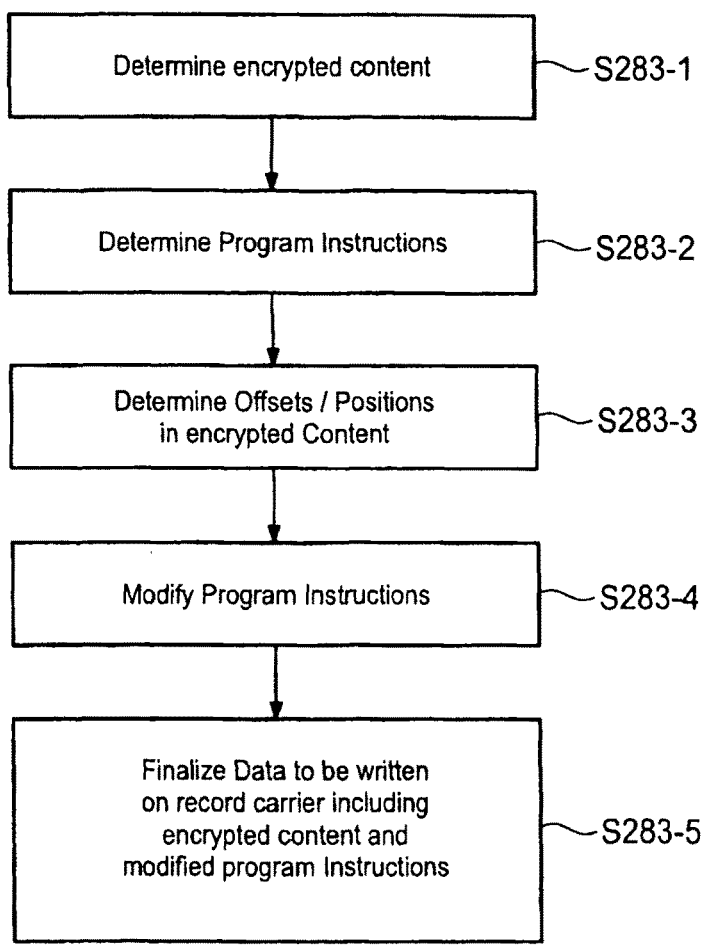
FIG. 20 shows steps that may e.g. be part of a mastering process for a Blu-ray disc.

FIG. 20 shows steps that may e.g. be part of a mastering process for a Blu-ray disc. At S283-1 encrypted content is determined. This encrypted content is e.g. encrypted audio visual or audio content to be stored in the first area 272-6 shown in FIG. 19A.

At S283-2, program instructions are determined. At S283-3, offsets (positions) of bytes may be determined, e.g. searched (parsed) in the encrypted content. For example, at S283-3, bytes representing key material (cf. FIG. 19D), a Java class file (cf. FIG. 19E), a playlist file (cf. FIG. 19F), and/or a Unit_Key_RO.inf file (cf. FIGS. 19I and 19J) might be searched in the encrypted content. Since the encrypted content is a large amount of data, every possible byte value out of the 255 possible byte values will statistically occur at some positions. These positions are then used to determine program instructions (e.g. a BD-J object) that will, when executed on a playback device, read the byte values at the respective positions. The positions are e.g. included in the BD-J object (program instructions), either compiled to or in a separate file describing these positions.

Thus, at S283-4, the program instructions that have initially been determined at S283-2 might be modified so as to incorporate reading the bytes at the certain positions. Also, commands such as e.g. VFS update commands or further instructions for modifying the control flow or the like might be included at this stage.

Then, at S283-5, the data to be written on the record carrier is finalized. This data includes the encrypted content data which has been determined at S283-1 (and which has not further been modified) and the modified program instructions determined at 283-4.

As has been seen above, in FIGS. 19D, 19E, and 19F, the data entity (representing key material, a Java class file, and a playlist file, respectively) is not assembled for the purpose of content decryption. The data entity is also not assembled as data to be decrypted. The latter is also the case for FIGS. 19I and 19J where the data entity represent the Unit_Key_RO.inf file of the AACS encryption standard.

As has also been seen above, the copy protection is effective since if the AACS encryption is removed this would result in "wrong" byte values being read from the certain positions. This would then result in various disturbances when trying to playback disc (including e.g. a malfunctioning menu, usage of a fake playlist, etc.). Thus, if a copier removes the AACS copy protection, the (illegal) copy will not behave like the original during playback.

Regarding FIGS. 19A to 19J, it should also be noted that the certain positions could be (pseudo) random positions distributed across all of the encrypted content. This way, a copier cannot do an analysis of the BD-J object without the complete AV content (which is huge in size compared to the size of the BD-J object).

As should also be clear, FIGS. 19A to 19J could be used for the decision whether a disc is an original or copy, e.g. by verifying just one bit or byte value at a predetermined or dynamically determined position in the encrypted content. In fact any predetermined number of bits and/or bytes could be used. Thus, any bit and/or byte sequence could be read as a key for verifying whether the disc is an original or a managed copy and still comprises content stored in encrypted manner (as is clear, in case of decrypted content, the read bytes would in general be different at the positions).

In further embodiments, there may also be provided a method for copy protection that will be explained at hand of FIGS. 21 to 24. Of course, these embodiments may be combined with any of the previously explained embodiments.

Figure 21:
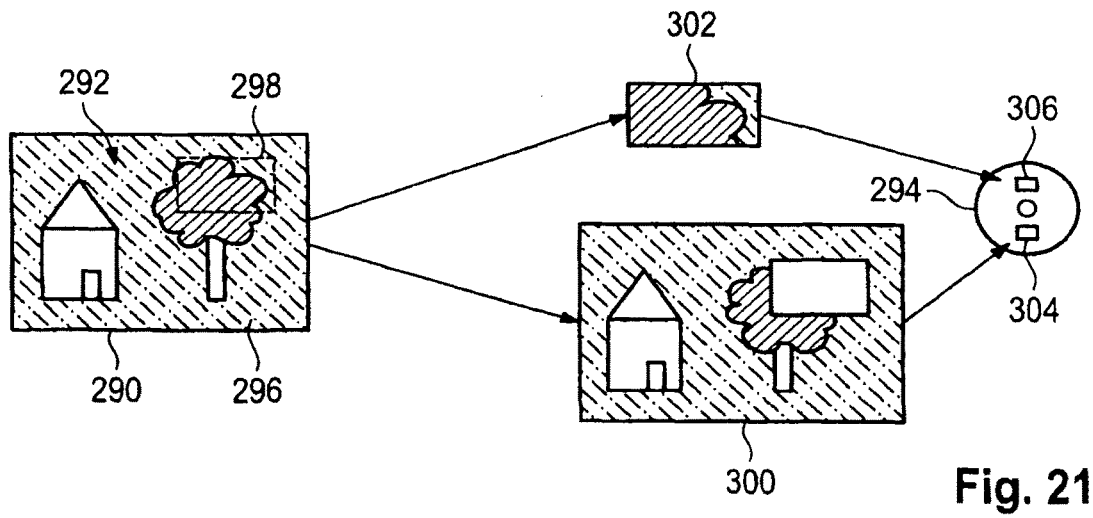
FIG. 21 shows an embodiment where copy protection is realized by generating different video sequences for different portions of a genuine audiovisual file.

As seen in FIG. 21, there may be provided a sequence of genuine video frames 290 including genuine video content 292 that is to be stored on a record carrier 294 in a copy protected manner. E.g. for copy protection, the genuine frames 290 might be divided into a first portion 296 and a second portion 298. As seen, the second portion 298 is smaller than the first portion 296. The ratio of the size of the second portion 298 to the first portion 296 may e.g. be 1:6 to 1:3.

Also, as can be seen, the first portion 296 corresponds to the genuine frame 290 excluding the second portion 298 (the content of the second portion); and the second portion 298 corresponds to the genuine frame 290 excluding the first portion 296.

Based on the first portion 296, a first video sequence 300 may be determined e.g. the first portion 296 (without the video content in region 298) is encoded to obtain respectively encoded video data. The first video sequence 300 corresponds to the genuine frames 290 excluding the second portion 298

(the content). Also, there may be determined a second video sequence 302 that corresponds to the genuine frame 290 excluding the first portion 296.

Thus, when reproducing the first video sequence 300, only the content of the genuine frame excluding the content of the second portion 298 is reproduced. Also, when the second video sequence 302 is reproduced, only the content shown in the "window" corresponding to the second portion 298 is reproduced.

The first and second video sequences 300, 302 may be stored on the record carrier 294 as first file 304 and second file 306, respectively.

An advantage of dividing the genuine frames 290 into first and second video sequences 300, 302 which may be stored as separate files 304, 306 on record carrier 294 is that a copy program might only copy one of the sequences, i.e. either the first video sequence 300 or the second video sequence 302. Since the file size of the first file 304 will be much larger than the file size of the second file 306 which is due to the fact of the different sizes of the first and second portions 296, 298, copy programs might only copy the large file, i.e. the first file 304. This is because a copy program might suspect a large file to include a main movie whereas small files may be considered as bonus tracks or the like. In case of a Blu-ray disc, this effect may be enhanced if a playlist (fake playlist, non-genuine playlist) is included on the disc that does not reference the second video sequence 302 at all.

Figure 22:
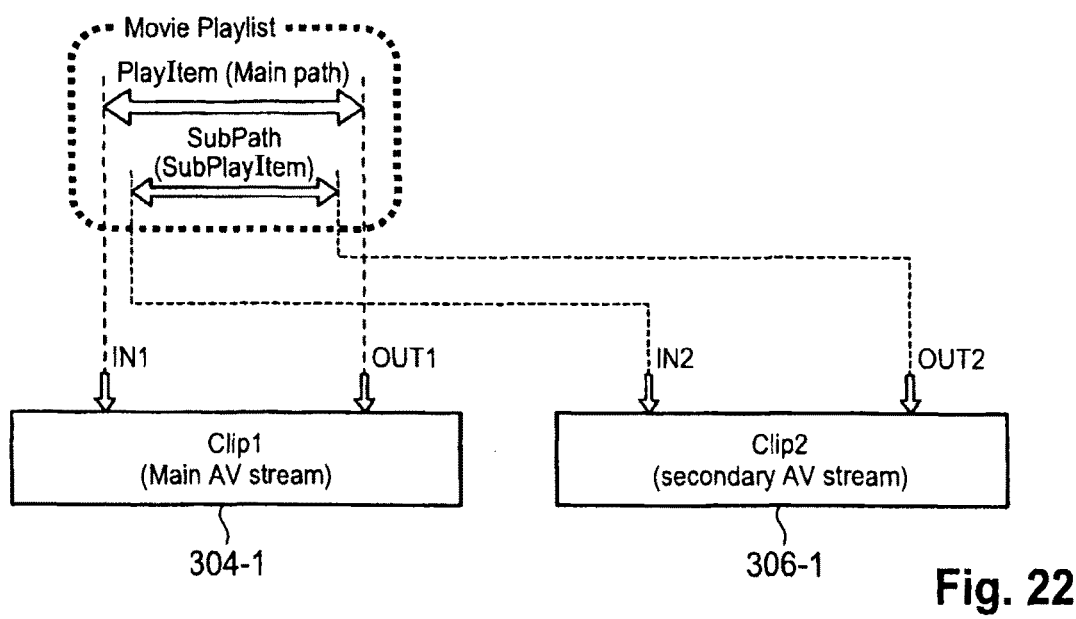
FIG. 22 shows an example for a BD playlist with a main and a subpath.

If the record carrier is a Blu-ray disc, then the first video sequence 300 may correspond to or be stored in a portion of a clip 304-1. The second video sequence 306 may correspond to a further clip or be stored in a portion of a further clip 306-1 as shown in FIG. 22. The respective portion of the first clip 304-1 could be referenced by a PlayItem in a playlist as a main path, whereas the respective portion of the second clip 306-1 could be referenced in a playlist as a subpath (as sub play item, here written as "SubPlayItem").

In order to reproduce the genuine video content without any artifacts, the first and second video sequences 300, 302 (which in case of a Blu-ray disc could be included in first and second clips 304-1, 306-1) must be reproduced synchronously. This may be done by designing respective playlists.

Thus, there may be one playlist stored on the Blu-ray disc or alternatively downloaded from a server (as explained above at hand of FIG. 9) that allows a synchronous playback of the two video sequences stored in the first and second clips 304-1, 306-1.

In order to improve the copy protection, there may also be stored a plurality of further playlists (additional fake playlists) on the disc. If one of these further playlists is used for playback, the first and second video sequences might not be reproduced synchronously. Further, on the disc there may be stored some program instructions, e.g. in a BD-J object, that when executed discriminate the playlist that allows synchronous playback from the further playlists based on characteristic parameters or encryption parameters of the record carrier (as explained above).

In fact, all of the above explained methods for original disc check/key extraction may be used for discriminating the playlist allowing synchronous playback from other playlists.

Figure 23A:
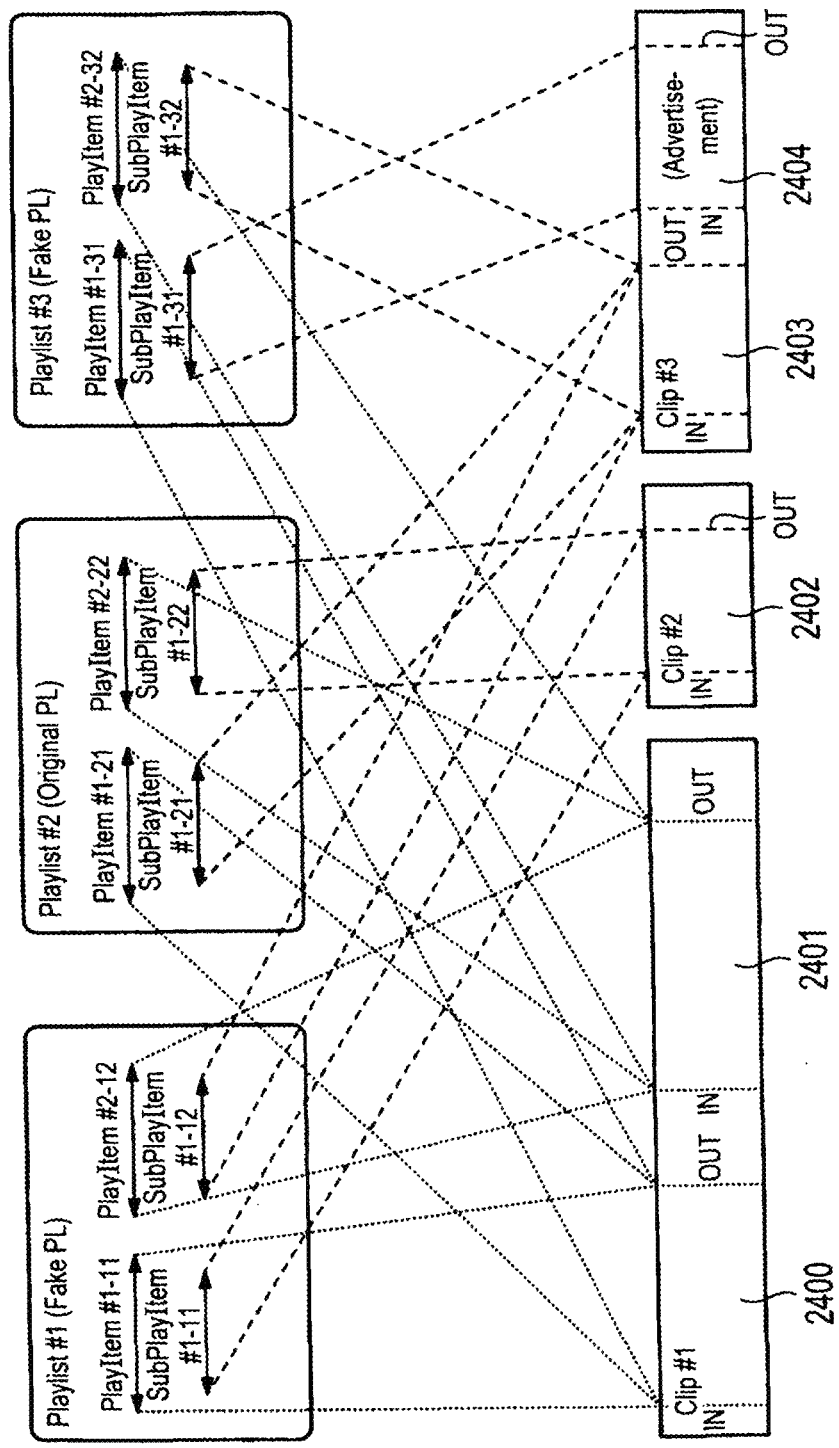
FIG. 23A shows an embodiment with fake playlists based on playlists with varying sub-paths.

In a further embodiment shown in FIG. 23A fake playlists (throughout this specification also referred to as "non genuine playlists") may be determined based on combining PlayItems (PI's) with SubPlayItems (SPI's), where the SubPlayItems reference video sequences that do not match to a respective PlayItem.

In FIG. 23A, three clips clip#1, clip#2 and clip#3 are shown comprising different video portions 2400 to 2404. In the example of FIG. 23A, only the second playlist playlist#2 is an original playlist allowing playback in genuine quality. Thus, only playlist#2 may result in a reproduction of the genuine video content stored on the disc. i.e. reproduction of the genuine frames.

In the embodiment shown in FIG. 23A, video portions 2400, 2401, 2402, and 2403 are portions of the genuine content stored on the optical record carrier, i.e. portions 2400, 2401, 2402, and 2403 belong to genuine frames. Video portion 2404 of clip#3, however, comprises advertisement. This portion is referenced in playlist#3 by SubPlayItem#1-31 as indicated in FIG. 23A by the dashed lines. The other references can easily be seen from FIG. 23A, e.g. SubPlayItem#1-12 of Playlist#1 references portion 2403, PlayItem#1-31 of Playlist#3 references portion 2400 and so on.

In the example of FIG. 23A, portions 2400 and 2401 store respective first video sequences. In the example, the first video sequence stored in portion 2400 corresponds to first video sequence 300 of FIG. 21. Moreover, portions 2402 and 2403 store respective second video sequences in the sense as explained above in connection with FIG. 21. In the example, the second video sequence stored in portion 2403 corresponds to second video sequence 302 of FIG. 21.

Figure 23B:
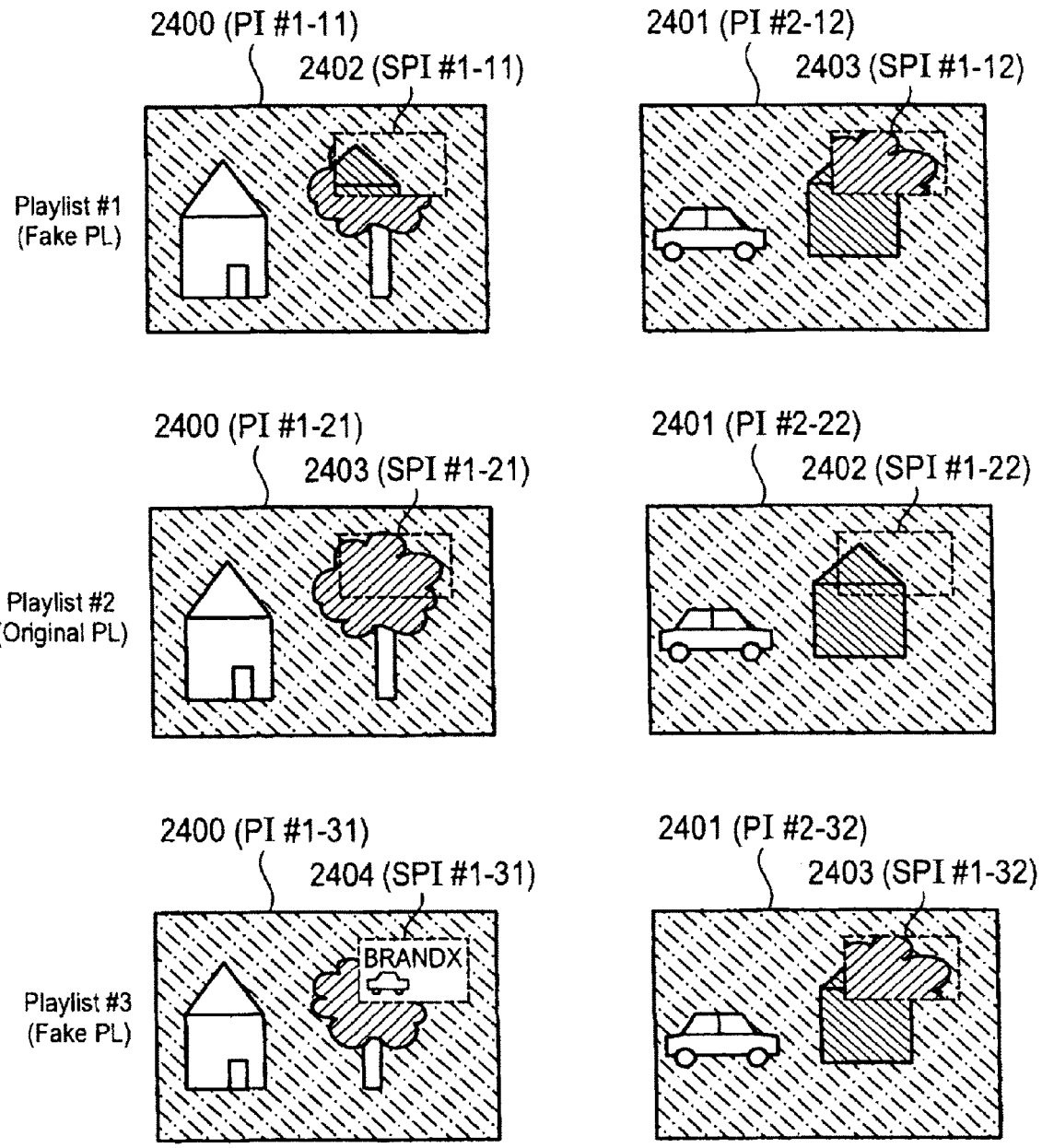
FIG. 23B shows the result when using the playlists of FIG. 23A for playback.

The different results of reproduction when using the playlists#1, #2, and #3 of FIG. 23A for playback are shown in FIG. 23B.

As seen, when playlist#1 is used for reproduction, first the content of video portion 2400 which is referenced by PlayItem PI#1-11 is reproduced together with the video content stored in portion 2402 referenced by SubPlayItem SPI#1-11. However, since this content does not correspond to the "missing" portion belonging to the content of portion 2400, the content of portion 2402 will be seen as a picture in the picture of the content of portion 2400. This will be distracting to a viewer.

As seen in FIG. 23B, only when using playlist#2 (original playlist), the genuine frames will be reproduced. Since the second video sequence 2403 corresponds to the first video sequence 2400, the two video sequences (portions of the genuine frames) will be joined together as in a "puzzle". Thus, a viewer will not note that the second video sequence 2403 is actually "inserted" into the first video sequence 2400. The same happens in the right picture when using the playlist#2 for playback (this is the second picture from the top in the right column of the pictures shown in FIG. 23B). Here, the second video sequence 2402 is inserted in the first video sequence 2401. Again, the viewer will not note this since the two video sequences belong to the same genuine frames.

As seen in the example of FIGS. 23A and 23B, when playlist#3 is used, and when the portion 2400 is reproduced, at the same time portion 2404 will be reproduced comprising advertisement. Thus, the viewer will be distracted by the advertisement.

As should be clear from FIGS. 23A and 23B, it is not necessary to provide additional content such as the advertisement content stored in portion 2404, on the disc, in order to create additional (fake) playlists. Such additional (fake) playlists can also simply be determined by referencing via a SubPlayItem a "wrong" missing portions when reproducing a certain first video sequence, see e.g. the result shown in the upper left corner of FIG. 23B where a wrong missing video sequence (stored in portion 2402) is inserted into the video sequence stored in portion 2400. In this case the video sequence stored in portion 2402 may be referred to as third video sequence, whereas portion 2400 stores a first video sequence and portion 2403 (which is the "missing" portion) stores a respective second video sequence.

In a further embodiment, it may also be possible to not provide the original playlist (genuine playlist) at all on the disc. Thus, only playlists referencing wrong missing portions might be included on the disc. The original playlist might be determined by reading bytes at certain position from the AACS encrypted content (see e.g. FIG. 19F and corresponding description) or it may be provided on a server for download.

If the correct playlist is stored on the disc among a plurality of fake playlists, the correct playlist (in the example of FIGS. 23A and 23B this is playlist#2), may be discriminated (distinguished) from the fake playlists based on the same techniques explained, i.e. "key extraction" and selection of playlist based on program instructions using the key data as input data. Of course, the embodiment of FIGS. 23A and 23B (as well as the embodiment of FIG. 23C described in the following) may be combined with the clip slicing and shuffling. In this case the possibilities of generating additional (fake) playlists described throughout the specification may be combined and the effect of confusing copiers can be increased.

Figure 23C:
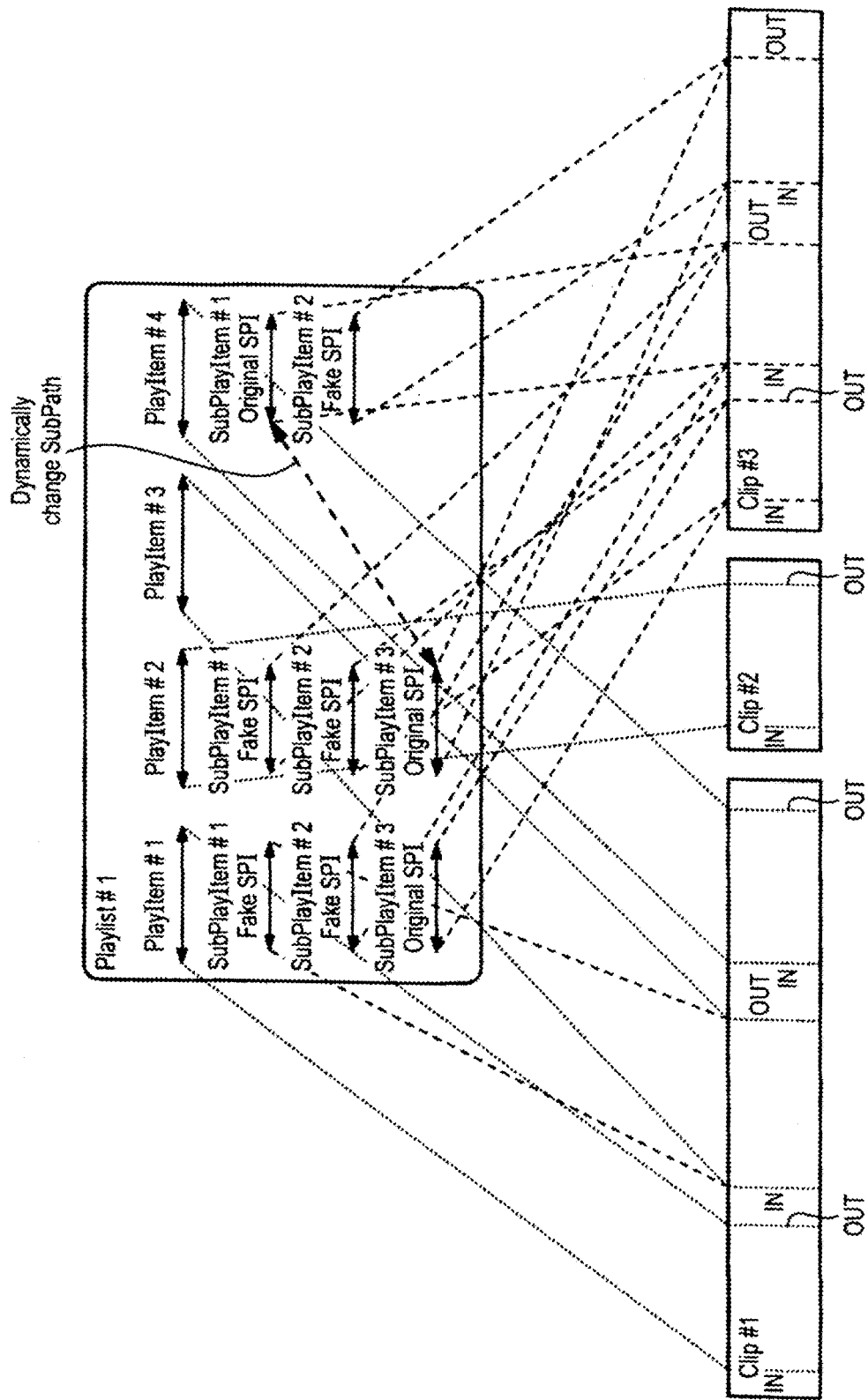
FIG. 23C shows an embodiment with fake playlists based on playlists with a plurality of sub-paths.

In yet another embodiment shown in FIG. 23C (that may be referred to as "fake playlists based on playlists with a plurality of sub-paths and—optionally—with dynamically changing subpath during playback"), a playlist with a plurality of different sub-paths may be provided. Only one of the sub-paths may be the correct sub-path that will lead to a correct insertion of the missing portion into a main path. The correct sub-path may again be determined during playback based on the extracted "key material". Also, the correct sub-path that will lead to the insertion of the correct second video sequence into a first video sequence, may be changed dynamically as seen in FIG. 23C. As seen, for the first two PlayItems #1 and #2, the SubPlayItem #3 is the original ("correct") SubPlayItem that will lead to a reproduction in genuine quality. However, for PlayItem #4, there are less SubPlayItem and, moreover, it is now the SubPlayItem #1 that references the original (missing) portion (second video sequence).

The abbreviation "SPI" in FIG. 23C means SubPlayItem. As should be clear, in FIG. 23C, if the wrong SubPlayItem, e.g. the SubPlayItem #1 for PlayItem #1 is selected for playback, this will lead to a picture-in-picture effect that will distract the viewer. If, however, the SubPlayItem #3 (original SPI) is used for PlayItem#1, then the view will not notice that actually a SubPlayItem is at all displayed. This is the same for FIG. 23A. As is readily apparent, the section of the original ("correct") SubPlayItem could be made dependent on the key material (e.g. encryption characteristics) and the program instructions that will be used for reproducing the content.

The two embodiments of FIG. 23A "fake playlists based on playlists with different sub-paths" and FIG. 23C "fake playlists based on playlists with a plurality of subpaths" may be combined.

Figure 24A:
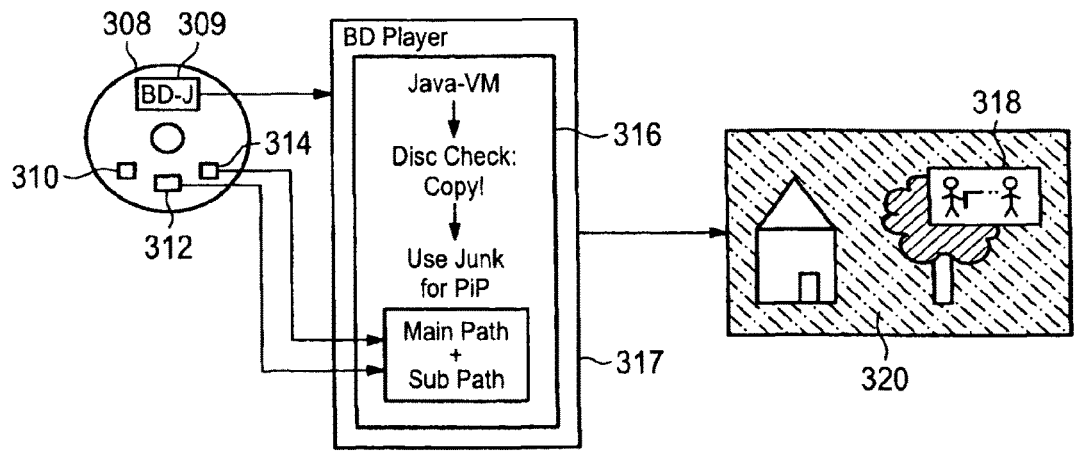
FIG. 24A shows an embodiment where junk content is inserted into a main movie.

FIG. 24A shows an embodiment where a Blu-ray disc 308 comprises a BD-J object 309 for controlling playback and for performing an original disc check/key extraction. The disc 308 further comprises a plurality of audio video files 310, 312, 314. The file 314 might correspond to a first video sequence as e.g. the first video sequence 300 shown in FIG. 21. In other words, the file 314 may be a large file excluding a smaller portion such as e.g. the second portion 298 of FIG. 21.

The files 310, 312 may be smaller in size. The size may e.g. be the same size as that of the second portion 298 of FIG. 21. However, only file 310 may comprise the "missing portion", i.e. the portion of the genuine frame that is missing in the file 314. File 312 may comprise other content than file 310. When the disc 308 is a copy and it is played back on a player 317, the player 317 in a Java virtual machine 316 may perform an original disc check. In the example of FIG. 24A, the disc 308 is a copy so that the original disc check fails. Thus, a playlist stored on the disc 308 might be selected that references file 314 as a main path and file 312 comprising junk data as a subpath. The two files 314 and 312 will be played back together such that the result is as shown on the right hand side of FIG. 24A. The picture denoted with reference sign 318 may result from file 312 and the picture with reference sign 320 may be the result of file 314.

The content of the file 312 might e.g. include advertisement or other junk content. Moreover, the content might be "eye-catching" video content that will distract a viewer from the content of the main movie. In the example of FIG. 24A, the content shown at 318 is e.g. a shooting scene that will distract the viewer from the quiet scene depicted at 320.

Figure 24B:
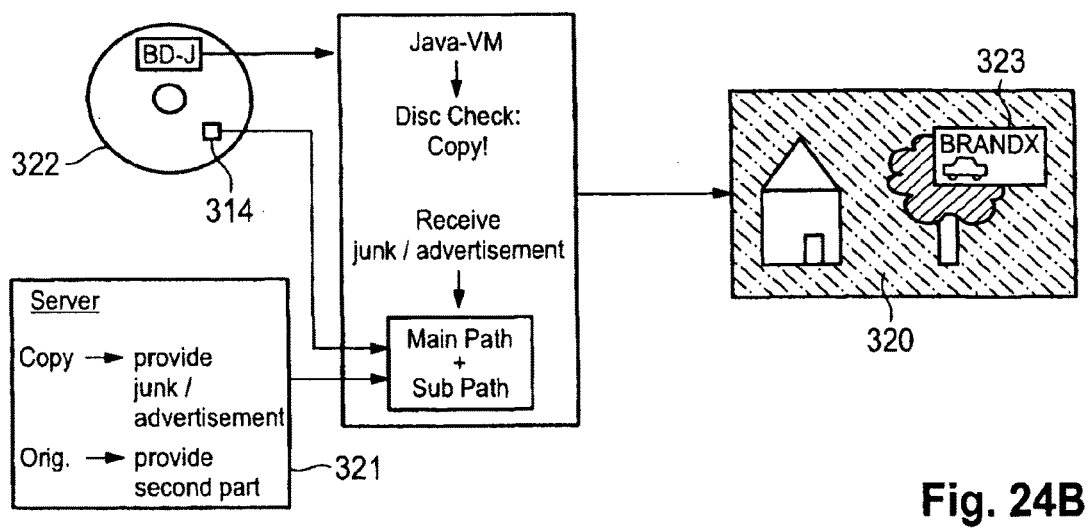
FIG. 24B shows an embodiment where junk data or a missing portion is provided from a server and included into a main movie as a subpath.

FIG. 24B shows a further embodiment where a disc 322 only has one file stored thereon. For illustrative purposes, this file might be the same file 314 as shown in FIG. 24A, i.e. it might be a file comprising a large portion of genuine frames such as the first video sequence 300 shown in FIG. 21. However, disc 322 does not contain a file that would correspond to smaller portions such as e.g. a second portion 298 shown in FIG. 21. Thus, if a player was to play only the file 314 there would be a blank space as shown in the frames 300 in FIG. 21 (or there would be advertising or distracting content shown in case the advertising/distracting content has been included in the video sequence of the main path).

The missing portion, e.g. the second portion 298/second video sequence 302 shown in FIG. 21 might be provided on a server 321 for download. Access might only be allowed if disc 322 has been determined to be an original or a legal (managed) copy. Otherwise, the server 321 may provide junk or advertisement content. The content provided by the server 321 in FIG. 24B may, therefore, provide video data to be used in a subpath, whereas the video to be produced as a main path in a playlist might be provided from the disc 322.

In the example of FIG. 24B, the disc 322 is a copy so that an original disc check of the BD-J object/Java virtual machine fails and, therefore, the server 321 provides advertisement content. This is depicted at the right hand side where at 323 a commercial for a car of "BRAND X" is included in the main movie depicted at 320.

Of course, as already mentioned, if the disc check succeeds, i.e. the disc is an original, then the second portion from the genuine frames would be synchronously reproduced with the first portion of the genuine frames. Thus, a viewer would not notice that a portion of the viewed picture results from a main path and another portion from a subpath.

Of course, it is also possible that in a further embodiment (not shown) only a portion of a second video sequence, e.g. a portion of the second video sequence 302 shown in FIG. 21 would be stored on the record carrier and a remaining portion of the second video sequence would be downloaded from a server if the original disc check succeeds.

As shown in FIGS. 24A and 24B, there is provided an effective method for copy protection since if the original disc check fails, distracting/eye-catching content might be included in a main movie. Moreover, in FIG. 24B, the copy protection can be realized with requiring only little bandwidth since the portion that will be included if the original disc check succeeds is very small in size and can be easily downloaded from a server.

As regards the embodiments of FIGS. 21 to 24, it should be noted that it is possible that the picture-in-picture only be applied to some portions in e.g. a movie as original AV data (content) that shall be copy protected. In other words, only for some portions of the AV data two separate video sequences are determined whereas for other portions there would be only one video sequence. In this case, only some PlayItems of a playlist may have a sub-path referencing the missing portions encoded in the one video sequence that will be displayed as a picture in picture. This may be difficult for copiers to spot. I.e. a copier might at first sight not notice that in some portions, the PiP function of the BD standard is used for including distracting content in case the original disc/managed copy is not used for playback.

Also, in a further embodiment, the video sequence of the main path may already include advertising or distracting content in the region of the smaller portion. For example, in FIG. 21, the region in first video sequence 300 where the second portion 298 has been "cut out" might be filled with a video sequence corresponding to advertising or other distracting content. This resulting video sequence could then be encoded, such that it would be played back when being referenced by a main path in a playlist. If the original disc check succeeds, then a playlist could be selected where a video sequence referenced in the sub-path overlays the advertising/distracting content.

In yet a further embodiment, the cut out portion (second portion 298 in FIG. 21) could be moving, i.e. appear at different positions, during the course of a movie (or other video content). For example, the smaller picture could be moving over faces of persons in a movie. Thus, the position of the second portion 298 in FIG. 21 (and portions 318, 320 in FIGS. 24A and 24B) may depend on the video content that is to be copy protected. The position may be chosen such that it distracts a viewer most from the content if the cut out portion is not inserted but other content. For example, if advertising content is included, the advertisement would be displayed over faces of persons in movies. This would certainly distract a viewer. The distraction may be increased by switching on/off the PiP and moving it additionally. In this case, if a "wrong" playlist is used, not only would advertisements be moving but also the advertisements would be switched on and off. This is also very annoying for viewers.

Figure 25:
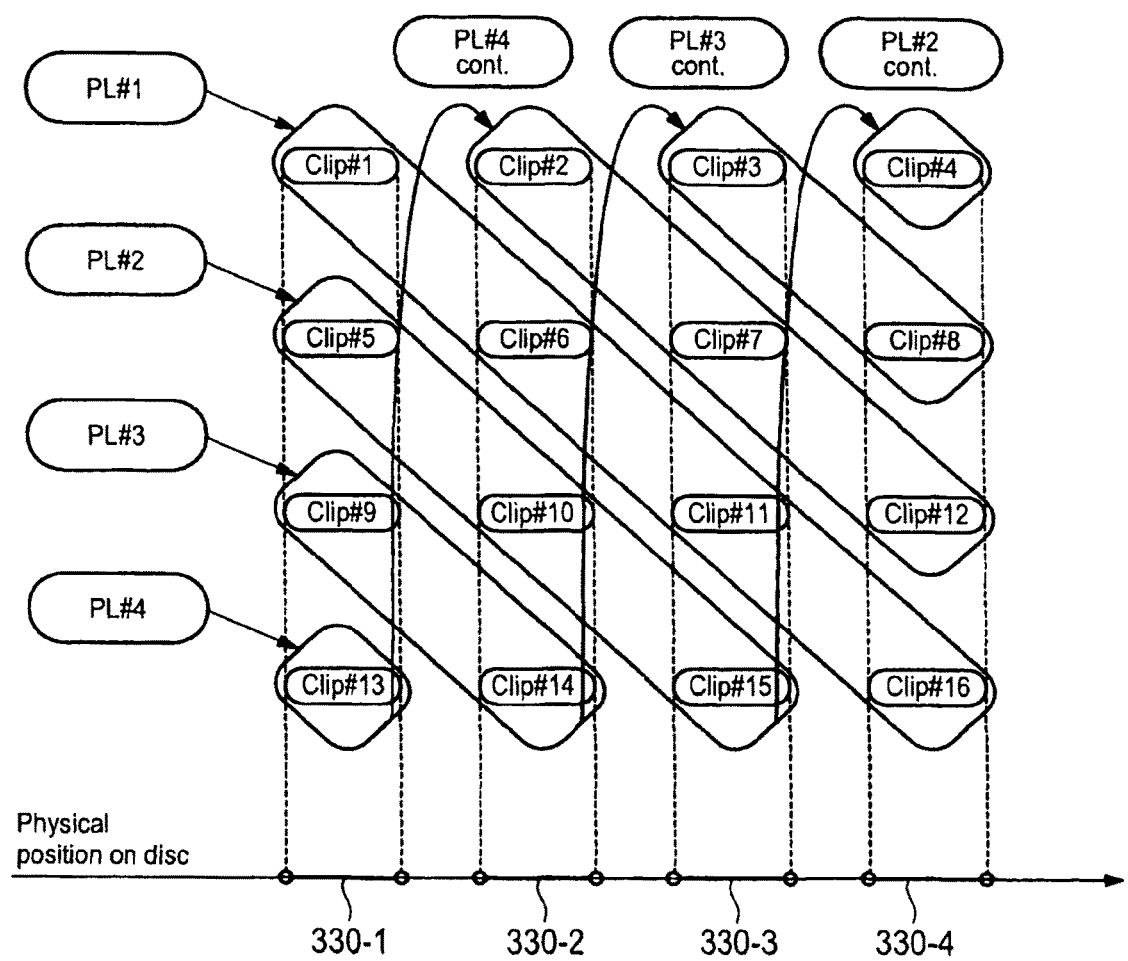
FIG. 25 shows an embodiment of a record carrier where certain sections are referenced by different logical file names.

In a further embodiment of a method for copy protection shown in FIG. 25, it may also be possible that in a logical file system of an optical record carrier a plurality of file names, i.e. logical file names of the logical file system reference the same physical part of a disc. Again, this concept can easily be combined with any of the above described embodiments.

In FIG. 25, a record carrier, e.g. an optical record carrier, has four different areas (portions) 330-1, . . . , 330-4 that each correspond to physical areas (portions) of the disc, e.g. different physical blocks or sectors.

Each or at least a part of the areas 330-1, . . . , 330-4 may be accessed via different logical file names in the logical file system of the record carrier. For example the first area 330-1 may be accessed, i.e. referenced, in the logical file system by the logical file names: clip#1, clip#5, clip#9 and clip#13.

Thus, when a playback device receives an instruction to read clip#1 as logical file name, area 330-1 will be accessed by e.g. an optical pickup. Area 330-1 will also be read in case the playback device receives an instruction to access clip#5, clip#9 and/or clip#13.

If the record carrier is e.g. a Blu-ray disc, then the logical file system may e.g. be a UDF file system such as e.g. UDF2.50 file system. However, in order to use a plurality of logical names to reference a same area, the UDF file system of such a Blu-ray disc might have to be modified. For example, file entries might be added, physical positions of the data might be changed and/or the reference lengths may be changed.

Independently of whether the record carrier is a Blu-ray disc, DVD or any other known or future format, the concept of using a plurality of different file names for accessing a same area allows creating a plurality of different orders, e.g. playlists, for playing back a same content by accessing the same physical areas.

For example, in FIG. 25 a playlist PL#1 will play, in the logical file system, clip#1, clip#6, clip#11 and clip#16, thereby accessing areas 330-1, 330-2, 330-3 and 330-4, respectively. Playlist PL#2 will play, in the logical file system clip#5, clip#10, clip#15 and clip#4, thereby accessing the physical areas in the same order as for playlist PL#1, i.e. areas 330-1, 330-2, 330-3 and 330-4, respectively. Also playlists PL#3 and PL#4 depicted in FIG. 25 will lead to the same order of accessing the physical areas 330-1, 330-2, 330-3 and 330-4.

Thus, all of the playlists PL#1 to PL#4 in fact playback the physical areas 330-1, 330-2, 330-3 and 330-4 in the same order. However, in the logical file system, different clips are accessed.

Figure 26:
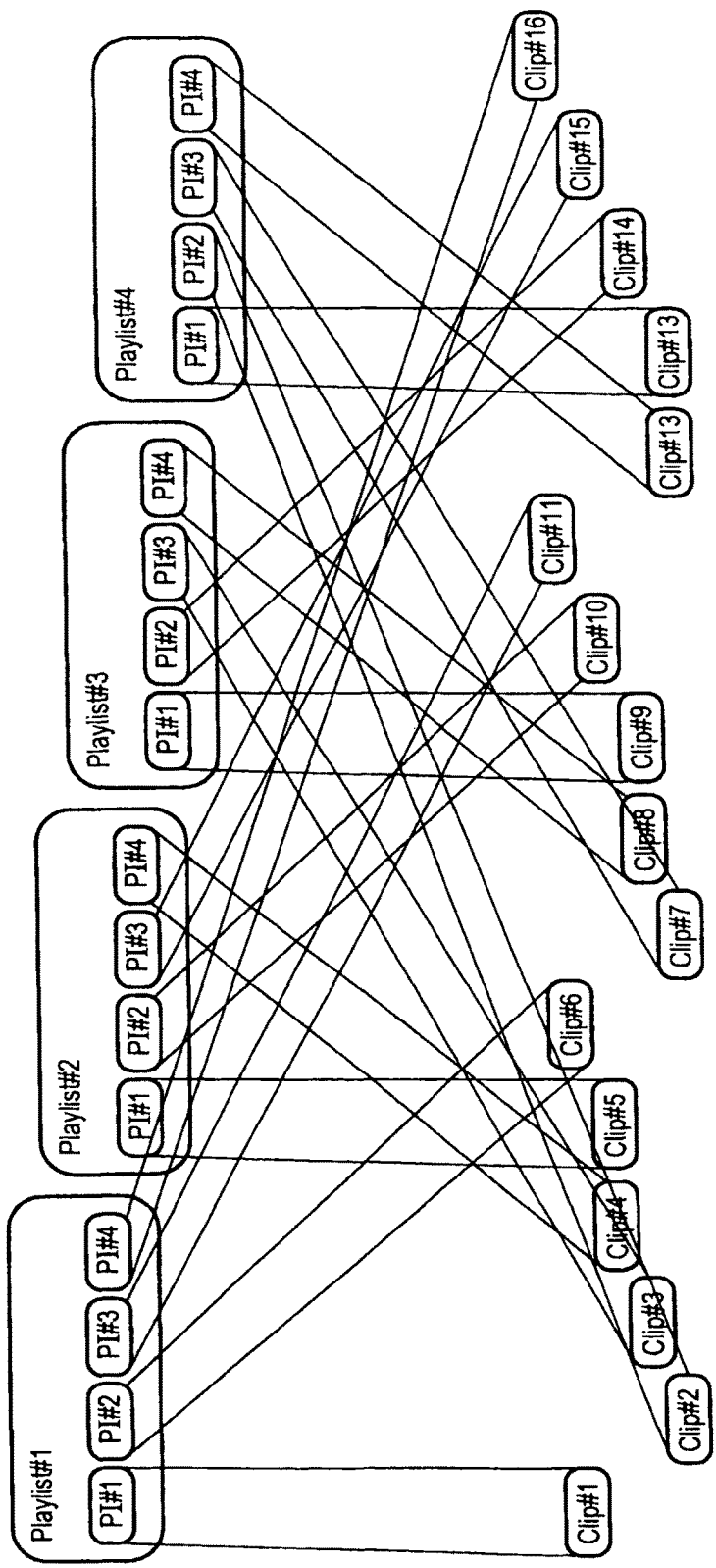
FIG. 26 shows the logical file system of FIG. 25.

The accessing in the logical file system is shown in FIG. 26. Note that the example of FIG. 26 corresponds to the example in FIG. 25. However, FIG. 26 shows only the logical file system. For example PlayList#1 corresponds to PL#1 in FIG. 25 and comprises the following PlayItems: PI#1, PI#2, PI#3, and PI#5 leading to playback (in the logical file system) of the files clip#1, clip#6, clip#11, and clip#16, respectively.

Thus, FIGS. 25 and 26 illustrate an embodiment where a plurality of AV files that may e.g. be stored in the areas 330-1 to 330-4, are stored on an optical record carrier. The AV files may have a first order. For example, if there is a one-to-one mapping between an AV file and an area, the first order may be defined by the position of the area, i.e. the first order is: 330-1, 330-2, 330-3 and 330-4.

When the AV files are played back in the first order, audio-visual content of the AV files may be reproduced in a genuine playback sequence. For example, if the AV files corresponding to the areas 330-1, . . . , 330-4 corresponds to a movie, then the movie will be played back as created by a director.

As also seen in FIGS. 25 and 26, the logical file system is designed such that a plurality of file names of the logical file system allow accessing the same areas/AV files. For example, the AV file corresponding to area 330-2 may be accessed by the different logical file names clip#2, clip#6, clip#10, and clip#14.

Moreover, as FIG. 25 shows, there may be a plurality of playlists, e.g. a first and a second playlist that each indicates a playback of the plurality of AV files/areas in the first order. The playlists differ in that a different sequence of logical file names is used when playing back the areas. However, the physical access of an optical pickup is always the same.

An advantage of using different logical names for accessing the same physical area is that a copier might make a copy based on the logical file names. Consequently, the copier, e.g. a copy program, will copy the same area many times. In the example of FIG. 25, each of areas 330-1 to 330-4 might be copied four times since for each area four different logical names are used. This will lead to a huge amount of data. In the example of FIG. 25 the data will be four times the amount of data that is actually stored on the record carrier. For example, if a record carrier is a Blu-ray disc with 50 Gigabyte of storage, a copy of a copy program copying logical file names might be 200 Gigabytes.

Of course, FIG. 25 is only an example and in reality a much larger number of logical file names might be used. In such a case, the amount of data will increase even more and the huge amount of data will be difficult to handle for copiers.

Moreover, it may be easy to make an original disc check. If a copy program or copier makes a copy based on the logical file names then the arrangement of the physical areas might be depending on the logical file names as depicted in FIG. 27.

Figure 27:
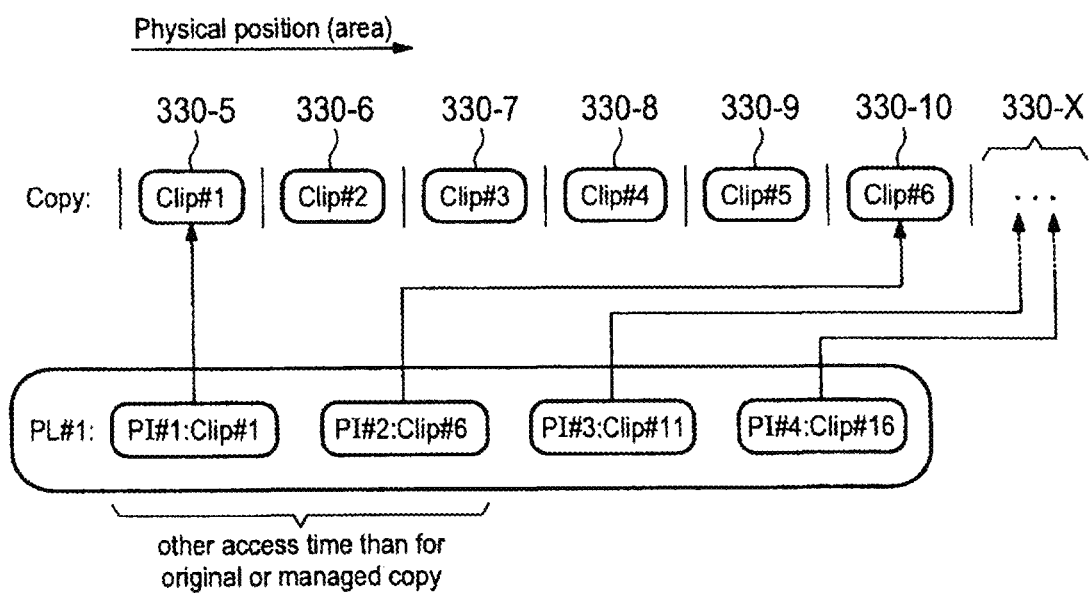
FIG. 27 shows an example of how a copy program might copy the record carrier of FIGS. 25 and 26.

FIG. 27 shows what will happen if a copier copies by the logical file names and stores the areas associated with the copied logical file names in the order of the logical file names. In the example of FIG. 27 clip#1, clip#2, clip#3, clip#5, and clip#6 might e.g. be stored in physical areas 330-5, 330-6, 330-7, 330-8, 330-9, and 330-10 respectively. Thus, data is physically created for a copy of clip#6 which is not the case in the original disc as shown in FIG. 25.

Moreover, when the playlist PL#1 is used for playback, the access characteristic for clip#1 and clip#6 will be different. In the example of the original disc shown in FIG. 25, the areas 330-1 and 330-2 that will be accessed by clip#1 and clip#6 respectively are adjacent to each other. However, on the copy areas 330-5 and 330-10 which will be accessed by the logical file names clip#1 and clip#6 respectively, are physically further apart. Therefore, an access time, e.g. of an optical pickup or a reading head of a hard disc will be different.

This effect could be used for preventing playback of the AV files in genuine quality. Alternatively, it could be used for stopping/preventing playback altogether. Therefore, the optical record carrier may comprise predetermined access characteristic data of an optical pickup when reading the AV files from a pre-recorded optical recording carrier. For example in FIG. 25, the optical disc on which areas 330-1, 330-2, 330-3, and 330-4 are stored may comprise data that are descriptive of access times of an optical pickup when first accessing clip#1 and then clip#6.

Further, the optical record carrier may comprise program instructions that when executed compare the access characteristic data of the optical pickup when reading from a pre-recorded optical record carrier to access characteristic data of a pickup (optical or magnetic pickup) of the playback device when reading the AV files.

For example, when the AV files are read from a copy (this could be an optical record carrier or a hard disc) actual access characteristic data might be determined. In FIG. 27, such actual access characteristic data may, for example, be descriptive of the access time when accessing clip#1 and then consecutively clip#6 which are stored in areas 330-5 and 330-10, respectively.

Since the logical file names clip#1 and clip#6 lead to an access in different physical areas, the access times, i.e. the actual access characteristic data, will be different than the access times when accessing areas 330-1 and 330-2 on the original optical record carrier of FIG. 25 by using logical file names clip#1 and clip#6.

Thus, there might be a deviation of the predetermined access characteristic data that describe the access characteristic when accessing on the prerecorded/original optical record carrier as shown in FIG. 25 and the actual access characteristic data that are descriptive of the access characteristic on a copy as shown in FIG. 27. If the deviation of the predetermined access characteristic data and the actual characteristic data is above a threshold, then playback of the AV files might be prevented. Alternatively, playback quality might be decreased.

On the other hand there may also be copy programs/copiers that atm at physically copying a disc, i.e. not based on logical file names as exemplified in FIG. 27. In such a case, encryption parameters such as e.g. AACS parameters, will have to be copied as well. Since this is legally not possible since no copy programs or disc writer device exist that could e.g. copy the PMSN or volume ID of a BD-ROM, an illegal physical copy cannot be played back. Thus, a copy program that operates only on the physical level, i.e. without checking the logical file system, will also not be able to make a copy of a record carrier as depicted e.g. in FIG. 25.

Figure 28:
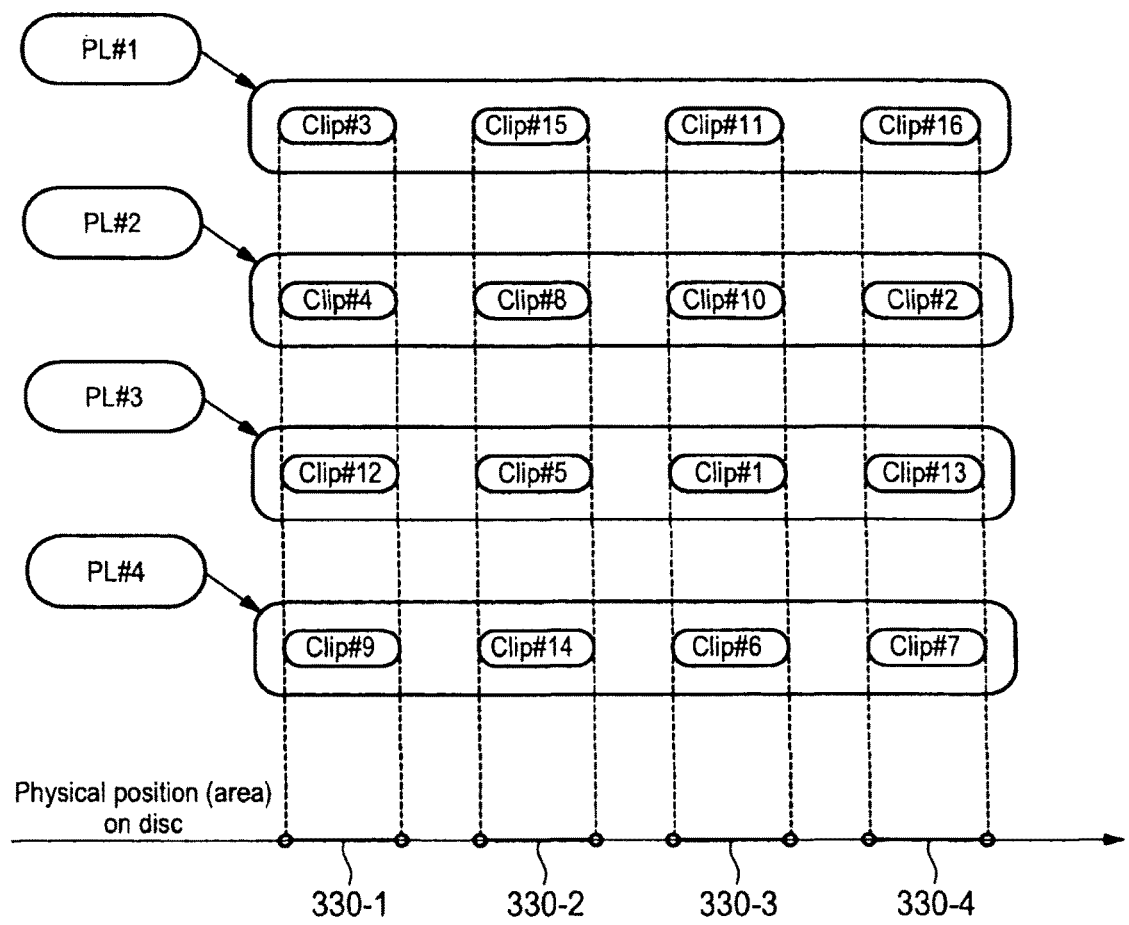
FIG. 28 shows an embodiment with arbitrary shuffled logical file names.

FIG. 28 corresponds to FIG. 25, however, with arbitrary shuffled logical file names of the clips/areas 330-1, ..., 330-4. This may lead to further confusion of a copier since no correlation between logical file names and physical positions might be spotted.

Figure 29:
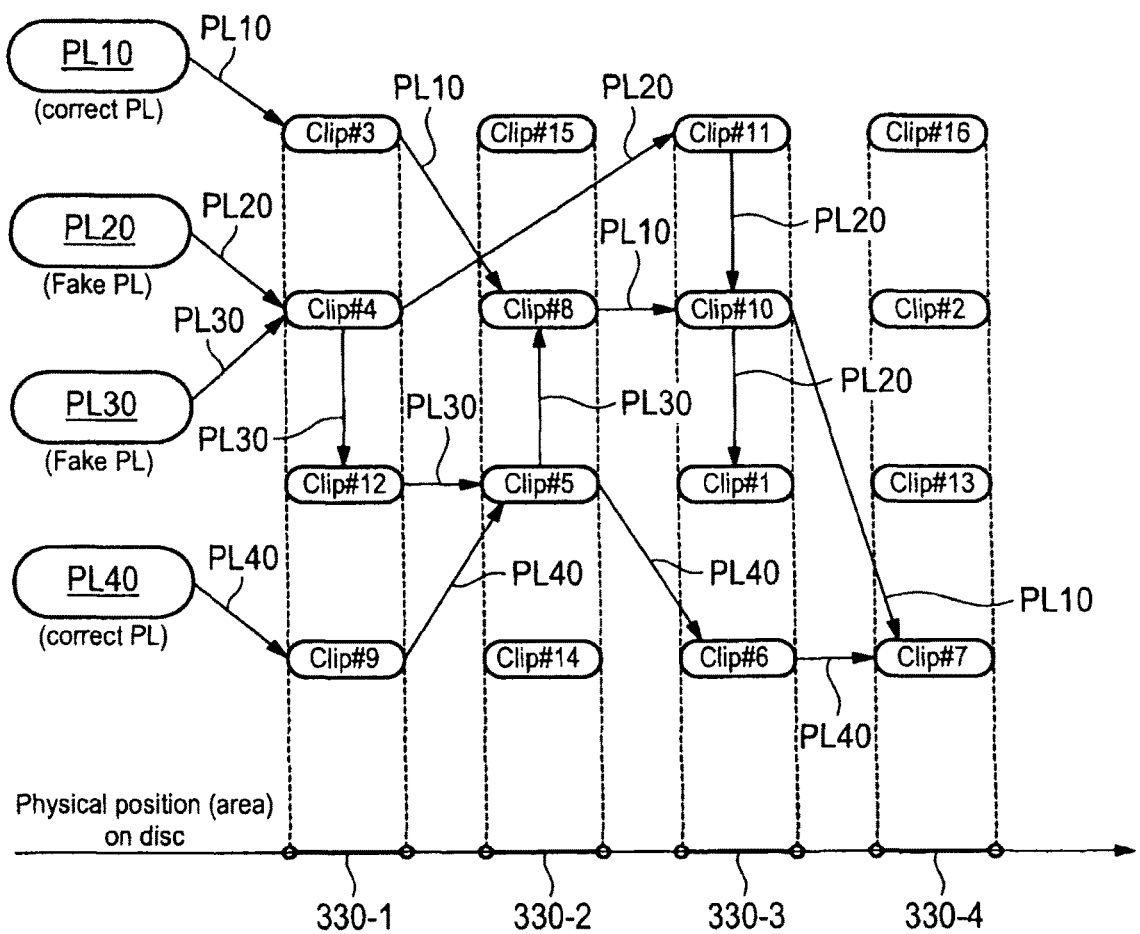
FIG. 29 shows an embodiment where fake playlists are created based on logical file names referencing the same area of a disk.

The different file names of a same area may also be used to create fake playlists. For example, FIG. 29 shows four playlists PL10, PL20, PL30 and PL40 for the areas 330-1, ..., 330-4 (for illustrative purposes these are the same areas as in FIGS. 25 and 28). The arrows in FIG. 29 denoted with the respective reference signs PL10, PL20, PL30 and PL40 indicate the sequence of logical file names that are included in the respective play lists. This results in:

PL10: clip#3, clip#8, clip#10, clip#7
PL20: clip#4, clip#12, clip#5, clip#8
PL30: clip#4, clip#11, clip#10, clip#1
PL40: clip#9, clip#5, clip#6, clip#7

The example of FIG. 29 has the same physical disc as FIG. 25 and same logical file system (same names as in the example of FIG. 25), however, different playlists. As can be easily seen, playlists PL10 and PL40 are "correct" playlists that will access the physical areas in the correct order, i.e. 330-1, 330-2, 330-3, and 330-4. Playlists PL20 and PL30, however, are "fake" playlists that will lead to a different access of the physical areas, and, thus, result in a wrong, i.e. user dissatisfying, reproduction. For example, when playlist PL20 is used for playback, area 330-1 will be reproduced first, and then area 330-3 will be reproduced three times.

Note that it is possible that the playlists have different length in the logical file system and/or in the physical mapping. For example, a playlist could comprise a different number of logical file names and lead to a reproduction of different length of audiovisual content by playing back a different number of areas.

Similarly as before, see e.g. FIGS. 5, 12, 13, 17, and 18 and corresponding description, the additional playlists could be used for confusing a copier, wherein the correct playlist, e.g. playlist PL10 and PL40 in FIG. 28 can only be discriminated from the fake playlists if an original disc check succeeds and/or correct "key data", i.e. key data as can only be read from an original disc, are extracted from the disc. For example, there may be stored a BD-J object on a Blu-ray disc that checks for encryption parameters and/or the integrity of encryption parameters and determines the correct playlist, e.g. playlist 10 in FIG. 28, based on the integrity check as explained above. Alternatively or additionally encryption parameters such as e.g. PMSN, volume ID and/or the like could be used. Also, again a correct playlist may not be included on the disc and provided for download from a server (cf. FIG. 9).

A copy without expected encryption parameters or with modified (since hacked) encryption parameters may, therefore, be useless since the program instructions of the BD-J object will not lead to the discrimination of the correct playlist from the fake playlists.

In a further embodiment it is also possible that the access characteristic as explained above be used for discriminating correct from fake playlists. A playback device might e.g. in the example of FIG. 29 check the access characteristic when accessing first clip#3 and then clip#8. Only if the access characteristic would be in a predefined range that is expected to occur when the record carrier is a pre-recorded record carrier, then an algorithm might able to determine playlist PL10 as correct playlist. In other words, the access characteristic may be used as input data for an algorithm for determining the correct playlist. The input data might as above also be referred to as "key data" or "key material", i.e. a key that is calculated for the disc.

Figure 30:
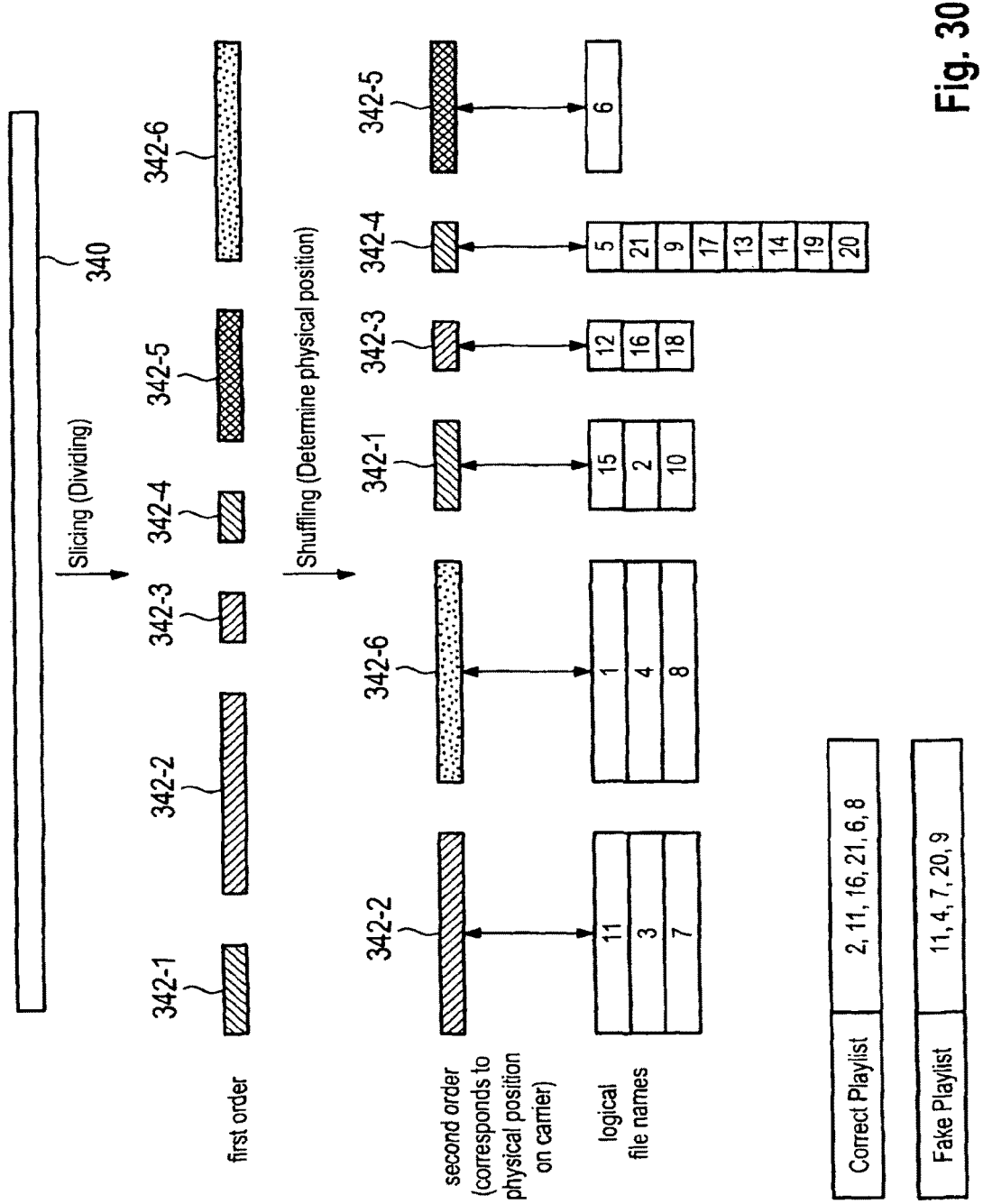
FIG. 30 shows an embodiment where clip slicing and shuffling is combined with referencing the shuffled clips by a plurality of different logical file names.

FIG. 30 shows a further embodiment combining the concept of slicing and shuffling explained above, e.g. at hand of FIGS. 1 to 4 and the concept of using different logical file names for accessing the same physical position on a record carrier.

In FIG. 30, AV data 340 is sliced, i.e. divided, into six portions, i.e. AV portions, 342-1, ..., 342-6. These AV portions, 342-1, ..., 342-6 might have a length of e.g. one minute, one to two minutes and so on (for further values, see above). Moreover, the AV portions 342-1, ..., 342-6 have a first order, wherein when the AV portions 342-1, ..., 342-6 are reproduced in the first order, the content of AV data 340 will be reproduced in the genuine playback sequence. As explained above, the AV portions 342 may then be shuffled or scrambled (mixed) so that the AV files 342-1, ..., 342-6 have a second order that is an order other than the first order. In the example of FIG. 30 the second order is: 342-2, 342-6, 342-1, 342-3, 342-4, and 342-5.

The AV portions might then be written to the disc in the second order, i.e. the second order defines a physical position, e.g. an area or a plurality of areas on the disc where a AV portion will be stored.

Now, in accordance with the explanations of FIGS. 25 to 29, each of the AV files 342 could be accessed by a plurality of different logical file names, for example, AV file 342-2 stored in a certain area or a plurality of certain areas on a disc might be accessed by logical file names 11, 3 and 7. Similarly, AV file 342-6 may be accessed by logical file names 1, 4, and 8; AV-file 342-1 could be accessed by logical file names 15, 2, and 10; AV-file 342-3 could be accessed by logical file names 12, 16, and 18; AV file 342-4 could be accessed by logical file names 5, 21, 9, 17, 13, 14, 19, 20; and AV file 342-5 could be accessed by a single logical file name 6.

The large number of logical file names gives the possibility of creating an almost unlimited number of fake playlists (further first playlists). Also, a large number of correct playlists could be determined. An example for a correct playlist in FIG. 30 based on logical file names is e.g. 2, 11, 16, 21, 6, 8. An example for a fake playlist, also based on logical file names, is e.g. 11, 4, 7, 20, 9.

Thus, the concept of using different logical file names for accessing a same AV file adds a "further dimension" to the number of playlists that could be determined without this concept.

Again, as before in order to determine the correct playlist, program instructions stored on the disc might be used in combination with characteristic data extracted from the disc ("key data").

Note that in the example of FIG. 30, in a further embodiment, the second order of the AV files 342 might not be completely arbitrary but such that a seamless playback is possible. In other words, the physical distance between two AV files 342 might not exceed a predefined distance in logical blocks. Such a constraint might be imposed by a standard for the record carrier. For example, a physical distance in the Blu-ray format may not exceed 640000 logical blocks.

Also, with respect to the embodiment of FIG. 30, it should be noted that one file that is accessed by different logical file names may include several sliced portions of the AV data 340. There is no limitation in that each portion 342 be stored in one file as is the case in the example of FIG. 30, though. However, a plurality of portions could also be stored in one file such as portions 108-3 and 108-2 are stored in one file in FIG. 1.

In the above, a variety of different embodiments of methods, systems and devices for copy protection as well as a variety of different embodiments of record carriers has been described. Some of these methods may also be applied to copy protecting audiovisual content on hard discs. For example the concept of slicing and shuffling AV clips could also be used to copy protect AV content on a hard disc. In any case, all of the described embodiments may be combined in any possible manner.

Thus, it should be understood that all of the embodiments described above may be combined in any way.

In the above, a number of times data is stored or written to a record carrier, such as e.g. files or clips (e.g. AV portions) or other data such as e.g. program instructions. This is done by modifying the physical structure of a recording medium. For example, if the record carrier is a hard disk, magnetic properties of the respective recording medium will be altered/modified in order to store the data. If the record carrier is an optical record carrier, e.g. optical disc, such as e.g. a DVD, BD and CD-ROM, pits and/or lands may be imposed onto the respective recording medium.

In some embodiments described above, the encryption characteristics of the AV data on the optical data carrier are analyzed. For this purpose program instructions are executed on playback devices. In the course of the execution of these instructions, the playback device retrieves these characteristics of the encryption from the optical data carrier. Although the information is retrieved by the playback device, they are characteristics of the optical data carrier itself, not characteristics of the playback device. Therefore, it is possible to detect situations were AV data are stored on a data carrier that is not an original data carrier.

Further, in some embodiments (see e.g. FIG. 1 but also many other Figs.) audiovisual data is stored in a plurality of portions, where all portions are in conformance with the format specification of the data carrier. Due to the fact that each portion is in conformance with the format specification, an appropriate playback device is able to reproduce each of these portions. Therefore the AV data are not considered to be corrupt. Storing of these portions in the second order is done with the intention to make the AV data useless or of reduced enjoyment to an end user, if the first order is not known. If the data (portions) are played according to the second order or according to further first orders which are non-genuine playback orders ("fake orders/playlists") the entertainment value does not have the genuine quality, whereas the playback in the first order corresponds to the genuine quality.

In order to better understand some of the technical contents, terms, abbreviations and so on, used throughout this specification, the following documents may be helpful:

The entire contents of the document "Universal Disk Format™ Specification", Revision 2.50, Apr. 30, 2003, available from the web site of the Optical Storage Technology Association (OSTA), www.osta.org, which is herewith incorporated by reference in its entirety.

Further, the entire contents of the document "White paper Blu-ray Disc Format—2.B Audio Visual Application Format Specification for BD-ROM", March 2005, available from the web site http://us.blu-raydisc.com, which is herewith incorporated by reference in its entirety.

Further, the entire contents of the book "Blu-ray Disc Demystified", $1^{st}$ edition, Nov. 10, 2008, ISBN-13 978-0071590921 is herewith incorporated by reference in its entirety. Information about the book can also be found on the web site http://www.bddemystified.com.

Also, the entire contents of US 2008/0304811 A1 published on Dec. 11, 2008 is herewith incorporated by reference in its entirety.

Figure 31B:
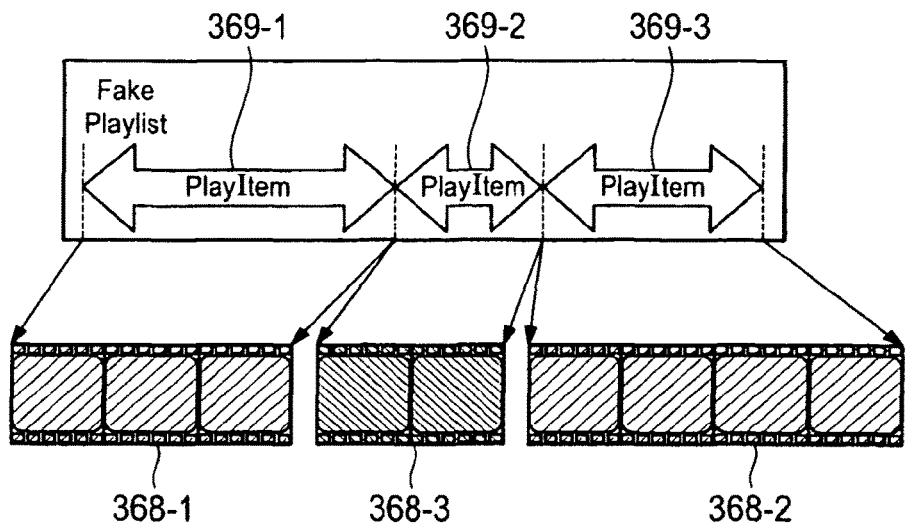
Figure 31C:
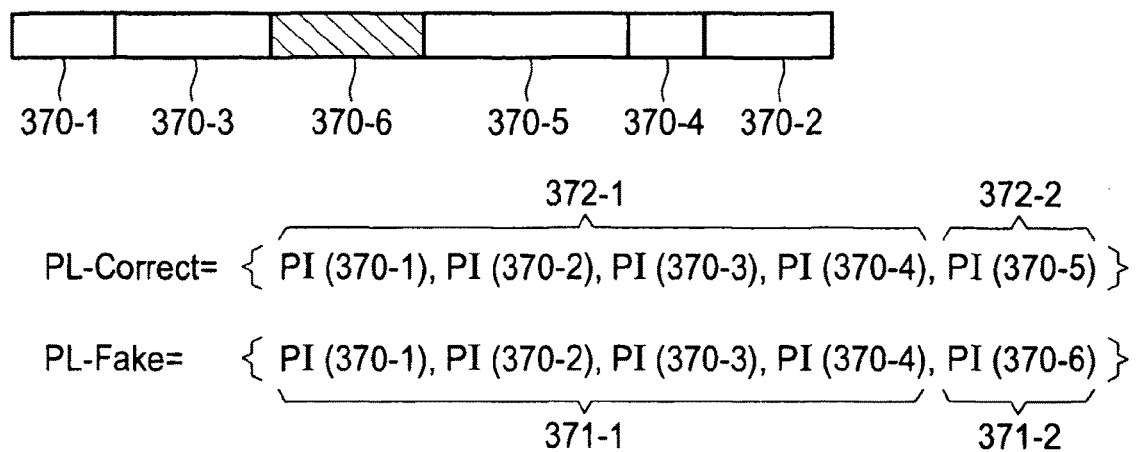

FIGS. 31A to 31C show a further embodiment where additional portions are stored on the record carrier. The additional portions could for example include information about copyright, advertisements for movies or other products and/or information on how a legal copy of the record carrier could be obtained.

In this embodiment, the original playlist (first order) which allows reproduction of the genuine content may not reference the additional portions. However, fake playlists (further first orders) may reference the additional portions. Some of the fake playlists may play at least a part of the audio visual content in the original genuine order such that a viewer would view at least a part of e.g. a movie or other content in genuine quality. However, after a part of the movie has been played in genuine quality (genuine order), the additional portion including e.g. information about the copyright or on how to obtain a legal copy would be displayed. After that reproduction based on the fake playlist would stop or continue in non-genuine quality. Obviously it would be very dissatisfying for a viewer since the additional portion could be played after the viewer has gained an interest in the movie.

FIG. 31A shows an example where an additional portion 368-3 is inserted between portions 368-1 and 368-2. FIG. 31B shows an example of a fake playlist where play items 369-1, 369-2 and 369-3 respectively reference portions 368-1, 368-3 and 368-2. Thus, in case the fake playlist is used for reproduction, the additional portion 368-3 will be reproduced.

FIG. 31C shows a further example where an additional portion 370-6 is added and stored on the record carrier. As can be seen in the example of FIG. 31C, the correct playlist PL-Correct does not include a play item PI(370-6). On the other hand, the fake playlist PL-fake includes a respective play item PI(370-6).

Moreover, as can be seen in the example of FIG. 31C, the fake playlist PL-fake in the first part 371-1 corresponds to the first part 372-1 of the correct playlist PL-correct. Thus, when using the fake playlist PL-fake for reproduction, at the beginning the play items PI(370-1), PI(370-2), PI(370-3), PI(370-4) will be reproducing a part of the content in the genuine order (genuine quality). However, since a play item referencing portion 370-5 is not included in the fake playlist PL-fake, portion 370-5 will not be reproduced when using the fake playlist PL-fake but instead a play item referencing portion 370-6. Assuming that the play item referencing portion 370-5 in the correct playlist PL-Correct corresponds to the final scene of a movie, this would be very dissatisfying and annoying for a viewer when reproduction is with the fake playlist PL-fake.

FIG. 32A shows a further embodiment where an additional portion 375-3' is stored on the record carrier which is a copy of another portion 375-3 stored on the record carrier. An advantage of this embodiment is that a larger number of fake playlists may be generated which fake playlists are "in-spec". In other words, all of the larger number of fake playlists may allow reproduction seamlessly, however, in a scrambled order. In any case, a copier (hacker) could not distinguish the fake playlists from the correct playlist due to the fact that the fake playlist might not allow reproduction seamlessly. This is an advantage since it adds a further level of security.

With regard to the meaning of the term "in-spec", reference is made to the above detailed description regarding details of the BD specification according to which the maximum distance for two clips to be joined seamlessly is (on a BD-ROM) 640000 logical blocks (intra-layer) and 40000 logic blocks (inter-layer)

FIG. 32B shows an example illustrating this effect. On the record carrier of the example of FIG. 32B, portions of audio or audiovisual content 372-3, 372-6, 372-1, 372-5, 372-4, 372-2 and 372-6' are stored in that order (second order). Portion 372-6' is a copy of portion 372-6.

The correct playback sequence (first order) corresponds to the following playback sequence: 372-1, 372-2, 372-3, 372-4, 372-5, 372-6.

Thus, the correct playlist PL-Correct is given by:
PL-Correct={PI(372-1), PI(372-2), PI(372-3), PI(372-4), PI(372-5), PI(372-6)}

A fake playlist may be given as follows:
PL-Fake={PI(372-2), PI(372-6'), PI(372-4), PI(372-5), PI(372-1), PI(372-3)}.

As can be seen, the second play item PI(372-6') in the fake playlist PL-Fake references the copy of the portion 372-6. Since the portion 372-6' is arranged very close (in example of FIG. 32B next to) portion 372-2, reproduction when using the fake playlist PL-fake will be seamless. On the other hand, if the fake playlist PL-fake were to reference as a second play item the portion 372-6 (the original portion and not the copy 372-6') then the distance between portion 372-2 and portion 372-6 would be very large and might be "out of spec", i.e. no seamless reproduction would be possible for the following fake playlist:
PL-Fake={PI(372-2), PI(372-6), PI(372-4), PI(372-5), PI(372-1), PI(372-3)}.

The fact that this playlist would not allow a seamless reproduction could be detected by a copier (hacker) and thereby the copier could determine that this playlist is a fake playlist. Thus, by providing a copy as explained such a situation can be avoided and a larger number of fake playlists can be generated which all allow seamless reproduction. This adds further enhances the copy protection since more fake playlists makes it more difficult to determine the correct playlist among the large number of fake playlists.

In a further embodiment (not shown) it would also be possible to have several copies of one portion of audio visual content stored at distributed physical locations on the record carrier.

The copy of one of the portions (or the plurality of copies in case of more than one copy) could be stored at various positions on the record carrier. Moreover, the portions of which copies are stored on the record carrier could be parts of a movie which are inconspicuous so that a copier (hacker) would not easily recognize that the content is not reproduced in the genuine order/quality when using a fake playlist as explained.

FIG. 33 shows a further embodiment where an additional portion is stored on the record carrier corresponding to a copy of (only) a part of another portion. In the example of FIG. 33 reference sign 377-2 represents a part of portion 377-3. As shown in the lower part of FIG. 33, a copy 377-2' of this part 377-2 is stored as additional portion on the record carrier.

The effect of storing copies of parts of other portions is similar as described above in connection with FIGS. 32A and 32B. Also in this case a larger number of playlists allowing seamless playback may be generated since the copies could be referenced in fake playlists.

Figure 34B:
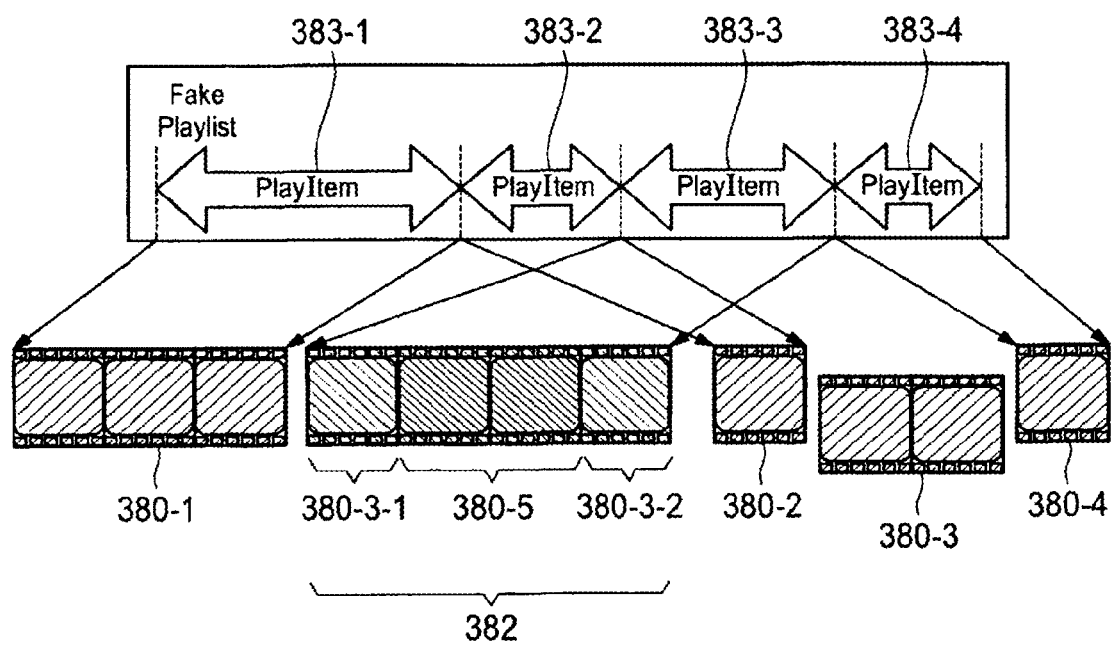

FIGS. 34A and 34B show a further embodiment where additional portions are generated and stored on the record carrier, the additional portions including additional content such as e.g. advertisement and the like (see above) as well as copies of other portions stored on the record carrier. As seen in FIG. 34A, portion 382 includes portion 380-5 which includes additional contents as well as a first part 380-3-1 and a second part 380-3-2 which respectively corresponds to parts of portion 380-3.

It should be noted that in a possible further embodiment (not shown) it is not necessary that the additional portions be surrounded by copied parts. It would be possible to only add copies before the additional portions. Thus, in FIG. 34A, portion 382 could only include portion 380-3-1 but not 380-3-2.

FIG. 34B shows an example of a fake playlist where the additional portion shown in FIG. 34A is referenced by a play item 383-3 as the third play item in the row of play items 383-1, 383-2, 383-3 and 383-4 as a part of the fake playlist.

One effect is again similar as described above, i.e. a larger number of fake playlists may be generated which allow seamless playback (in the wrong, i.e. non-genuine, order).

Another effect is that surrounding the additional portions with copies of other portions makes it more difficult to spot the respective portions by copiers. For example, in case a respective clip (portion) on a BD disc would not start with a copy of a portion of genuine content, a copier could more easily spot the respective portion (including only the additional portion e.g. comprising advertisement) since the copier may easily recognize, e.g. Just be looking at the first picture of a respective video sequence, that the portion does not belong to the genuine content stored on the disc. Moreover, in this case, the copier (hacker) could also exclude all (fake) playlists which reference the respective portion. This is prevented, if at least in the beginning of a portion, a copy of a portion of genuine content is added. The copier will not be able to easily recognize that such a portion (e.g. portion 382 in FIG. 34A) includes additional content. Moreover, since the copier does not recognize this, he will not be able to easily exclude (fake) playlists referencing such a portion.

Figure 35A:
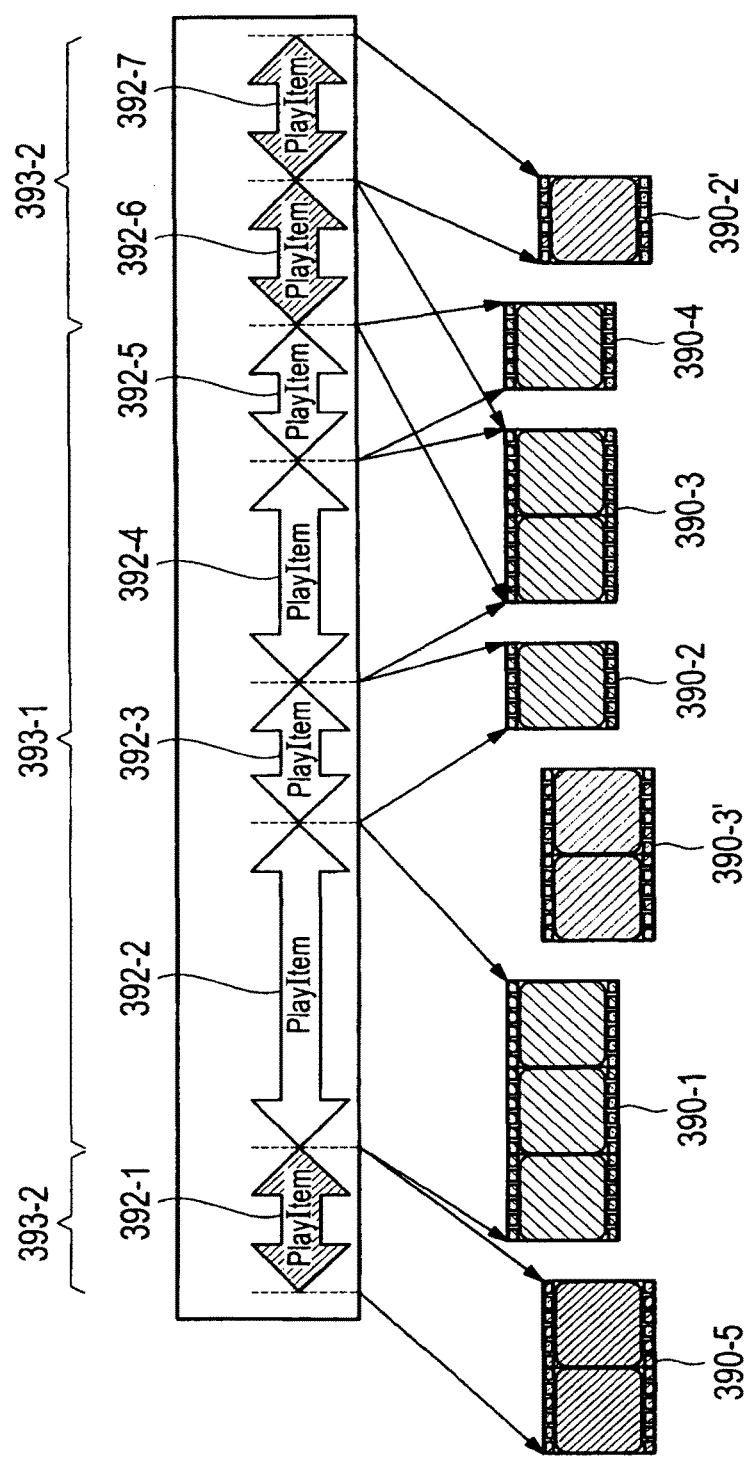

FIG. 35A shows a further embodiment of a playlist having a first part 393-1 and a second part 393-2, wherein a subpart of the second part 393-2 is arranged before the first part 393-1 and a further subpart of the second part 393-2 is arranged after the first part 393-1.

In this embodiment, only the play items in the first part 393-1, i.e. play Items 392-2, 392-3, 392-4 and 392-5, reference the portions of audio visual content such as to playback the genuine audio visual content as intended by the maker of the content.

In case all of the play items of the playlist, i.e. play items 392-1, 392-2, 392-3, 392-4, 392-5, 392-6 and 392-7, are used for playback the playback duration will be longer than intended by the maker of the content.

This will further be illustrated by means of an example:

Assume that the play items 392-2, 392-3, 392-4 and 392-5 correspond to a complete movie in the genuine order. The movie might have a duration of a first period which e.g. corresponds to two hours. However, since the playlist comprises the additional play items 392-1, 392-6 and 392-7, the period of reproduction of the playlist could be much longer.

In the example of FIG. 35A only three additional play items 392-1, 392-6 and 392-7 are shown. This should not be understood as any kind of limitation since in fact a much larger number of additional play items is possible. In this case the reproduction time when using the fake playlist for reproduction could be much longer, e.g. more than 100, 1000, 10,000 or even more hours.

Therefore, it would be very difficult for a copier (hacker) to determine which part of the playlist includes the play items which will (only) reproduce the content as intended by the maker of the content, e.g. the mentioned two hours of the movie.

In order to hack the copy protection it would be necessary to watch the many hours of video sequences to determine when the movie actually starts and ends. In fact, it seems that a human could not hack such kind of copy protection.

In order to reproduce the record carrier of FIG. 35A, it will be necessary to find the correct start and end play item within the large number of play items in the playlist (in the example of FIG. 35A, play items 392-2 and 392-5).

Based on the embodiment of FIG. 35A it would be possible to only include one playlist (a "long" playlist) on the copy protected record carrier. For reproduction in genuine quality (here referring to reproduction of the content in the original length, i.e. as intended by the maker of the content) it will be necessary to determine the start and end play item in the playlist. For this purpose the same possibilities as for determining a correct playlist among a large number of fake playlists as described throughout this specification exist. For example, index numbers of the start and end play items could be assembled based on reading byte values at certain positions (cf. FIGS. 19A to 19J) or the respective index numbers could be downloaded from a server.

It would of course also be possible to include a large number of fake "long" playlists. Some or all of the fake playlists may lead to reproduction of several hundreds, thousands or more hours of content. Thus, for reproduction in genuine quality (with a genuine duration), it is necessary to determine the correct playlist (which may be a "long" playlist) and additionally to determine the start and end play items within this playlist. Thus, copy protection can be further enhanced.

As indicated in the example of FIG. 35A the portions referenced by the play items in the second part 393-2 may include additional content (see e.g. play item 392-1 referencing portion 390-5). Further, the play items in the second part 393-2 may also reference portions which are part of the genuine content (see e.g. play item 392-6 referencing portion 390-3). Still further the play items in the second part 393-2 may also reference portions which are copies of other portions (see e.g. play item 392-7 referencing portion 390-2' which is a copy of portion 390-2). Thus, also in the "long" playlist seamless reproduction may be achieved such that a copier cannot get any clues as to where the start and end play items are which allow reproduction in genuine quality/genuine duration.

FIG. 35B shows a further example of a record carrier where portions 392-1 to 392-5 are stored on a record carrier in a scrambled order. A playlist which might be used for copy protection purposes is also shown in FIG. 35B. As seen, the playlist comprises a first part 394-1 which allows reproduction of the audio visual content in the genuine order with genuine length (e.g. the genuine length of a movie). However, the playlist PL further comprises a second part 394-2 which in the example of FIG. 35B is split up in sub parts as in FIG. 35A. The total length of reproduction when using the playlist PL for playback might be many hours, for example more than 10, 100, 1,000, 10,000 or even more hours. Thus, in order to playback only the portions 392-1, . . . , 392-5 in the original order (first order) with the original duration it is necessary to find the correct start and end play items in the playlist PL (in the example these are play items PI(392-1) and PI(392-5) located in the first part 394-1).

Figure 36:
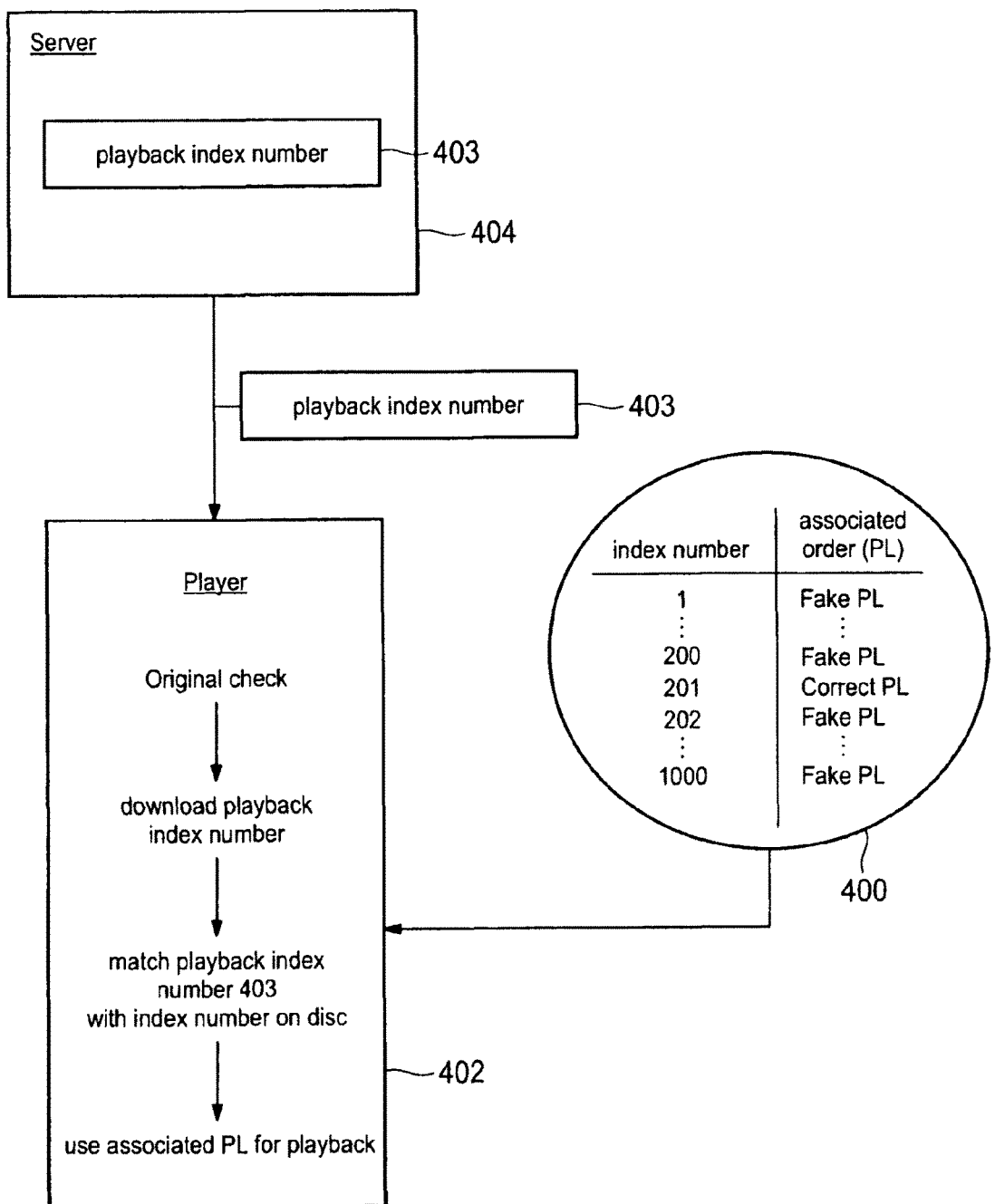
FIG. 36 shows a further embodiment where a record carrier comprises a correct playlist and a plurality of fake playlist (further first orders). The correct playlist and the plurality of fake playlists each have an assigned index number.

FIG. 36 shows a further embodiment where a record carrier 400 which could e.g. be a Blu-Ray disc comprises a correct playlist and a plurality of fake playlist (further first orders).

The correct playlist and the plurality of fake playlists each have an assigned index number. In the example of FIG. 36, the correct playlist has an assigned index number 201 and the fake playlists have the indicated further index numbers 1 ... 200 and 202 ... 1000.

In order to playback the audiovisual content stored on the record carrier 400, the correct playlist has to be identified. This may be done by a playback device 402 by checking whether carrier 400 is an original. If this is the case, a playback index number 403 is downloaded from a server 404. Playback device 402 then matches the playback index number 403 with the index numbers 1 ... 1000 on the record carrier. The playback device 402 will then chose the respective playlist used for playback based on the playback index number. For example, if the server provides as playback index number, the number "200", a fake playlist (see table drawn on disc 400 in FIG. 36) will be used for playback.

In case the original disc check was successful, i.e. the record carrier 400 has been identified to be an original, the server will provide the index number for the correct playlist (in the example 201). Otherwise, download will either not start at all or the server may provide a playback index number which will not enable the playback device to determine the correct playback index, i.e. a fake playlist will be used for playback.

For determining the playback index number 403, the server may receive certain predefined parameters from the original disc check performed at player 402 during playback of disc 400. For example, when the disc 400 is played back, program instructions stored on the disc 400 may instruct the player to read certain hash values (cf. FIG. 15) or the like. These hash values (as an example of predefined parameters) may then be sent from the player 402 to the server 404. Based on these valued, the server 404 may then determine the playback index number 403. For example, if the server 404 receives the "correct" (expected) hash values (e.g. those of an original disc) then the server may provide the playback index number 403 such that the correct playlist is selected for playback, in the example, this would be the index number 201 (see table on disc 400 indicating that index number 200 has the correct playlist "Correct PL" associated).

Of course, as predefined parameters any other values/information disclosed throughout this specification could be used. For example, also byte values at predefined positions could be used and so on. Therefore, although this is indicated in FIG. 36, the player 402 need not perform a full "original disc check". In fact it is sufficient to read certain predefined parameters/values from the disc and send these parameters to the server 404. In that sense, the server is involved in the original disc check since the server will compare the parameters/values sent from the playback device with expected values (those that are read in case the disc is an original).

In a further embodiment (not shown in the Figs.) no original disc check is performed at all and only e.g. a parameter identifying the title on the disc is sent from the player to the server. The server may then determine the date on which the parameter is received and if the date is after a predefined date, the server will provide a playback index number for the correct playlist. If the date is before the predefined date, the server will either not provide a playback index number at all or a playback index number referencing a fake playlist. This way it is possible to prevent playback of a BD title before a desired release date.

Figure 37:
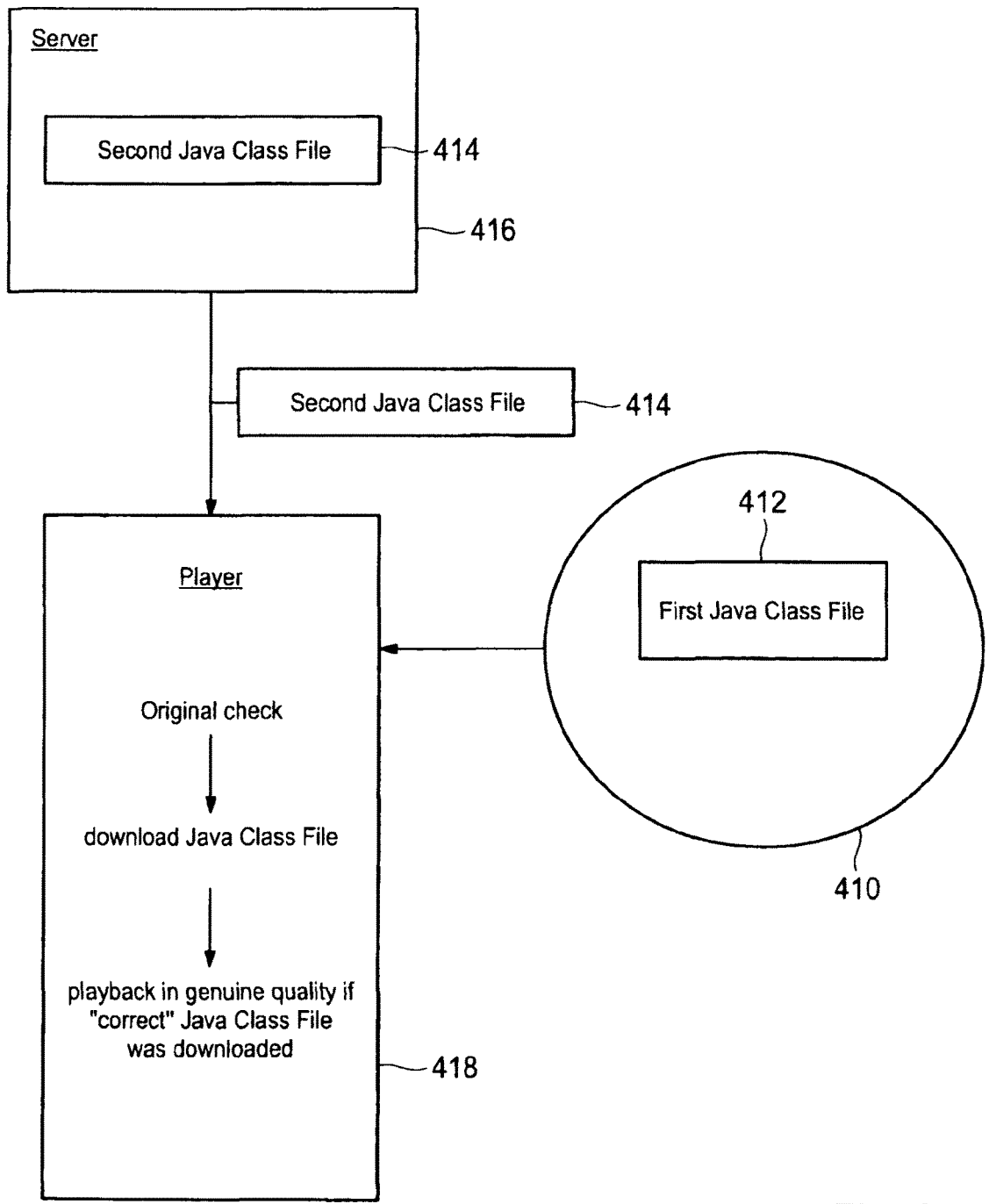
FIG. 37 shows a further embodiment where a Blu-Ray disc comprises a first Java Class File. This first Java Class File, however, includes no instructions which would allow reproduction of the audio or audiovisual content stored on the disc in genuine quality.

FIG. 37 shows a further embodiment where a Blu-Ray disc 410 comprises a first Java Class File 412. This first Java Class File 412, however, includes no instructions which would allow reproduction of the audio or audiovisual content stored on the disc in genuine quality. For example, no program instructions may be included in the first Java Class File 412 which would allow selection of a correct playlist among a large number of fake playlists.

In order for the disc to playback the content in genuine quality (in case it is an original), a second Java Class File 414 is needed. This may be provided on a server 416 for download. However, a playback device 417 may only be able to download the second Java Class File 414 in case an original disc check reveals that the disc 410 is an original disc. Otherwise, no download may be possible or alternatively the server may supply a Java Class File which will lead to playback in non-genuine quality, e.g. by selecting a fake (e.g. advertising) playlist.

Based on a part of the above description, it is evident that some embodiments may be summarized by the following numbered items:

The invention claimed is:

1. A method for copy protection of an optical record carrier that includes content that has been encrypted using a predetermined encryption method, comprising:
  selecting program instructions stored on the optical record carrier, wherein the selected program instructions cause a playback device to
    check whether encryption characteristics relating to the predetermined encryption method are present on the optical record carrier,
    prevent playback of the content when the encryption characteristics are not present,
    a second step to when the encryption characteristics are present, verify an integrity of the encryption characteristics,
  wherein the program instructions stored on the optical record carrier initiate playback by the playback device of genuine audiovisual or audio content stored on the optical record carrier in genuine quality only if the integrity of the encryption characteristics is verified, the program instructions initiating a reduced-quality playback of the audiovisual or audio content when the integrity of the encryption characteristics cannot be verified, the reduced-quality playback being one of distorted with respect to genuine quality playback or missing content portions as compared to the genuine quality playback.

2. The method of claim 1, wherein when the integrity of the optical record carrier has been verified, at least some of the encryption characteristics relating to the predetermined encryption method depend on genuine audiovisual or audio content stored on the optical record carrier and have been determined in accordance with an encryption standard for copy protection of the genuine audiovisual or audio content at the time of manufacturing the optical record carrier.

3. The method of claim 1, wherein a further portion of the program instructions control playback of the audiovisual or audio content and/or an interactive user menu for controlling playback of the audiovisual or audio content.

4. The method of claim 1, wherein the optical record carrier is a Blu-ray Disc, and the encryption characteristics have been determined in accordance with Advanced Access Content System (AACS) as an encryption standard, and wherein the program instructions are included in a BD-J Object, in a Movie Object, and/or in an Interactive Menu.

5. The method of claim 1, wherein the genuine audiovisual or audio content is stored in a plurality of portions, the portions having a first order, wherein when the portions are reproduced in the first order the genuine audiovisual or audio content is reproduced in a genuine playback sequence of the audiovisual or audio content, wherein the portions are stored on the optical record carrier in a second order that is different from the first order, wherein a physical position on the record carrier where a respective portion is stored depends on the second order.

6. The method of claim 5, wherein the first order is stored on the record carrier in an obfuscated manner, and wherein the program instructions comprise instructions for de-obfuscating the first order.

7. The method of claim 5, wherein the program instructions comprise instructions for de-obfuscating the first order dynamically during playback of the genuine audiovisual or audio content, and wherein the de-obfuscating depends on the encryption characteristics that depend on the genuine audiovisual or audio content.

8. The method of claim 1, wherein the optical record carrier is a Blu-ray Disc, and the encryption characteristics have been determined in accordance with Advanced Access Content System (AACS) as an encryption standard, and wherein the encryption characteristics comprise at least one parameter from the group consisting of hash values of content chunks, the hash values being stored in the Content Certificate of the AACS standard, a copy permission indicator in a transport stream for the audiovisual or audio content, a plurality of consecutive sync bytes, a volume ID, and a pre-recorded media serial number (PMSN).

9. The method of claim 1, wherein the optical record carrier is a Blu-ray Disc, and the encryption standard is Advanced Access Content System (AACS), and wherein the encryption characteristics comprise hash values stored in the Content Certificate of the AACS standard, the hash values being stored on the optical record carrier, wherein in the second step the hash values are compared to calculated hash values, the calculated hash values corresponding to hash values calculated from parts of an AV stream file or corresponding to the Secure-Hash-Algorithm value of the application root certificate.

10. The method of claim 1, wherein the optical record carrier is a Blu-ray Disc, and the encryption standard is Advanced Access Content System (AACS), and wherein the encryption characteristics comprise hash values stored in the Content Certificate of the AACS standard, the hash values being dependent on the genuine audiovisual or audio content stored on the optical record carrier, wherein in the second step the hash values are compared to calculated hash values, the calculated hash values corresponding to hash values calculated from parts of an AV stream file.

11. The method of claim 1, wherein the optical record carrier is a Blu-ray Disc, and the encryption standard is Advanced Access Content System (AACS), and wherein the encryption characteristics comprise hash values stored in the Content Certificate of the AACS standard, the hash values being dependent on the application root certificate stored on the optical record carrier, wherein in the second step the hash values are compared to calculated hash values, the calculated hash values corresponding to the Secure-Hash-Algorithm value of the application root certificate.

12. The method of claim 1, wherein the optical record carrier is a Blu-ray disc and wherein, if in the first step it is determined that the encryption characteristics are not present on the record carrier or if in the second step it is determined that the encryption characteristics are corrupted, an alternate viewing angle of the genuine audiovisual or audio content is selected in accordance with a respective function of the Blu-ray standard.

13. The method of claim 1, wherein the optical record carrier is a Blu-ray Disc and the program instructions are executed on the playback device within a Java virtual machine, and wherein the program instructions comprise a check of the playback device, and wherein if the check reveals that the playback device is a computer as a host of a playback software for the optical record carrier, the program instructions prevent playback unless a predetermined software module is installed on the computer.

14. The method of claim 13, wherein the predetermined software module checks the host integrity and communicates with the BD-J object, wherein the BD-J object prevents playback if the host integrity is determined not to have been verified.

15. The method of claim 14, wherein the host integrity is judged not to be verified if a checksum of the playback software is incorrect, the playback software is run in a debug mode, and/or the Blu-ray disc is emulated as a virtual drive.

16. A non-transitory computer-readable medium copy encoded with computer-readable instructions thereon, the computer-readable instructions when executed by a playback device cause the playback device to perform a method, comprising:
checking, in the playback device, if encryption characteristics are present on the computer-readable medium copy;
preventing genuine quality playback of audiovisual or audio content by the playback device when the encryption characteristics are not present on the computer-readable medium copy;
when the encryption characteristics are present on the computer-readable medium copy, determining, in the playback device, whether the encryption characteristics are corrupted based on an integrity check;
preventing the genuine quality playback of audiovisual or audio content by the playback device when the encryption characteristics are determined to be corrupted; and
causing a reduced-quality playback of the audiovisual or audio content when genuine quality playback is prevented, the reduced-quality playback being one of distorted with respect to genuine quality playback or missing content portions as compared to the genuine quality playback,
wherein the audiovisual or audio content are stored in the computer-readable medium copy and are not copy protected, and wherein the computer-readable medium copy does not comprise encryption characteristics of a standard used to copy protect an original computer-readable medium or the computer-readable medium copy comprises corrupted encryption characteristics.

17. A non-transitory computer-readable medium encoded with computer-readable instructions thereon, the computer-readable instructions when executed by a playback device cause the playback device to perform a method, comprising:
checking that encryption characteristics are present on the computer-readable medium;
preventing genuine quality playback of audiovisual or audio content by the playback device when the encryption characteristics are not present on the computer-readable medium copy;
when the encryption characteristics are present in the computer-readable medium, performing an integrity check of the encryption characteristics, wherein the encryption characteristics at least partly depend on the audiovisual or audio content and have been determined in accordance with an encryption standard for copy protection of the audiovisual or audio content at the time of manufacturing the computer-readable medium;
playing back the audiovisual or audio content in genuine quality only if the integrity check of the encryption characteristics determines that the encryption characteristics are not corrupted; and causing a reduced-quality playback of the audiovisual or audio content when the encryption characteristics are determined to be corrupted, the reduced-quality playback being one of distorted with respect to genuine quality playback or missing content portions as compared to the genuine quality playback, wherein the audiovisual or audio content that is copy protected according to the encryption standard used for copy protection of the computer-readable medium is stored in the computer-readable medium, and the encryption characteristics of the encryption standard are stored in the computer-readable medium.

* * * * *